US012083764B2

(12) United States Patent
Langen

(10) Patent No.: US 12,083,764 B2
(45) Date of Patent: Sep. 10, 2024

(54) METHOD AND APPARATUS FOR FORMING CONTAINERS

(71) Applicant: H. J. Paul Langen, Brampton (CA)

(72) Inventor: H. J. Paul Langen, Brampton (CA)

( * ) Notice: Subject to any disclaimer, the term of this patent is extended or adjusted under 35 U.S.C. 154(b) by 0 days.

(21) Appl. No.: 17/827,171

(22) Filed: May 27, 2022

(65) Prior Publication Data

US 2022/0281201 A1 Sep. 8, 2022

Related U.S. Application Data

(63) Continuation of application No. 15/864,918, filed on Jan. 8, 2018, now abandoned, which is a continuation (Continued)

(51) Int. Cl.
*B31B 50/26* (2017.01)
*B31B 50/10* (2017.01)
(Continued)

(52) U.S. Cl.
CPC ............ *B31B 50/262* (2017.08); *B31B 50/10* (2017.08); *B31B 50/26* (2017.08); *B65B 43/305* (2013.01); *B31B 50/066* (2017.08); *B31B 50/07* (2017.08); *B31B 50/80* (2017.08); *B31B 2100/00* (2017.08); *B31B 2100/0022* (2017.08); *B31B 2110/35* (2017.08)

(58) Field of Classification Search
CPC ....... B31B 50/262; B31B 50/26; B31B 50/10; B31B 43/305; B31B 50/07; B31B 50/066; B31B 2100/0022; B31B 2100/00; B31B 2110/35; B31B 50/80
USPC .......................................................... 493/162
See application file for complete search history.

(56) References Cited

U.S. PATENT DOCUMENTS 1,434,230 A 10/1922 Shawver et al.
1,471,924 A 10/1923 Saylor et al.
(Continued)

FOREIGN PATENT DOCUMENTS

CA 2700657 C 11/2007
CA 2712878 C 2/2011
(Continued)

OTHER PUBLICATIONS

Notice of Allowance mailed by the USPTO on May 25, 2021, in the related U.S. Appl. No. 16/444,673.
(Continued)

*Primary Examiner* — Sameh Tawfik

(57) ABSTRACT

A system is claimed for forming a container from a tubular blank comprising a plurality of panels and flaps interconnected to provide a generally flattened tubular configuration. A first and second panels are provided with the second panel being rotatable relative to the first panel. The system may comprise a first engagement device for engaging the first panel and a second engagement device for engaging the second panel, and being located on a panel rotating apparatus operable to rotate the second panel from an orientation generally parallel to the first panel to a second orientation at an angle to the first panel. The generally flattened tubular blank may be reconfigured from a generally flattened configuration to an open configuration.

20 Claims, 59 Drawing Sheets

Related U.S. Application Data of application No. 14/396,516, filed as application No. PCT/CA2013/000245 on Mar. 15, 2013, now abandoned.

(60) Provisional application No. 61/637,665, filed on Apr. 24, 2012.

(51) Int. Cl.

| | |
|---|---|
| ***B65B 43/30*** | (2006.01) |
| *B31B 50/06* | (2017.01) |
| *B31B 50/07* | (2017.01) |
| *B31B 50/80* | (2017.01) |
| *B31B 100/00* | (2017.01) |
| *B31B 110/35* | (2017.01) |

(56) References Cited

U.S. PATENT DOCUMENTS

| | | | | |
|---|---|---|---|---|
| 2,786,316 | A | 3/1957 | Silva et al. | |
| 2,869,297 | A | 1/1959 | Neer | |
| 2,879,638 | A | 3/1959 | Hill | |
| 2,900,778 | A | 8/1959 | Hartbauer | |
| 2,902,810 | A | 9/1959 | McGihon | |
| 3,292,813 | A | 12/1966 | Roegner | |
| 3,461,642 | A | 8/1969 | Langen et al. | |
| 3,619,967 | A | 11/1971 | Alduk | |
| 3,698,151 | A | 10/1972 | Arneson | |
| 3,757,486 | A | 9/1973 | Feurston et al. | |
| 3,940,907 | A | 3/1976 | Ganz | |
| 4,010,593 | A | 3/1977 | Graham | |
| 4,031,817 | A | 6/1977 | Raschke | |
| 4,061,081 | A | 12/1977 | Pinto et al. | |
| 4,163,414 | A | 8/1979 | Bachman, Jr. et al. | |
| 4,414,789 | A | 11/1983 | Pattarozzi | |
| 4,553,954 | A * | 11/1985 | Sewell | B31B 50/006 493/122 |
| 4,569,182 | A | 2/1986 | Leuvering | |
| 4,823,539 | A | 4/1989 | Kuckhermann et al. | |
| 4,915,678 | A | 4/1990 | Morita | |
| 4,942,720 | A | 7/1990 | Berney | |
| 5,024,640 | A | 6/1991 | Saitoh | |
| 5,060,451 | A | 10/1991 | DeMay et al. | |
| 5,061,231 | A | 10/1991 | Dietrich et al. | |
| 5,105,600 | A | 4/1992 | DePoint, Jr. et al. | |
| 5,106,359 | A | 4/1992 | Lott | |
| 5,115,625 | A | 5/1992 | Barbulesco et al. | |
| 5,145,070 | A | 9/1992 | Pallett et al. | |
| 5,207,630 | A | 5/1993 | Decker et al. | |
| 5,341,626 | A | 8/1994 | Beckmann | |
| 5,352,178 | A | 10/1994 | Pazdernik | |
| 5,393,291 | A * | 2/1995 | Wingerter | B31B 50/80 493/317 |
| 5,411,464 | A | 5/1995 | Calvert et al. | |
| 5,440,852 | A | 8/1995 | Lam | |
| 5,456,570 | A | 10/1995 | Davis et al. | |
| 5,624,368 | A | 4/1997 | Cromwell | |
| 5,626,002 | A | 5/1997 | Ford et al. | |
| 5,720,156 | A | 2/1998 | Bridges et al. | |
| 5,997,458 | A | 12/1999 | Guttinger et al. | |
| 6,032,853 | A | 3/2000 | Chevalier | |
| 6,099,450 | A | 8/2000 | Schenone et al. | |
| 6,226,965 | B1 | 5/2001 | Lam | |
| 6,378,725 | B1 | 4/2002 | Andersson | |
| 6,688,075 | B2 | 2/2004 | Cristina | |
| 6,721,762 | B1 | 4/2004 | Levine et al. | |
| 6,764,436 | B1 | 7/2004 | Mazurek | |
| 6,799,671 | B1 | 10/2004 | Gomes | |
| 6,876,958 | B1 | 4/2005 | Chowdhury et al. | |
| 6,912,762 | B2 | 7/2005 | Lile et al. | |
| 6,913,568 | B2 * | 7/2005 | Frank | B31B 50/802 493/309 |
| 6,955,032 | B2 | 10/2005 | Smith | |
| 6,968,668 | B1 | 11/2005 | Dimario et al. | |
| 7,093,408 | B2 | 8/2006 | Duperray et al. | |
| 7,131,941 | B2 | 11/2006 | Makar et al. | |
| 7,174,698 | B2 | 2/2007 | Spatafora et al. | |
| 7,243,481 | B2 | 7/2007 | Draghetti | |
| 7,326,165 | B2 | 2/2008 | Baclija et al. | |
| 7,404,788 | B2 * | 7/2008 | Monti | B65H 3/085 493/309 |
| 7,510,517 | B2 | 3/2009 | Goodman | |
| 7,682,122 | B2 | 3/2010 | Maynard et al. | |
| 7,720,567 | B2 | 5/2010 | Doke et al. | |
| 7,788,881 | B2 | 9/2010 | Johnson et al. | |
| 7,828,708 | B2 | 11/2010 | Huang et al. | |
| 7,832,183 | B2 | 11/2010 | Jacob et al. | |
| 7,988,406 | B2 | 8/2011 | Schafer | |
| 7,991,505 | B2 | 8/2011 | Lert, Jr. et al. | |
| 8,156,013 | B2 | 4/2012 | Dearlove et al. | |
| 8,340,812 | B1 | 12/2012 | Tian et al. | |
| 8,365,389 | B2 | 2/2013 | Taylor | |
| 8,622,883 | B2 | 1/2014 | Flynn | |
| 8,671,654 | B2 | 3/2014 | Langen | |
| 8,961,380 | B2 * | 2/2015 | Langen | B31B 50/28 493/183 |
| 9,061,477 | B2 | 6/2015 | Chandaria | |
| 9,090,400 | B2 | 7/2015 | Wurman et al. | |
| 9,114,897 | B2 | 8/2015 | Kim et al. | |
| 9,126,380 | B2 * | 9/2015 | Dittmer | B31B 50/00 |
| 9,315,344 | B1 | 4/2016 | Lehmann | |
| 9,336,509 | B1 | 5/2016 | Arun Singhal et al. | |
| 9,714,145 | B1 | 7/2017 | Lehmann | |
| 9,718,570 | B1 | 8/2017 | Ortiz et al. | |
| 9,796,080 | B2 | 10/2017 | Lindbo et al. | |
| 9,927,815 | B2 | 3/2018 | Nusser et al. | |
| 9,975,699 | B2 | 5/2018 | Yamashita | |
| 10,074,073 | B2 | 9/2018 | Stevens et al. | |
| 10,233,019 | B2 | 3/2019 | Lert | |
| 10,248,112 | B2 | 4/2019 | Zhu et al. | |
| 10,471,597 | B1 | 11/2019 | Murphy et al. | |
| 10,489,870 | B2 | 11/2019 | Asaria et al. | |
| 10,556,713 | B2 | 2/2020 | Langen | |
| 10,618,736 | B2 | 4/2020 | Khodl et al. | |
| 2003/0200111 | A1 | 10/2003 | Damji | |
| 2004/0112520 | A1 | 6/2004 | Hanschen et al. | |
| 2004/0148911 | A1 | 8/2004 | Hermodsson et al. | |
| 2004/0168408 | A1 | 9/2004 | Spatafora | |
| 2005/0079966 | A1 | 4/2005 | Moshier et al. | |
| 2006/0096242 | A1 | 5/2006 | Makar et al. | |
| 2006/0096712 | A1 | 5/2006 | Makar et al. | |
| 2006/0277269 | A1 | 12/2006 | Dent et al. | |
| 2007/0038673 | A1 | 2/2007 | Broussard et al. | |
| 2007/0072755 | A1 | 3/2007 | Monti | |
| 2007/0197364 | A1 | 8/2007 | Monti | |
| 2007/0204567 | A1 | 9/2007 | Wintring et al. | |
| 2008/0067225 | A1 | 3/2008 | Moore | |
| 2008/0110135 | A1 | 5/2008 | Jacob et al. | |
| 2008/0141632 | A1 | 6/2008 | Monti | |
| 2009/0239726 | A1 * | 9/2009 | Huang | B31B 50/787 493/309 |
| 2009/0277134 | A1 | 11/2009 | Jacob et al. | |
| 2009/0319395 | A1 | 12/2009 | Chandaria | |
| 2010/0263333 | A1 | 10/2010 | Langen | |
| 2011/0111939 | A1 | 5/2011 | Bassi | |
| 2011/0297559 | A1 | 12/2011 | Davis | |
| 2012/0094817 | A1 * | 4/2012 | Monti | B65B 43/185 271/271 |
| 2013/0039731 | A1 * | 2/2013 | Lundgren | B31B 50/786 414/815 |
| 2013/0218799 | A1 | 8/2013 | Lehmann et al. | |
| 2013/0247519 | A1 | 9/2013 | Clark et al. | |
| 2014/0260119 | A1 | 9/2014 | Baltes et al. | |
| 2015/0072847 | A1 | 3/2015 | Graham et al. | |
| 2015/0072848 | A1 | 3/2015 | Graham et al. | |
| 2015/0073587 | A1 | 3/2015 | Vliet et al. | |
| 2015/0225104 | A1 | 8/2015 | Reed | |
| 2015/0324893 | A1 | 11/2015 | Langen | |
| 2016/0129587 | A1 | 5/2016 | Lindbo et al. | |
| 2016/0304281 | A1 | 10/2016 | Elazary et al. | |
| 2018/0065807 | A1 | 3/2018 | Lert, Jr. | |
| 2018/0086019 | A1 | 3/2018 | Langen | |
| 2018/0126683 | A1 | 5/2018 | Johnson et al. | |

(56) References Cited

U.S. PATENT DOCUMENTS

| | | | |
|---|---|---|---|
| 2018/0150793 | A1 | 5/2018 | Lert, Jr. et al. |
| 2018/0327161 | A1 | 11/2018 | Helms |
| 2019/0152703 | A1 | 5/2019 | Sellner et al. |
| 2020/0039744 | A1 | 2/2020 | Lert et al. |
| 2020/0087010 | A1 | 3/2020 | Almogy et al. |
| 2020/0254707 | A1 | 8/2020 | Iwasa et al. |
| 2020/0406570 | A1 | 12/2020 | Hirata et al. |
| 2021/0016905 | A1 | 1/2021 | Lindbo et al. |
| 2021/0237385 | A1 | 8/2021 | Fridolfsson |

FOREIGN PATENT DOCUMENTS

| | | | |
|---|---|---|---|
| CA | 3023959 | A1 | 11/2017 |
| CA | 3044850 | A1 | 6/2018 |
| CN | 108891698 | A1 | 11/2018 |
| DE | 2250667 | C3 | 9/1980 |
| EP | 0559604 | A1 | 9/1993 |
| EP | 1177980 | A2 | 2/2002 |
| EP | 3337739 | B1 | 2/2020 |
| GB | 2 096 093 | A | 10/1982 |
| WO | 96/032322 | A1 | 10/1996 |
| WO | 2013/142106 | A1 | 9/2013 |
| WO | 2014/161644 | A2 | 10/2014 |
| WO | 2017/081281 | A1 | 5/2017 |
| WO | 2018/197400 | A1 | 11/2018 |
| WO | 2019/021281 | A2 | 1/2019 |

OTHER PUBLICATIONS

International Search Report issued by the Canadian Intellectual Property Office on Aug. 8, 2013, in connection with International PCT Patent Application No. PCT/CA2013/000230, 5 pages.
Written Opinion of the International Searching Authority issued by the Canadian Intellectual Property Office on Aug. 3, 2013, in connection with International PCT Patent Application No. PCT/CA2013/000230, 8 pages.
International Preliminary Report on Patentability issued by the Canadian Intellectual Property Office on May 26, 2015, in connection with International PCT Patent Application No. PCT/CA2013/000230, 9 pages.
Non-Final Office Action dated Mar. 26, 2018, mailed in the related U.S. Appl. No. 14/646,321.
Non-Final Office Action dated Apr. 10, 2023, mailed in the related U.S. Appl. No. 17/459,936.
Non-Final Office Action dated Jul. 7, 2017, issued in the related U.S. Appl. No. 14/396,516.
Final Office Action dated Nov. 27, 2020, issued in the related U.S. Appl. No. 15/864,918.
Non-Final Office Action dated Apr. 6, 2020, issued in the related U.S. Appl. No. 15/864,918.
Non-Final Office Action dated Dec. 27, 2021, issued in the related U.S. Appl. No. 15/864,918.
Non-Final Office Action dated Mar. 3, 2022, issued in the related U.S. Appl. No. 16/262,163.
International Search Report issued by the Canadian Intellectual Property Office on Jun. 27, 2013 in connection with International PCT Patent Application No. PCT/CA2013/000245 filed on Mar. 15, 2013, 5 pages.
Written Opinion of the International Searching Authority issued by the Canadian Intellectual Property Office on Jun. 27, 2013 in connection with International PCT Patent Application No. PCT/CA2013/000245 filed on Mar. 15, 2013, 6 pages.
International Preliminary Report on Patentability issued by the International Bureau of WIPO on Oct. 28, 2014 in connection with International PCT Patent Application No. PCT/CA2013/000245 filed on Mar. 15, 2013, 7 pages.
International Search Report issued by the Canadian Intellectual Property Office on Feb. 12, 2021 in connection with International Patent Application No. PCT/CA2020/051502, 6 pages.
Written Opinion of the International Searching Authority issued by the Canadian Intellectual Property Office on Feb. 12, 2021 in connection with International Patent Application No. PCT/CA2020/051502, 9 pages.
International Search Report issued by the Canadian Intellectual Property Office on Nov. 30, 2021, in connection with International Patent Application No. PCT/CA2021/051193, 4 pages.
Written Opinion of the International Searching Authority issued by the Canadian Intellectual Property Office on Nov. 30, 2021, in connection with International Patent Application No. PCT/CA2021/051193, 5 pages.
"WITRON realizes automated logistics center of E.Leclerc Socara", Video available online at: https://youtu.be/qLCSHUqhnYs, Oct. 8, 2018.
"THOMANN, New logistics centre for eCommerce-giant (english)", Video available online at: https://youtu.be/NRLpIXRqs78, Jun. 27, 2017.
"Inside A Warehouse Where Thousands Of Robots Pack Groceries", Video available online at: https://youtu.be/4DKrcpa8Z_E, May 9, 2018.
"Inside Alibaba's smart warehouse staffed by robots", Video available online at: https://youtu.be/FBI4Y55V274, Sep. 20, 2017.
"Automated warehouse solutions for CSH | SSI Schaefer", Video available online at: https://youtu.be/xKrQQYHMT-A, Oct. 8, 2018.
"Corrugated Boxes: How It's Made Step By Step Process | Georgia-Pacific", Video available online at: https://youtu.be/C5nNUPNVWAw, Mar. 16, 2015.
"AGV Automation—Food Industry", Video available online at: https://youtu.be/dVR8Qmq1Ytl, Nov. 7, 2016.
"RCE Random Robotic Case Erector Bottom Taper", Video available online at: https://youtu.be/WEHgWYnSDmk, Oct. 10, 2017.
Non-Final Office Action dated Apr. 19, 2022, mailed in the related U.S. Appl. No. 16/569,298.
Notice of Allowance dated Mar. 17, 2022, mailed in the related U.S. Appl. No. 16/677,139.
Non-Final Office Action dated Apr. 12, 2022, mailed in the related U.S. Appl. No. 16/808,140.
XPAK USA, LLC, XPAK Robox™—Robotic Random-Size Box Erector Brochure, http://www.xpakusa.com/pdf/XPAK%20-%20ROBOX%20Robotic%20Case%20Erector%20Model%20XP-E3000R.pdf (last printed Mar. 22, 2016).
Random Robotics Case Erector—obtained online https://motioncontrolsrobotics.com/product/random-robotic-case-erector/.
Robotics Case Erector and Installation Archive—obtained online from https://swspackaging.com/installations/robotic-case-erector-tote-tender-32217/.
"Pick2Pallet LED Light System—Designed for Order Picking", Video available online at: https://www.youtube.com/watch?v=msSBgPByolY, Jul. 11, 2017.
"Krones: Automatic order-picking system", Video available online at: https://www.youtube.com/watch?v=yU6OwsqETzl&t=84s, Feb. 15, 2010.
"New Concepts in Robotics for Distribution", Video available online at: https://www.youtube.com/watch?v=w7shAlf2Wjs, Apr. 19, 2011.
"DB Schenker implementing next generation e-commerce", Video available online at: https://www.youtube.com/watch?v=udr0OOxmPbc, Jan. 22, 2016.
"Advanced Automation with AutoStore Warehouse Robots", Video available online at: https://www.youtube.com/watch?v=ecftHVqxRpg&t=133s, Oct. 9, 2015.
"OPRA—Order Picking Robotic AGV", Video available online at: https://www.youtube.com/watch?v=yGhmOfAbi_U, Apr. 21, 2011.
"Smart automated machine loading with Pickit and Universal robots", Video available online at: https://www.youtube.com/watch?v=9fYcaisl1qY, Jun. 10, 2016.
"Pick it 3drobotvisionmadeeasy universalrobots depalletizing pallet crates flex", Video available online at: https://www.youtube.com/watch?v=- Js1DfvBq40, Jun. 9, 2016.
"Automated Bottle Pallet Unloader with FANUC Pick & Place Robot—Clear Automation", Video available online at: https://www.youtube.com/watch?v=qwbDX58FVFM, Sep. 2, 2016.

(56) References Cited

OTHER PUBLICATIONS

"Warehouse Pallet Robots and Pick Station", Video available online at: https://www.youtube.com/watch?v=S4H8_oX3SOY, Mar. 12, 2019.
"Swisslog ItemPiQ: Efficient robot-based automated item picking for order fulfillment", Video available online at: https://www.youtube.com/watch?v=qMsgnTq6C_s, Feb. 22, 2019.
"Solutech robot pallet picking", Video available online at: https://www.youtube.com/watch?v=rUrll1u64Qc, Mar. 26, 2015.
"Robotic order picking from pallets and flowracks by Robomotive", Video available online at: https://www.youtube.com/watch?v=O7641Lfo81c, Sep. 18, 2018.
"Full Layer Glass Bottle and Case Palletizer / Depalletizer", Video available online at: https://www.youtube.com/watch?v=PGajWaQ9jNg&t=75s, Dec. 17, 2013.
"Pack, Seal & Palletize—Garbage Bag Rolls", Video available online at: https://www.youtube.com/watch?v=qFHUX6bqXcg, Sep. 24, 2019.
"Robotic Palletizing Cell with Accumulation—HSC & RSC Cases", Video available online at: https://www.youtube.com/watch?v=mF0yF5hTrZ8, Dec. 18, 2019.
"VPick ™ Robot Guidance for Mixed Case Depalletizing", Video available online at: https://www.youtube.com/watch?=z-FbC2CMmus&t=60s, Apr. 19, 2019.
"AQFlex® XS: advanced performance and unique agility in a compact design", Video available online at: https://www.youtube.com/watch?v=prxl8DnJjTw, May 5, 2017.
"Intralox ARB Technology, Enabling Rapid Depalletizing (6 of 6)", Video available online at: https://www.youtube.com/watch?v=1kdMZCxiElc, Dec. 9, 2011.
"Depalletizing Robot | Autotec Solutions", Video available online at: https://www.youtube.com/watch?v=8yOsG4t41Hc, Jul. 17, 2018.
"Autotec Solutions", Video available online at: https://www.youtube.com/channel/UCEtJjzx-G7nGvYgKqB4yitg, Jun. 27, 2018.
"Intralox ARB Depalletizing Systems", Video available online at: https://www.youtube.com/watch?v=YIRbmxGlzj4, Mar. 31, 2014.
"Combi RCE Robotic Random Case Erector installed by SWS Packaging", Video available online at: https://youtu.be/9-W9gfCtZhE, Aug. 13, 2017.
"Palletizing and Depalletizing | Honeywell Intelligrated", Video available online at: https://www.youtube.com/watch?v=8nFn6xnnTbc&t=83s, Oct. 4, 2018.
"The Magic Bus: A fully automated can depalletizer with pallet management", Video available online at: https://www.youtube.com/watch?v=y073yPWZSx0&t=258s, Apr. 9, 2020.
"Dual Case Robotic Palletizing System with Corner Board Stretch Wrapper—Kaufman Engineered Systems", Video available online at: https://www.youtube.com/watch?v=h4tyZt2seVE, May 12, 2017.
"Automated Depalletizing System Uses FANUC Robots for Complex Depalletizing—PASCO", Video available online at: https://www.youtube.com/watch?v=VVz3xNIjYAk, Jan. 16, 2015.
"Automated Pallet Jack Order Selection.wmv", Video available online at: https://www.youtube.com/watch?v=g _-V31UL4Ww&t=98s, Mar. 5, 2010.
"System Logistics APPS: Automatic Pick to Pallet System", Video available online at: https://www.youtube.com/watch?v=v5bPGIgENP8, Oct. 15, 2013.
"A look inside one of Amazon's robotic fulfillment centers", Video available online at: https://youtu.be/YL9XjyXsKKk, Jan. 2, 2019.
"Poly bagmaker inserter FLEXIM-31", Video available online at: https://youtu.be/D88VRdm68mk, Mar. 20, 2017.
"Automatic Horizontal Baler / Baling Press Machine (HBA150-110130)", Video available online at: https://youtu.be/vbAbSLBSyY, Jun. 28, 2018.
"Inside Amazon's Fulfillment Center in Kent, Washington", Video available online at: https://youtu.be/Zm0toTbg8J4, May 31, 2018.
"The Grand Theory of Amazon", Video available online at: https://youtu.be/UyohSu-Ft_U, Jun. 2, 2018.
"How Amazon Receives Your Inventory", Video available online at: https://youtu.be/dAXdeqcHBp4, Dec. 23, 2013.
"Inside An Amazon Warehouse on Cyber Monday", Video available online at: https://youtu.be/qRQwkJLRfWw, Nov. 28, 2016.
"Inside Edition Producer Goes Undercover to Deliver Amazon Packages", Video available online at: https://youtu.be/YzdEQJ9V-8M, Nov. 20, 2018.
"I went undercover as an Amazon delivery driver. Here's what I learned about the hidden costs of free shipping", Title retrieved at: https://www.thestar.com/news/investigations/2019/12/19/i-went-undercover-as-an-amazon-delivery-driver-heres-what-i-learned-about-the-hidden-costs-of-free-shipping.html, Dec. 19, 2019.
"Automated Decasing System Uses Six FANUC Robots to Decase Bottles—StrongPoint Automat", Video available online at: https://youtu.be/bTkz4RYkevQ, May 20, 2016.
"Automated labeling and palletizing, courtesy of StrongPoint Automation", Video available online at: https://youtu.be/X6ukaEe_vOM, Jan. 24, 2020.
"New Concepts in Robotics for Distribution", Video available online at: https://youtu.be/w7shAlf2Wjs, Apr. 19, 2011.
"Fruits Picking with FANUC", Video available online at: https://youtu.be/Xq2yTJs8NXI, Jun. 30, 2019.
"The Warehouse of the Future—WITRON's OPM Technology at Meijer in Wisconsin", Video available online at: https://youtu.be/bn5jVKhFUs, Mar. 29, 2017.
"AutoStore | The Future of Warehousing is Reality | English", Video available online at: https://youtu.be/b3X3r5UVtEM, Jul. 29, 2015.
"Order Fulfillment Process", Video available online at: https://youtu.be/jqaJAfmBvBM, Mar. 7, 2015.
"E-Commerce Automation at Newegg's Robotic Distribution Center", Video available online at: https://youtu.be/ZBRoXW6YtGI, Oct. 16, 2018.
"Picking: A logistics centre sectored in different areas", Video available online at: https://youtu.be/9KAXH-D05XU, Mar. 31, 2017.
Non-Final Office Action dated Jan. 4, 2023, issued in the related U.S. Appl. No. 17/857,405.
Non-Final Office Action dated Oct. 16, 2023, mailed by the USPTO in the related U.S. Appl. No. 16/262,163.

* cited by examiner

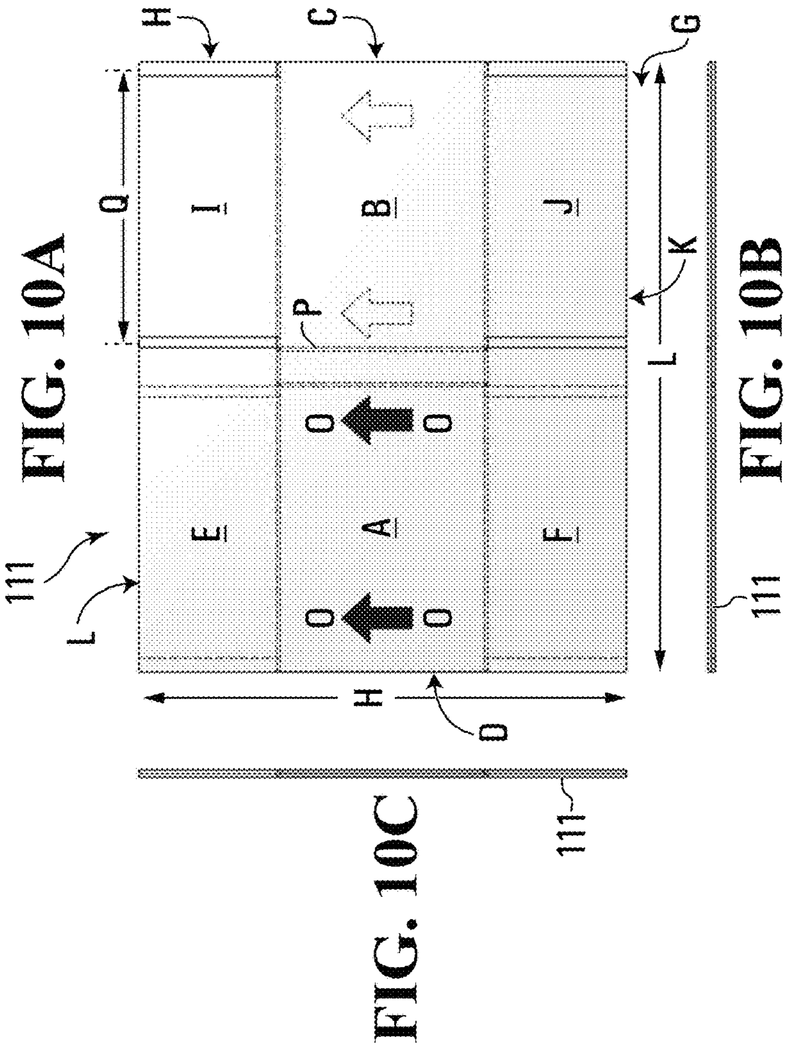
FIG. 10A
FIG. 10B
FIG. 10C
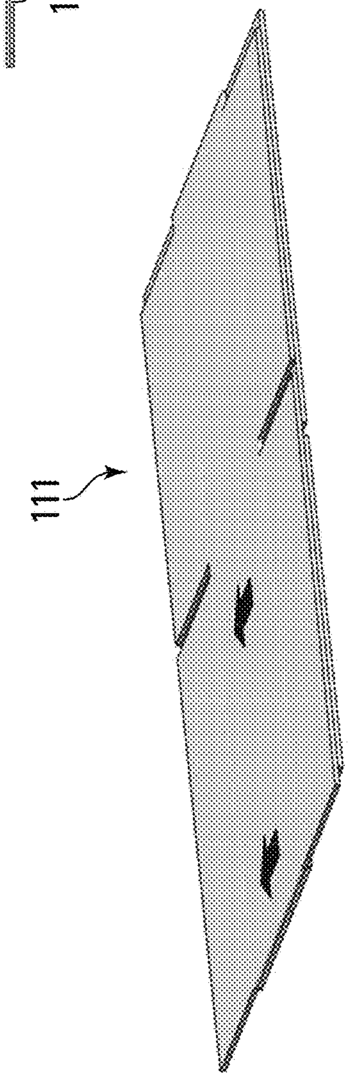
FIG. 10D
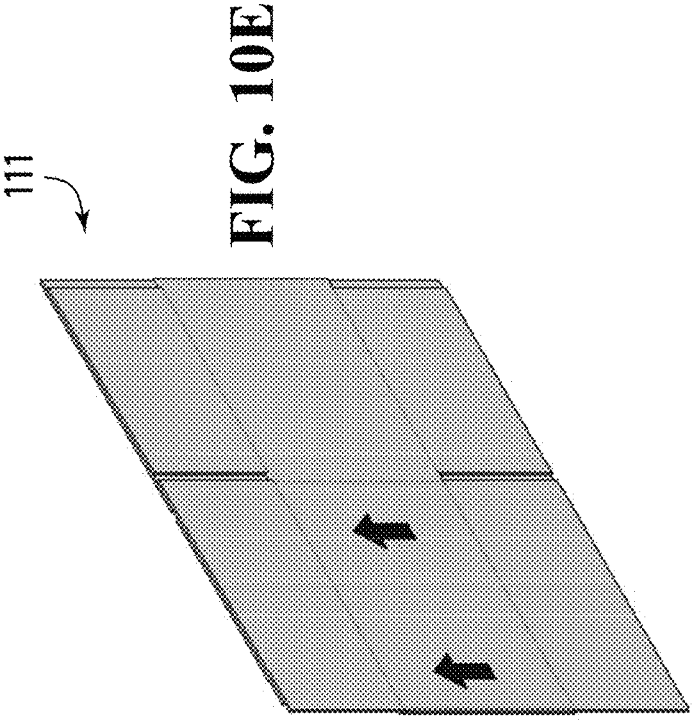
FIG. 10E

METHOD AND APPARATUS FOR FORMING CONTAINERS

CROSS-REFERENCE TO RELATED APPLICATIONS

This application is a Continuation of U.S. patent application Ser. No. 15/864,918 filed on Jan. 8, 2018, which is a Continuation of U.S. patent application Ser. No. 14/396,516 filed on Oct. 23, 2014, which is a National Phase Entry of international PCT Patent Application Serial No. PCT/CA2013/000245 filed on Mar. 15, 2013, designating the United States, and which claimed the benefit of priority based upon U.S. Provisional Patent Application Ser. No. 61/637,665 filed on Apr. 24, 2012. The contents of the aforementioned applications are incorporated by reference herein.

FIELD OF THE INVENTION

The present invention relates generally to methods and systems for forming containers.

BACKGROUND OF THE INVENTION

Containers are used to package many different kinds of items. One form of container used in the packaging industry is what is known generically as a "box" and it can be used to hold various items including products and sometimes other boxes containing products. Some in the packaging industry refer to boxes used to package one or more products as "cartons". Also in the industry there are containers/boxes that are known by some as "cases". Examples of cases include what are known as regular slotted cases (aka. "RSC"). Another type of container is what is known as a "tray" which generally is formed only on five sides and has a permanently open top. Some types of trays are used to hold other boxes or cartons; some types of trays are used to hold products (e.g. trays are sometimes used to hold bottled water). In this patent document, including the claims, the words "carton" and "cartons" and "containers" are used collectively to refer to boxes, cartons, trays, and/or cases that can be used to package any type of items including products and other cartons.

Cartons come in many different configurations and are made from a wide variety of materials. However, many cartons are foldable and are formed from a flattened state (commonly called a carton blank). Cartons may be made from an assortment of foldable materials, including but not limited to cardboard, chipboard, paperboard, corrugated fibreboard, other types of corrugated materials, plastic materials, composite materials, and the like and possibly even combinations thereof.

In many known systems, carton blanks may be serially retrieved from a carton magazine, and reconfigured from a flattened state into an erected state, and placed in a slot on a carton conveyor. The erected carton may then be moved by the carton conveyor to a loading station where the carton may be filled with one or more items and then sealed.

To permit the carton blanks to be readily opened up into an erected state from a flattened state, the blanks may be held in the magazine in a generally completely flattened configuration and then can be folded and sealed such as by gluing or taping panels and or flaps/together to form an erected carton. Specialized apparatuses that can handle only flat, unfolded and unsealed blanks for cartons are known.

However, some blanks are provided to users not in a flat, unfolded and unsealed form, but rather in what is known as a "knock-down" blank or "KD". A KD blank may be provided in a partially folded configuration and be partially glued or otherwise sealed along one side seam thus being formed in a generally flattened tubular shape. Accordingly, each carton may require opposite panels to be pulled apart and reconfigured from a flattened tubular configuration to an open tubular configuration that is suitable for delivery to a carton conveyor. The carton blank may then have one side closed by folding and sealing the bottom flaps, and then be filled from the opposite side while on the carton conveyor. Also, any required additional flap folding and sealing such as with glue or tape can be carried out to enclose and completely close and seal the carton with one or more items contained therein. Alternately, for example the erected carton blank can be reoriented from a side orientation to an upright orientation with the opening facing upwards. The erected carton can then be moved to a loading station or loading system where it is top loaded with one or more items, such as products or other carton containing products. The top opening can then be closed by folding over and sealing the top flaps.

However, the forming of a carton ready to be filled with a product, using such a tubular carton blank that is flattened but partially glued along one side seam has in the past involved quite complex machinery. Typically, tubular carton blanks are held in a magazine with the blanks being in an angled but generally downwardly disposed orientation. Another apparatus referred to as a carton erector or carton feeder fulfils the functions of retrieving the carton from the magazine, opening the flattened carton up into a generally tubular configuration, and then placing it on a carton conveyor. The carton feeder typically has suction cups and will move in a generally arcuate path between the various stations for retrieval, opening and discharge. Examples of such carton feeders are disclosed in U.S. Pat. No. 5,997,458 to Guttinger et al. issued Dec. 7, 1999, and U.S. Pat. No. 7,326,165 issued to Baclija et al. on Feb. 5, 2008, the contents of both of which are hereby incorporated herein in their entirety. Other similar types of carton erectors may retrieve blanks in series from a magazine using suctions cups, open the blanks using some other kind of mechanism such as carton breaker, and then feed the opened blanks to belt mechanisms which can pass the blanks to a carton conveyor to transport the blank. However, in such systems, difficulties arise in designing system components that can achieve a clean retrieval and handoff by the carton feeder/erectors apparatus.

Some carton forming systems and blanks are specifically adapted to forming a blank into a carton that can be top-loaded with a product. In some such known systems, a carton magazine may hold a number of blanks that are completely unfolded and unglued and which lie completely flat in a stack in the magazine. However, currently quite complicated systems are required in order to fold and configure the blank so that it is suitable to receive one or more items. One known type of such system involves the use of a specially configured shoe device and associated plunger. A flattened blank can be retrieved from a magazine and then be placed above an opening in the shoe and the plunger can push the blank into a cavity formed in the shoe. The configuration of the shoe is such that various panels and flaps that make up the blank will be folded in relation to each other as the blank is pushed into and sometimes through the cavity by the plunger. The result is that a general carton shape is produced that may be further folded and glued to place the carton into a form suitable for delivery to a carton conveyor. Alternatively, the carton blank may be pre-formed with interlocking panels that once the blank is folded within the shoe device, side panels will interlock with each other to form a carton that maintains its form without the use of glue (e.g. “Klick-Lok™” carton blanks). Such cartons are formed with open tops. Once delivered to a carton conveyor the carton may be moved to a station where an item can be placed in the carton. Thereafter any required additional panel folding and gluing can be carried out to enclose and fully seal the carton. Other similar types of arrangements can be employed for forming carton blanks into open top trays that can, once erected, be loaded with products or other cartons.

However there are also significant drawbacks to these carton-forming systems. For example, a different shoe (and possibly plunger as well) may be required for each different sized/shaped carton blank. Additionally extraction of the formed carton from the shoe may require additional relatively complex machinery, if the blank does not pass through the shoe. This method of carton forming is also relatively slow and may only be able to form cartons of limited depth.

In the formation of cartons from a corrugated or otherwise strengthened material such as a corrugated fibreboard material, it is also typically necessary as part of the forming process to fold over various parts of a blank made from a corrugated fibreboard material. However, current folding processes and machines are relatively complex.

Accordingly, an improved forming method and system is desirable which can readily form a container such as a carton from a generally flat blank.

SUMMARY OF THE INVENTION

According to one aspect of the present invention there is provided a system for forming a container from a tubular blank comprising a plurality of panels and flaps interconnected to provide a generally flattened tubular configuration, wherein the plurality of panels comprise a first panel, and a second panel interconnected to the first panel, the second panel being rotatable relative to the first panel, the system comprising: a first engagement device for engaging the first panel of the blank; a second engagement device for engaging the second panel of the blank, the second engagement device being located on a panel rotating apparatus operable to rotate the second panel of the bank from a first orientation wherein the first panel is generally parallel to the first panel, to a second orientation wherein second panel is oriented at an angle to the first panel, such that the generally flattened tubular blank may be reconfigured from a generally flattened configuration to an open configuration.

According to another aspect of the present invention there is provided a system for forming a container from a tubular blank comprising a plurality of panels and flaps interconnected to provide a generally flattened tubular configuration, wherein the plurality of panels comprise a first panel, and a second panel interconnected to the first panel, the second panel being rotatable relative to the first panel, the system comprising: (a) a magazine for storing a stack of blanks in a generally flat configuration; (b) an erector head for retrieving a carton blank from the stack in the magazine and opening the carton blank, the erector head comprising: (i) a first engagement device for engaging the first panel of the blank; and (ii) a second engagement device for engaging the second panel of the blank; the second engagement device being located on a panel rotating apparatus operable to rotate the second panel of the blank from a first orientation wherein the first panel is in a generally parallel relation to the second panel, to a second orientation wherein second panel is oriented at an angle to the first panel, such that the generally flattened tubular blank may be reconfigured from a generally flattened configuration to an open configuration; (c) a folding and sealing apparatus; (d) a movement system having at least one movement apparatus connected to the erector head for moving the erector head along a cyclical path extending between the magazine and the folding and sealing apparatus.

According to another aspect of the present invention there is provided a movement apparatus for handing a blank of a container, the movement apparatus comprising: a vertical movement device, the vertical movement device adapted for connection to a first erector device; a horizontal movement device connected to a frame, the horizontal movement device operable sliding longitudinal movement relative to the frame; the vertical movement device being interconnected to the horizontal movement device for vertical sliding movement relative to the horizontal movement device; a drive apparatus operable to drive the horizontal movement device horizontally and drive the vertical movement device vertically relative to the horizontal movement device; a controller to control the drive apparatus; whereby through operation of the drive apparatus, the controller can cause the vertical movement device and the horizontal movement device to move the erector device along a path in space having vertical and longitudinal components.

According to another aspect of the present invention there is provided a movement apparatus for handling a blank of a container, the movement apparatus comprising: a continuous belt; a generally vertically oriented support member having a first pulley positioned proximate an upper end of the belt support member, the support member adapted for connection to a first erector device; a slidable pulley block, the block being adapted for sliding longitudinal movement on a support member, and the block having a series of spaced pulleys, the vertical support member being interconnected to the pulley block for vertical sliding movement relative to the pulley block; first and second longitudinally spaced belt drives, each of the belt drives being independently operable to rotate at varying speeds and in the same and opposite directions to each other, the belt drives both operable to drive the belt on opposed sides of the vertical support member; a controller to control the speed and direction of rotation of the belt drives; the vertical support member being received adjacent the block and being supported by the belt for vertical sliding movement relative to the block, the belt extending from a fixed location on the vertical support tube upwards to a first pulley on the block, longitudinally to the first belt drive, from the first belt drive over a second pulley of the block, upwards to the first pulley of the vertical member, downwards to a third pulley of the block to the second belt drive; from the second belt drive and longitudinally to over a fourth pulley of the slide block, and then downward to a second fixed location of the vertical member; whereby through operation of the first and second belt drives, the controller can cause the vertically oriented support member and the first erector device connected thereto, to be moved up and down relative to the block and move longitudinally right and left with the block between the first and second belt drives with the block on the block support member such that the erector device follows a path in space having vertical and longitudinal components.

According to another aspect of the present invention there is provided a magazine for holding a stack of blanks, the magazine comprising: a conveyor for moving a stack of blanks longitudinally; a lateral stack alignment apparatus operable to align the blanks in the stack of laterally; a longitudinal stack alignment apparatus operable to align the blanks in the stack longitudinally.

According to another aspect of the present invention there is provided a system for forming a container from a blank comprising: (a) a magazine for storing a stack of blanks in a generally flat configuration; (b) an erector head for retrieving a carton blank from said stack in said magazine; (c) a folding and sealing apparatus; (d) a movement sub-system having at least one movement apparatus connected to said erector head for moving said erector head along a cyclical path extending between said magazine and said folding and sealing apparatus; (e) a controller operable to control the operation of said erector head; (f) an information reader operable to read information about a blank located in said magazine, said information reader being in communication with said controller, said controller controlling the operation of movement apparatus based on information provided by said information reader.

According to another aspect of the present invention there is provided a method of forming a container from a blank comprising: (a) reading information about a blank held in a magazine; (b) providing the information to a controller; (c) the controller controlling the operation of a system for processing the blank based on the information.

According to another aspect of the present invention there is provided a method for forming a container from a tubular blank, the blank comprising a plurality of panels and flaps interconnected to provide a generally flattened tubular configuration, where the plurality of panels comprise a first panel and a second panel interconnected to the first panel, the second panel being rotatable relative to the first panel, the method comprising: (a) orienting the blank in a generally flat orientation with the first and second panels being generally parallel to each other; (b) engaging the first panel; (c) engaging the second panel and rotating a second panel of the blank from the first orientation to a second orientation that is generally orthogonal to the first panel to open the tubular blank.

According to another aspect of the present invention there is provided a method for forming a container from a tubular blank, the blank comprising a plurality of panels and flaps interconnected to provide a generally flattened tubular configuration, where the plurality of panels comprise a first panel and a second panel interconnected to the first panel, the second panel being rotatable relative to the first panel, the method comprising: (a) retrieving a blank from a magazine storing a plurality of carton blanks in a generally flat tubular configuration; (b) transferring the retrieved blank from the magazine to an opening apparatus, the opening apparatus comprising: (i) a first engagement device for engaging the first panel of the blank; (ii) a second engagement device for engaging the second panel of the blank; the second engagement device being located on a panel rotating apparatus operable to rotate the second panel of the second panel from a first orientation wherein the first panel is in an opposed face to face relation with the first panel, to a second orientation wherein second panel is oriented at an angle to the first panel, such that the generally flattened tubular blank may be reconfigured to an open position; (c) engaging the first panel with the first engagement device; (d) engaging the second panel with the second engagement device; (e) rotating the second panel with the rotating device from a first orientation wherein the second panel is in an opposed face to face relation with the first panel, to a second orientation wherein second panel is oriented at an angle to the first panel, such that the generally flattened tubular blank is reconfigured to an open configuration.

According to another aspect of the present invention there is provided a system for forming a container from a blank comprising a plurality of panels and flaps interconnected to provide a generally flattened configuration, said system comprising: (a) a magazine for storing a stack of blanks in a generally flat configuration; (b) an erector device for retrieving a carton blank from said stack in said magazine a folding and sealing apparatus; (c) a movement system having at least one movement apparatus connected to said erector head for moving said erector device along a cyclical path extending between said magazine and said folding and sealing apparatus; (d) a controller for controlling the movement system to control the movement of said erector device along said path.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

FIGS. 10A-10E are a plan, front and side elevation views and two perspective views, of a blank for a regular slotted case shown is a generally flattened tubular configuration;

DETAILED DESCRIPTION

Figure 1A:
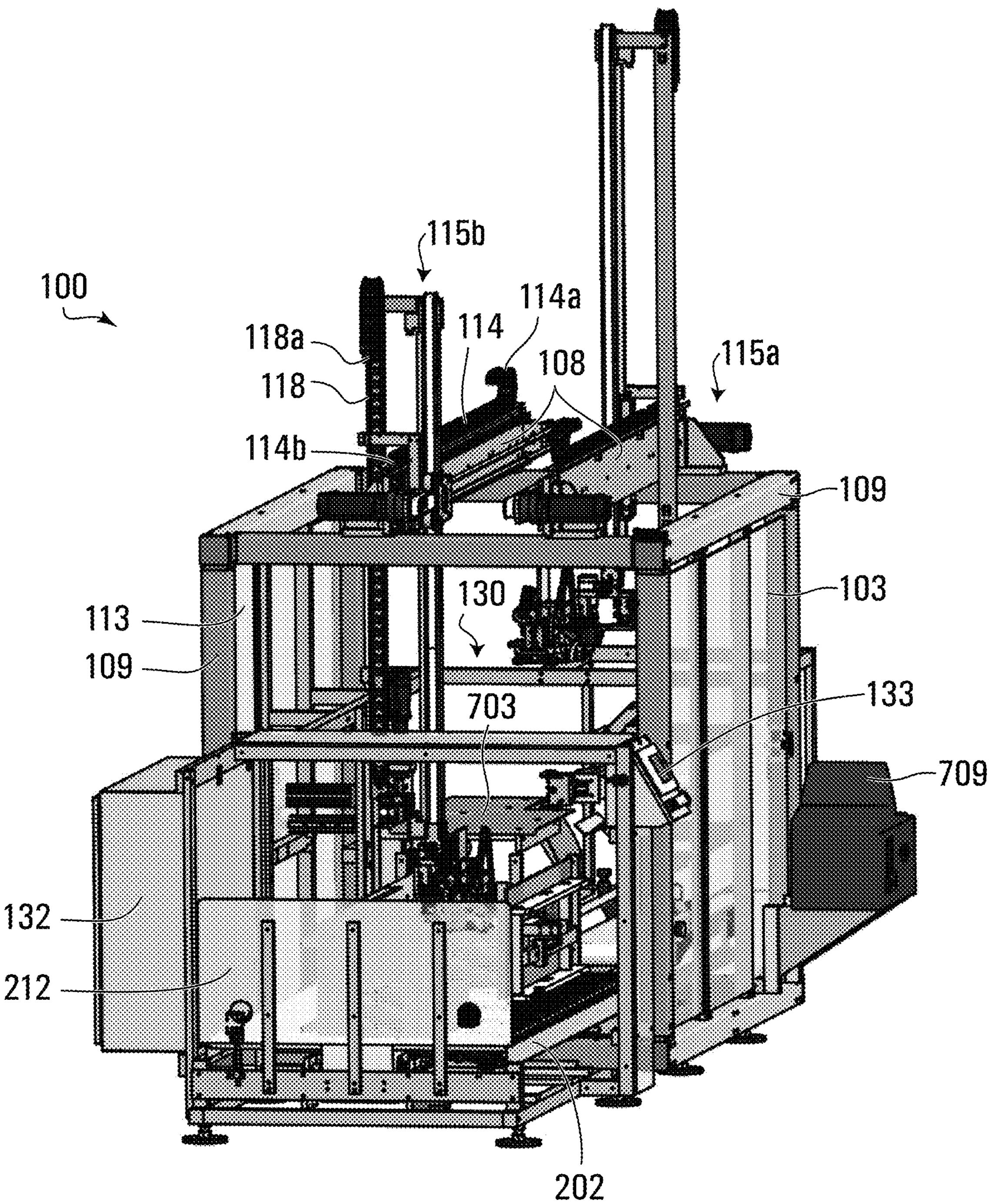
FIG. 1A is top right front perspective view of a carton forming system in accordance with an example embodiment of the present invention.

With reference initially to FIGS. 1A-3, in overview a carton forming system 100 may include a frame generally referred to as frame 109. The frame 109 may have integrated with it a series of panels 103 that may be made from a plastic or glass and that may or may not be transparent or semi-transparent. One or more of the panels 103 may be configured to operate as a hinged door so that interior portions of system 100 can be accessed. System 100 may also include a magazine 110 adapted to receive, hold and move a plurality of carton blanks 111 while in a substantially flat orientation. System 100 may include at least first and second erector heads 120*a*, 120*b* for retrieving carton blanks from the magazine 110. Erector heads 120*a*, 120*b* may pick up the carton blanks 111 from the magazine 110 and then manipulate the blanks in such a way that, with the assistance of other components of system 100, the carton blanks 111 are transformed into erected cartons.

The erector heads 120*a*, 120*b* may be moved by a movement sub-system. The movement sub-system may include one or more movement apparatuses. For example, erector head 120*a* may be mounted to and moved by a first moving apparatus 115*a*. Second erector head 120*b* may be mounted to and moved by a second moving apparatus 115*b*. In some embodiments only a single erector head and movement apparatus may be provided, but this may result in a lower production rate of erected cartons compared to when particularly two or possibly more, movement apparatuses and erector heads are provided, as illustrated in the drawings.

System 100 may also include a folding and sealing apparatus generally designated 130, which may be configured to fold one or more flaps of each carton blank and provide for sealing of one or more flaps as part of the process in forming fully erected cartons. In co-operation with erector heads 120*a*, 120*b*, a common folding and sealing apparatus 130 may be configured to handle in alternating sequence, carton blanks 111 carried by both erector head 120*a* and erector head 120*b*. System 100 may also include a carton discharge conveyor 117 for receiving and moving away carton blanks 111 once they have been fully erected.

The structural/mechanical components of system 100 may be made from any suitable materials. For example, frame members, and many of the parts that make up the erector heads 120, moving apparatuses 115, many of the components and parts that make up folding and sealing apparatus 130, and magazine 110, may be made of steel or aluminium, or any other suitable materials. Aluminum is particularly suitable for most parts. However, plates that hold the suction cups on the erector head and flanges that mount on gearbox shafts can be made from stainless steel for strength and hardness. Parts and components may be attached together in conventional ways such as for example by bolts, screws, welding and the like.

Figure 1B:
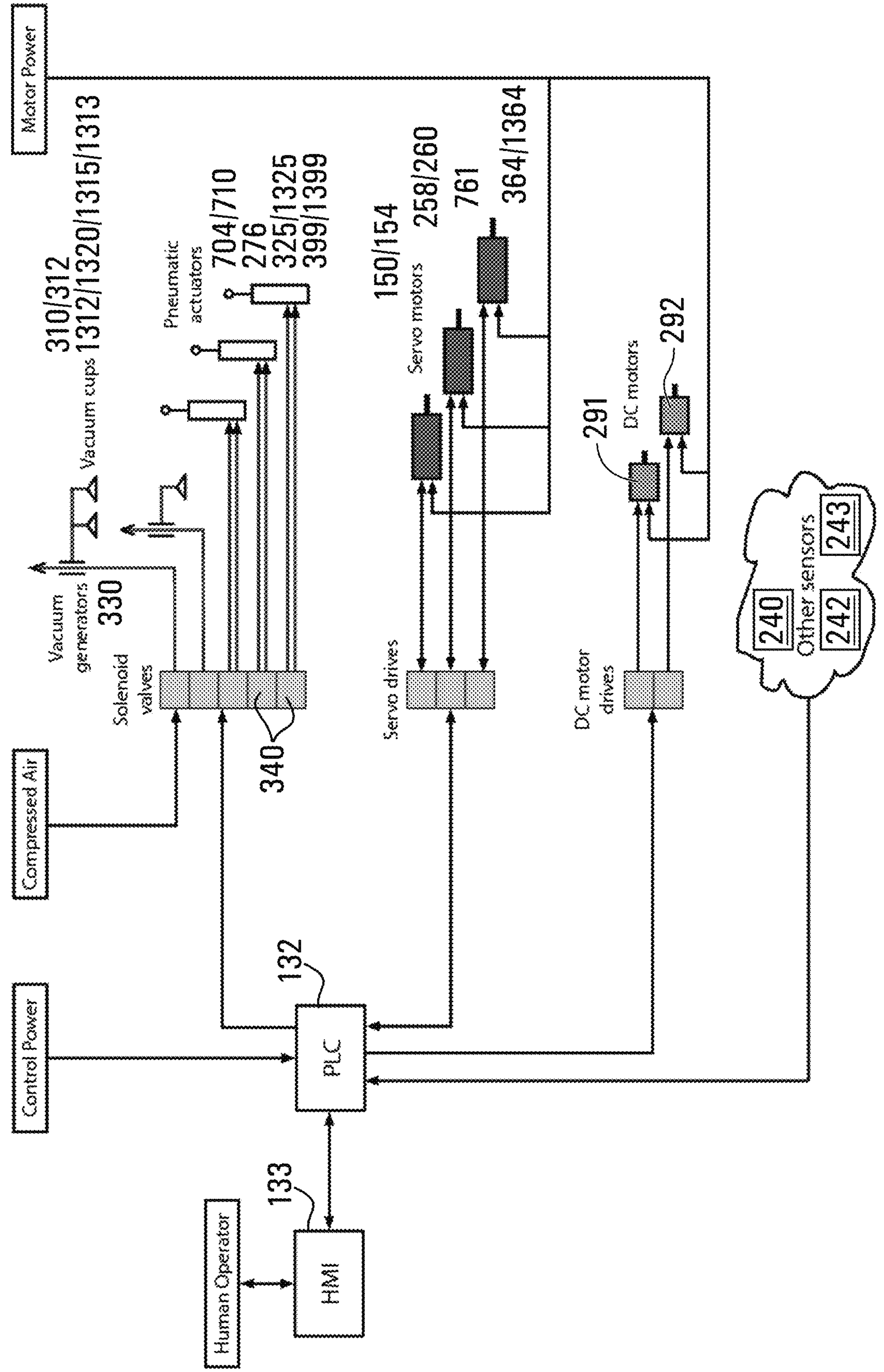
FIG. 1B is a schematic flow chart of the power and control sub-system of the carton forming system of FIG. 1A.
Figure 2:
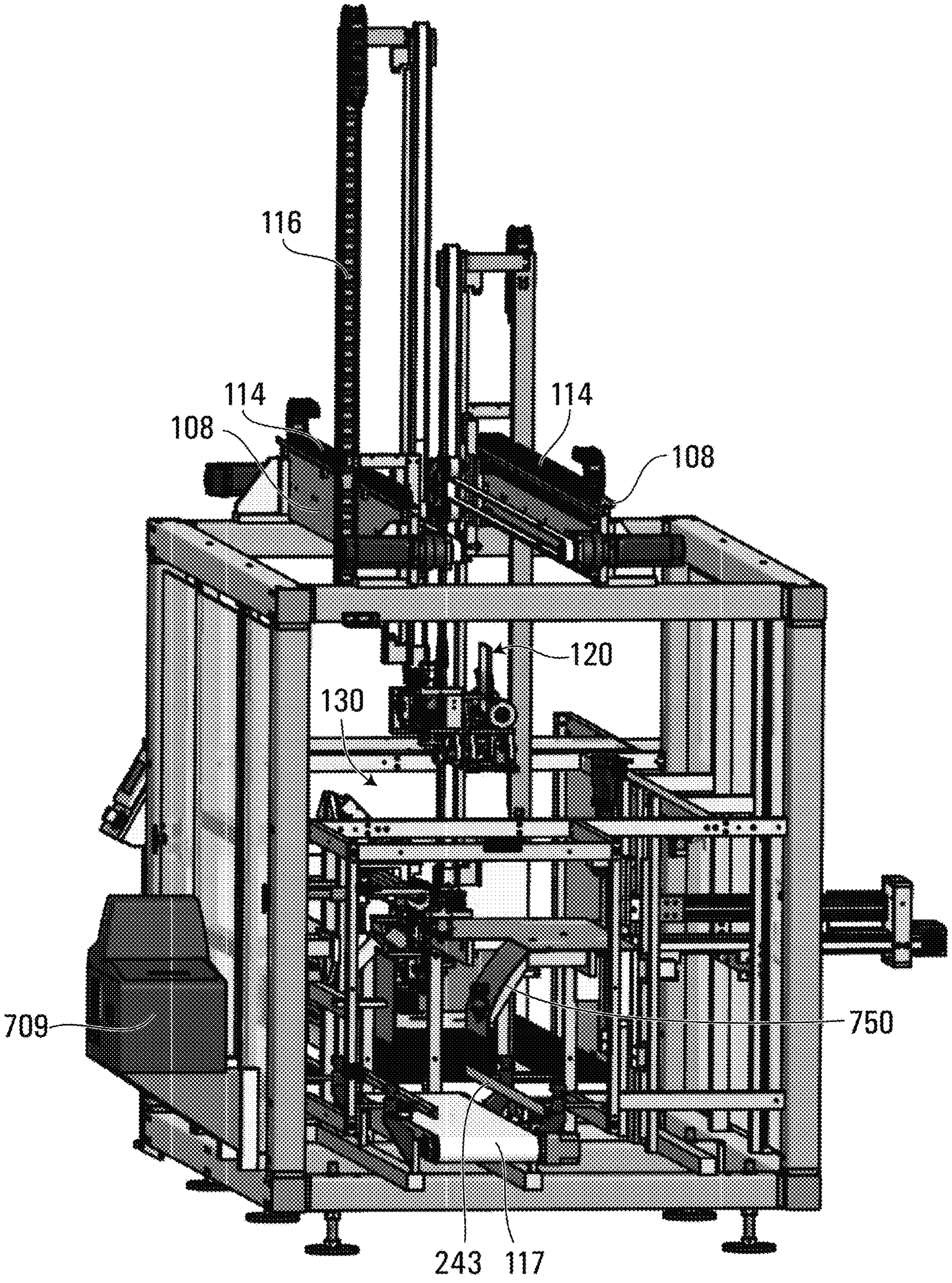
FIG. 2 is a top right rear perspective view of the carton forming system of FIG. 1A.
Figure 3:
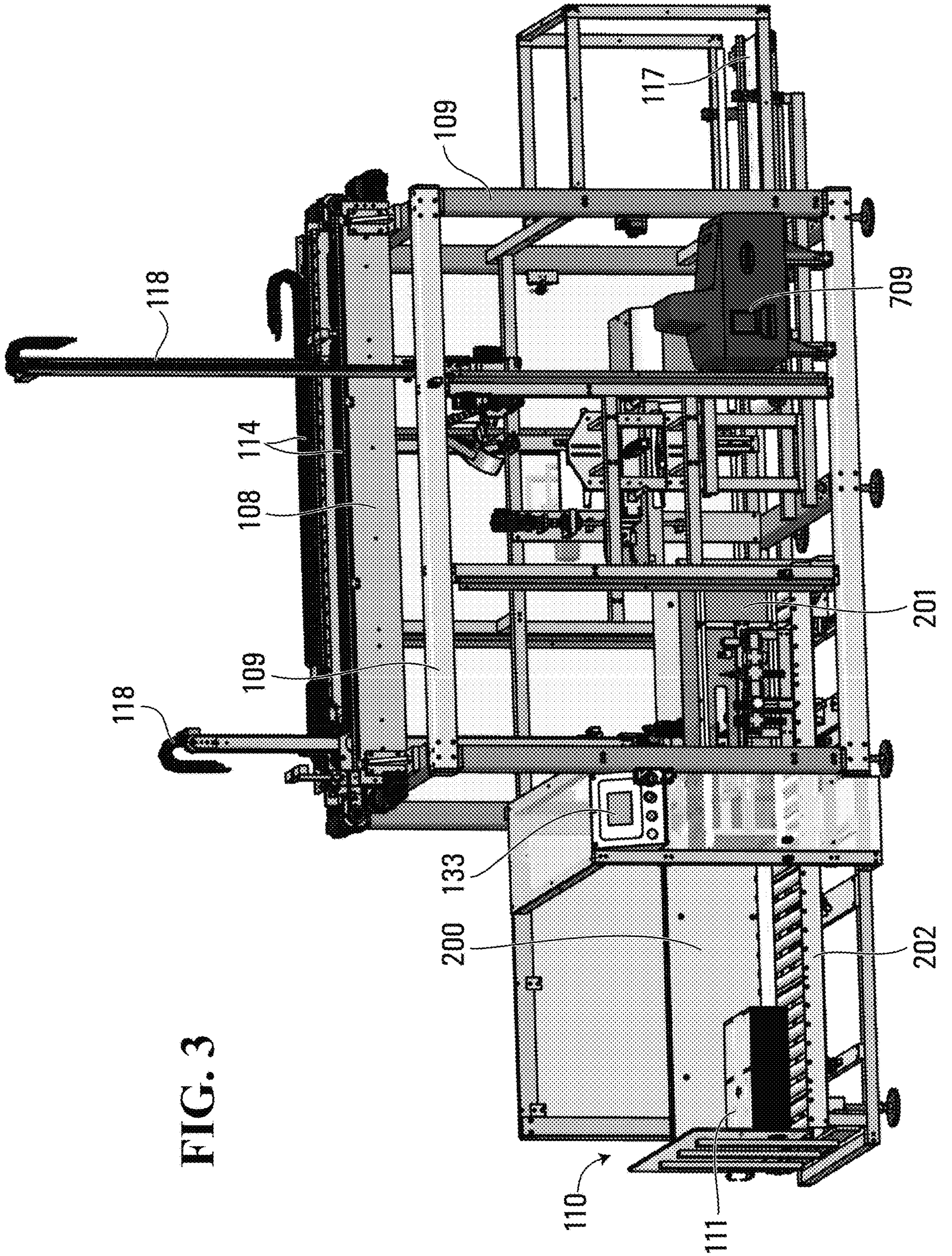
FIG. 3 is a top right side perspective view of the carton forming system of FIG. 1A.
Figure 4:
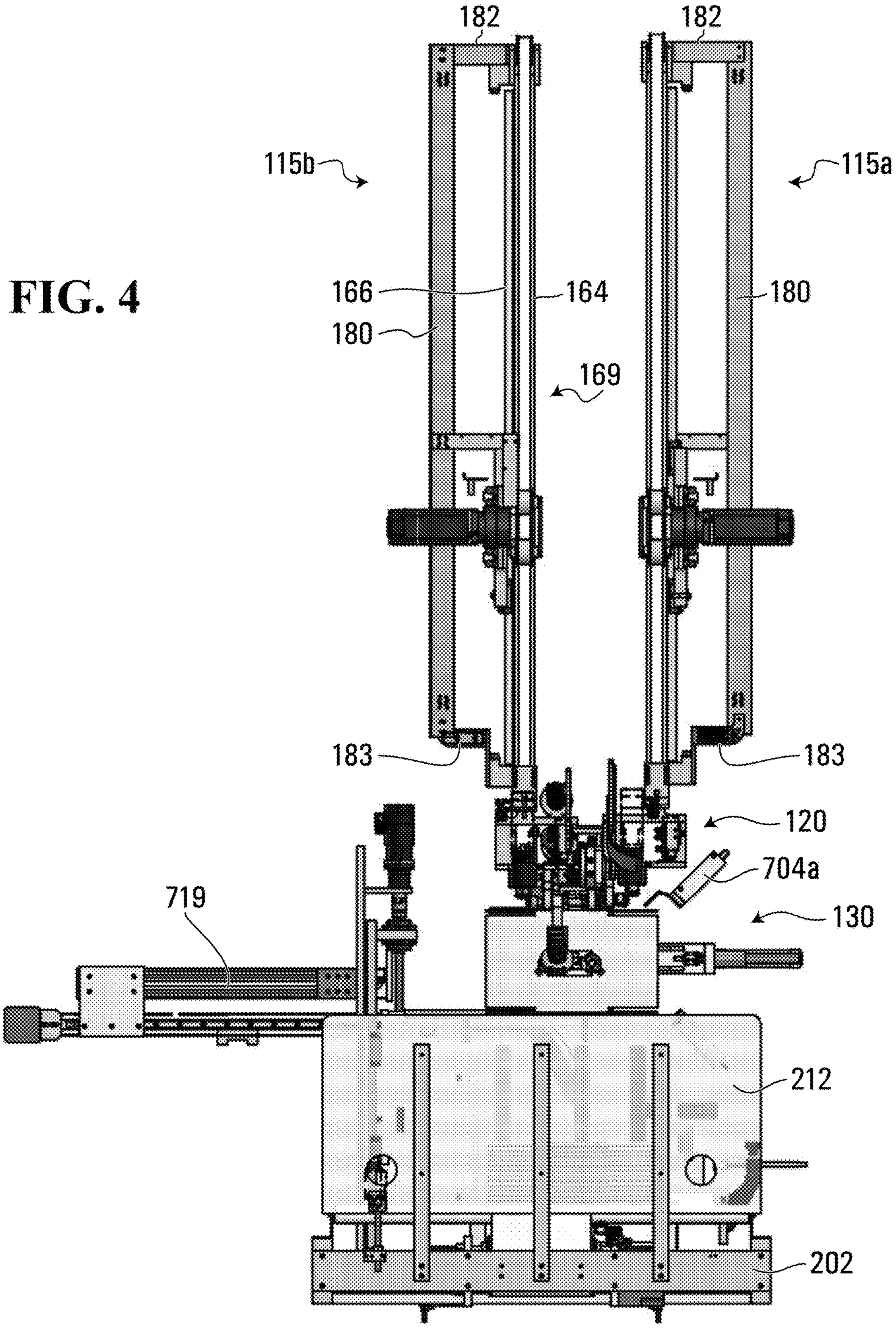
FIG. 4 is a front schematic elevation view of the carton forming system of FIG. 1A, but with several components omitted.
Figure 5:
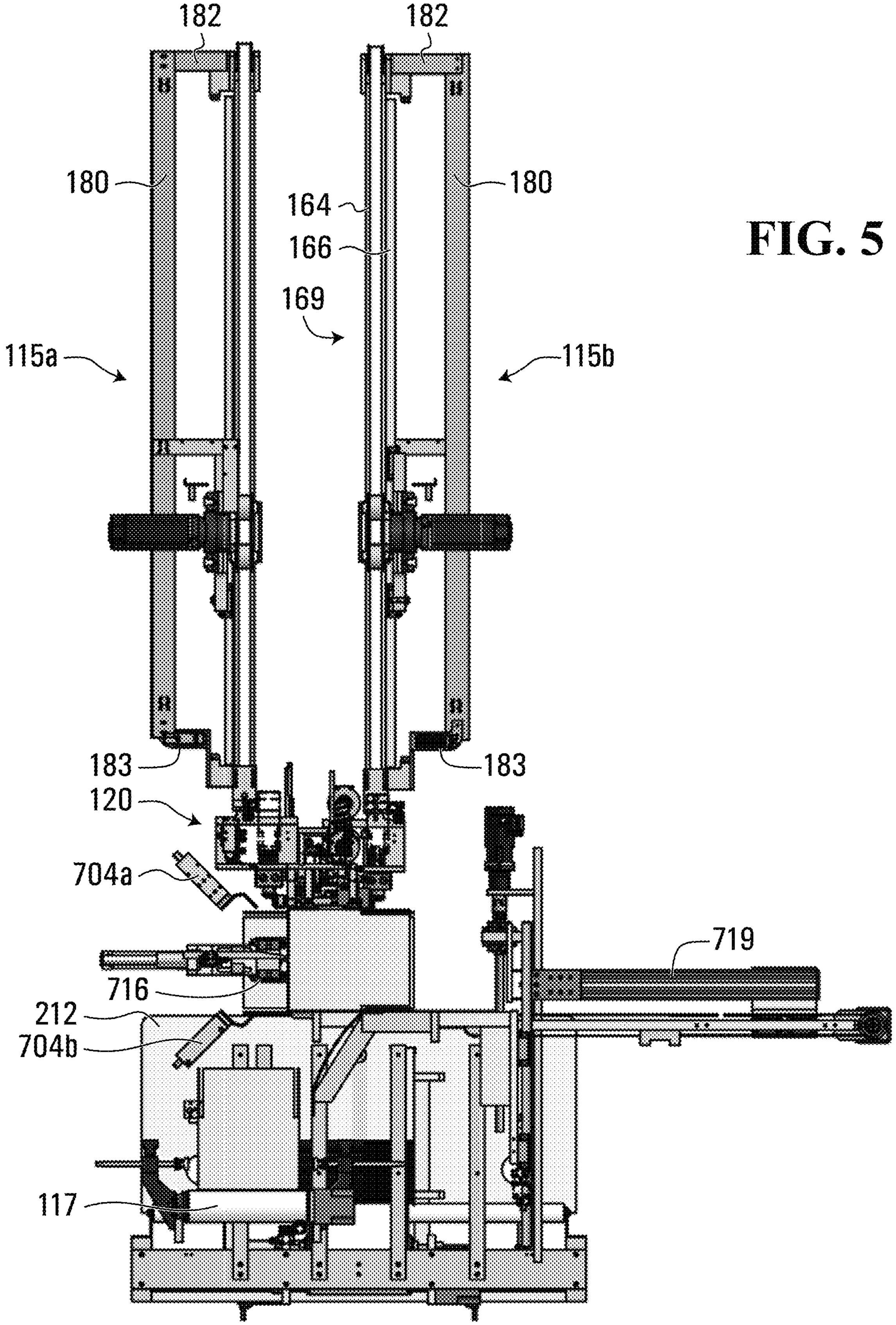
FIG. 5 is a rear schematic elevation view of the carton forming system of FIG. 1A but with several components omitted.
Figure 6A:
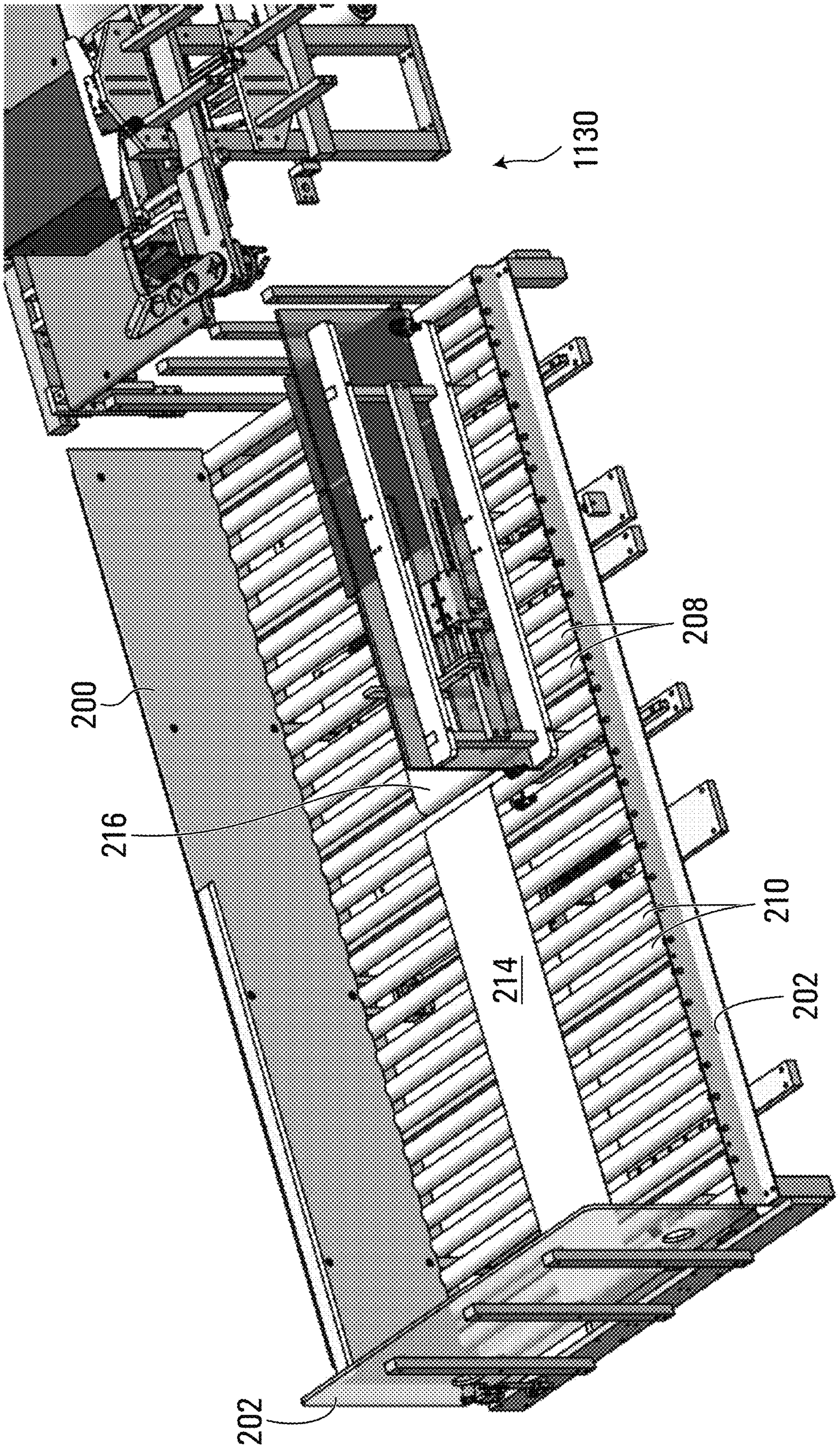
FIG. 6A is a top right perspective view of a magazine sub-system.
Figure 6B:
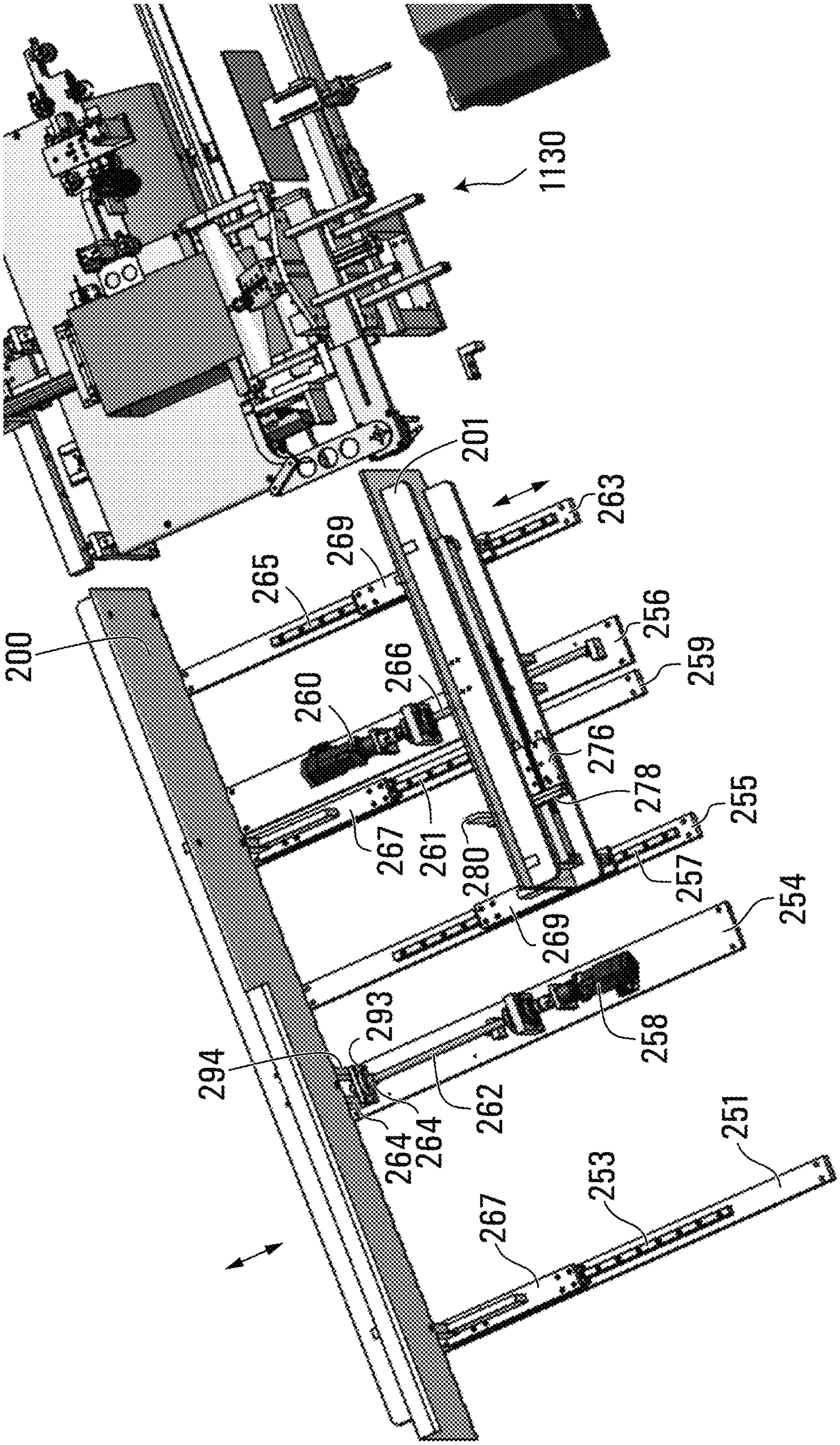
FIG. 6B is a top right perspective view of the magazine sub-system of FIG. 6A, but with several components omitted.
Figure 6C:
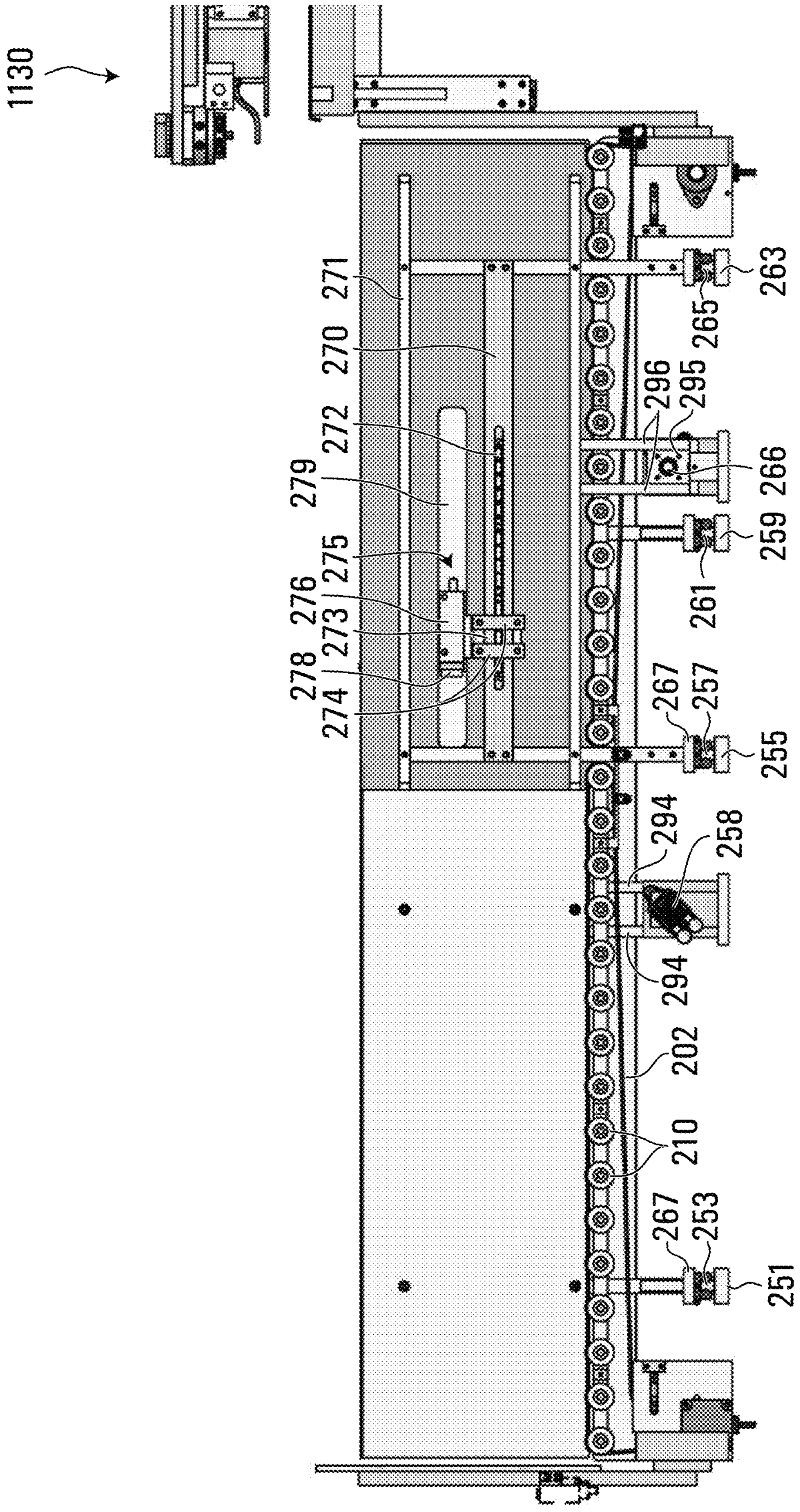
FIG. 6C is a right side elevation view of the magazine sub-system of FIG. 6A, but with several components omitted.
Figure 6D:
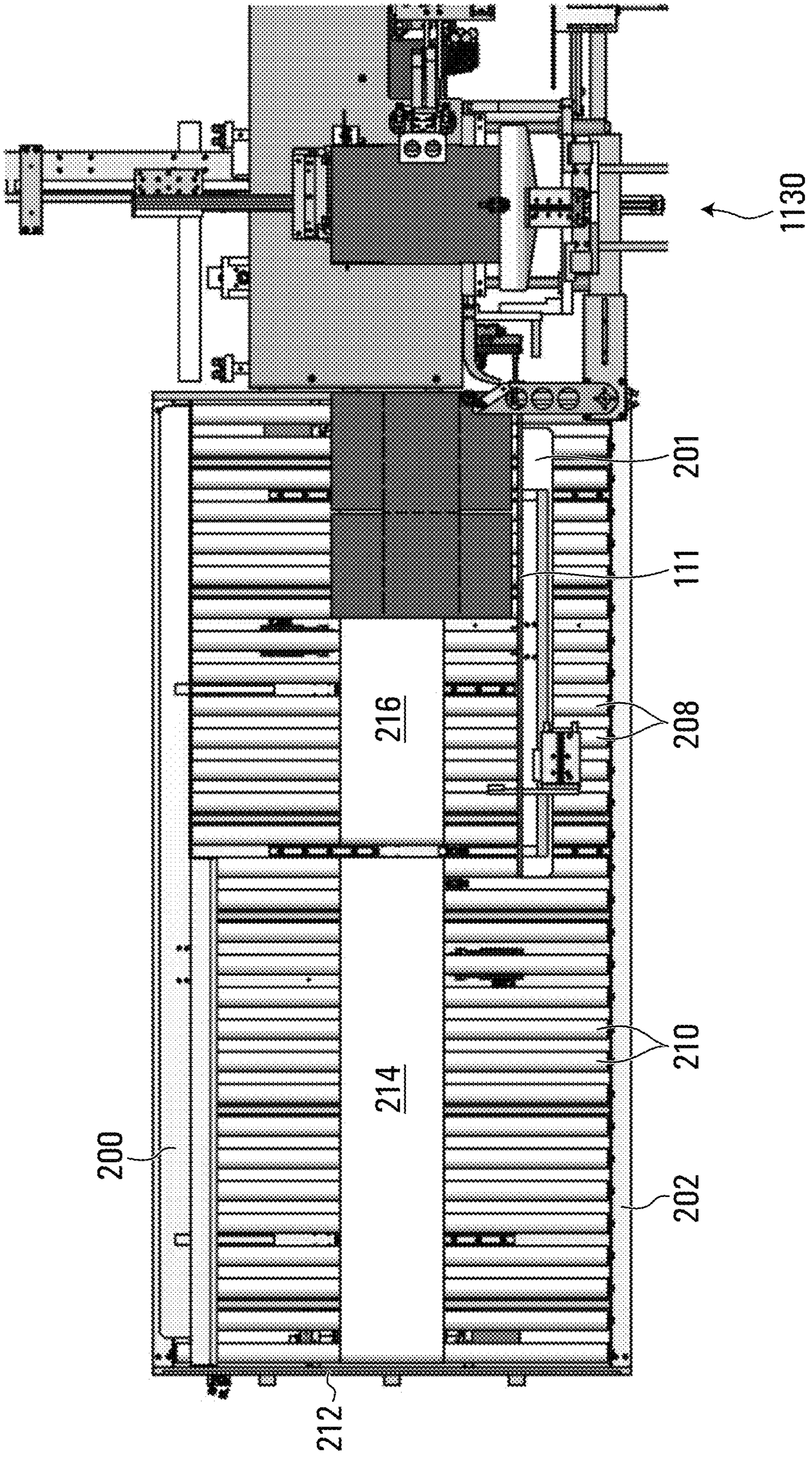
FIG. 6D is a top plan view of the magazine sub-system of FIG. 6A.

An example of a scheme for the power and data/communication configuration for system 100 is illustrated in FIG. 1*b*. The operation of the components of carton forming system 100, and of system 100 as a whole, may be controlled by a programmable logic controller ("PLC") 132. PLC 132 may be accessed by a human operator through a Human Machine Interface (HMI) module 133 secured to frame 109. HMI module 133 may be in electronic communication with PLC 132. PLC 132 may be any suitable PLC and may for example include a unit chosen from the Logix 5000 series devices made by Allen-Bradley/Rockwell Automation, such as the ControlLogix 5561 device. HMI module 132 may be a Panelview part number 2711P-T15C4D1 module also made by Allen-Bradley/Rockwell Automation. It should be noted that not all of the sensors, motors, servo motors, drives, vacuums, vacuum generators and vacuum cups described hereinafter are specifically identified in FIG. 1B.

Electrical power can be supplied to PLC 132/HMI 133, and to all the various servo motors and DC motors that are described further herein. Compressed/pressurized air can also be supplied to the vacuum generators and pneumatic actuators through valve devices such as solenoid valves that are controlled by PLC 132, all as described further herein. Servo motors may be connected to and in communication with servo drives that are in communication with and controlled by PLC 132. Similarly, DC motors may be connected to DC motor drives that are in communication with and controlled by PLC 132; again all as described further herein. Additionally, various other sensors are in communication with PLC 132 and may (although not shown) also be supplied with electrical power.

With reference now to FIGS. 10A-10E and 11A, an example of one kind of tubular carton blank 111 that can be processed by system 100 to form a regular slotted case (RSC) is disclosed. Other types of carton blanks, tubular carton blanks, and tubular carton blanks of different sizes can be processed by system 100.

Each carton blank 111 may be generally initially formed and provided in a flattened tubular configuration as shown in FIGS. 10A-10E. Each bank 111 has a height dimension "H"; a length dimension "L"; and a major panel Length "Q" (see FIG. 10B). By inputting each of these three dimensions for a blank to be processed by system 100, into PLC 132, PLC 132 can determine if the system 100 can process that size blank without the necessity for manual intervention to make an adjustment to one or more components of the system 100. If PLC 132 determines that the adjustment can be made without human intervention, the PLC may make the necessary adjustments to positions and/or movements of at least some of the components forming system 100, including the path of movement of erector heads 120*a*, 120*b* as the erector heads move and cycle through their processing sequences.

However, for some size blanks 111, PLC 132 may determine that human intervention of some kind is necessary to make set-up adjustments to the positioning/orientations of at least some of the components of the system to enable the system to process the blank and may accordingly inform an operator of system 100.

Blank 111 may have opposed major panels A and C integrally interconnected to a pair of opposed minor panels B and D to form a generally cuboid shaped blank when opened. An overlap strip of carton blank material may be provided between panel B and panel A that can be sealed by conventional means such as a suitable adhesive, to provide an overlapping seam joint in the vicinity of "P" (see FIG. 10A). This overlap may join the panels A, B, C and D into a continuous blank that is of generally flattened tubular configuration as shown in FIG. 10A. A number of such blanks 111, in a flattened configuration, can be delivered to the vicinity of system 100 that can be erected into the generally open tubular configuration shown for example in FIG. 11.

Also, as shown in FIGS. 10A-10E and 11, are upper side major and minor flaps E, H, L, I that are provided one side of the respective major and minor panels A-D. A second set of major and minor flaps F, G, K and J are also provided on the opposite, lower/bottom sides of the major and minor panels A-D. However, in other embodiments, cartons having other side panel configurations can be formed. The panels and flaps can be connected to adjacent flaps and/or panels by predetermined fold/crease lines (shown in broken lines). These fold/crease lines may for example be formed by a weakened area of material and/or the formation of a crease with a crease forming apparatus. The effect of the fold lines is such that one panel such as for example panel A can be rotated relative to an adjacent panel such as D or B along the fold lines. Flaps may also fold and rotate about fold lines that connect them to their respective panels.

Figure 11:
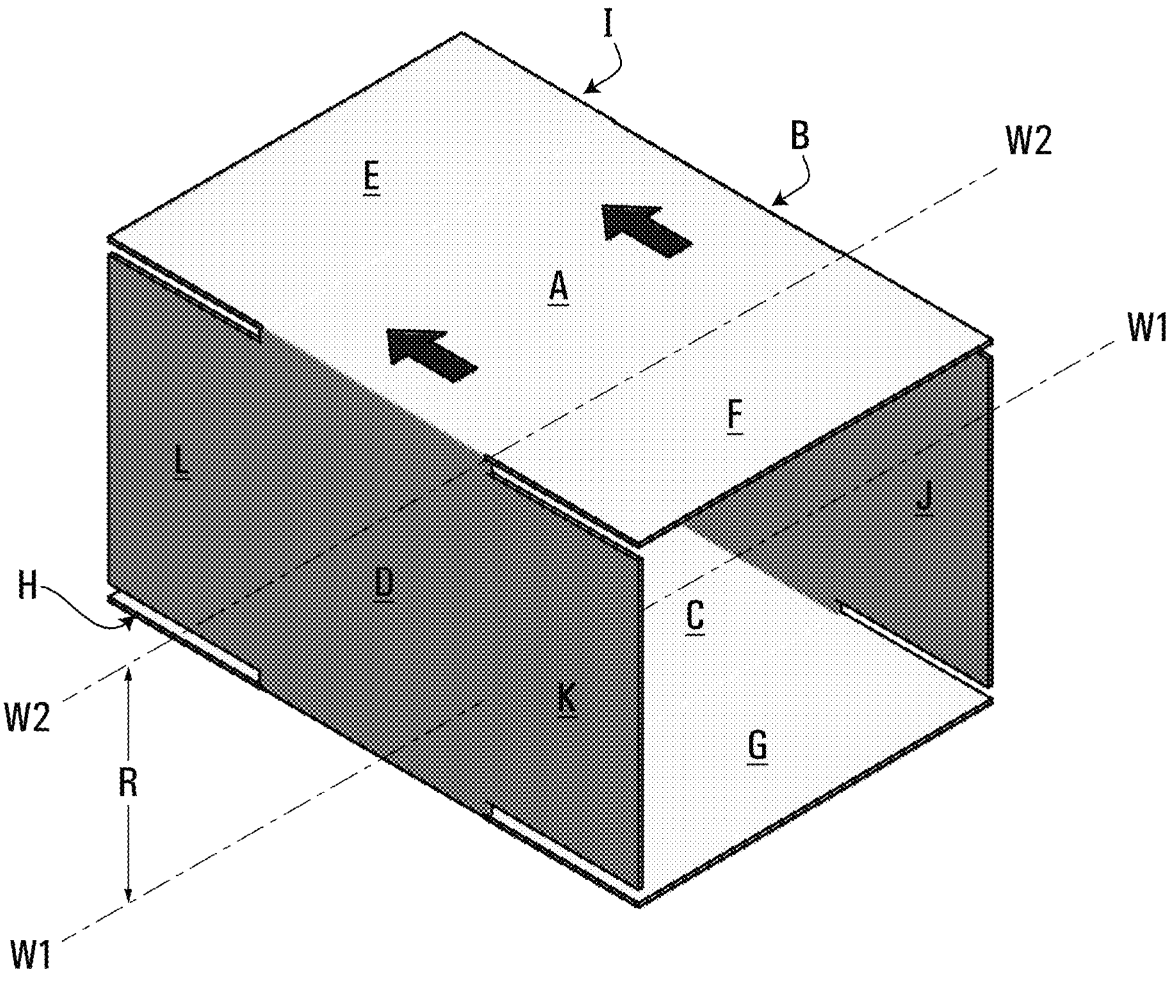
FIGS. 11-16 are schematic right perspective sequential views of a blank of FIGS. 10A to 10E configured in an open configuration being sequentially processed into an erected carton.

As shown in FIG. 11, blank 111 may be designated with a first datum line "W1" that passes through the mid-point of the fold line between panel D and flap K, and the mid-point of the fold line between panel B and flap J. This datum line W1 may be determined by PLC 132 for a particular blank or group of blanks 111 to be processed, based on the input of the dimensions H, L and Q of the blanks. Blank 111 may be designated with a second datum line "W2" that may be determined by PLC 132 and which passes along and is generally parallel to the fold line between panel D and flap K, and the mid-point of the fold line between panel A and flap F. Datum W1 will be parallel to Datum W2. PLC 132 may also determine the relative position of the bottom of the erected carton as this will be aligned with a vertical datum plane passing through Datum W1 and Datum W2. Aligning the position datum W2 and of the datum plane with other components in system 100 will ensure that the carton is properly positioned during processing through system 100. Also, the vertical distance R between datum W and the datum line W2 may be calculated by PLC 132. This can ensure that PLC 132 knows where it needs to position the erector head so that top panel A, and accordingly, datum W1 are properly positioned throughout the processing of the blank by system 100.

System 100 is able to track and modify the position of the blank 111, and in particular the vertical position of the datum line W1 of the blank as the blank moves longitudinally through system 100 and as various components of system 100 engage the blank 111 during its movements. This will ensure that the blank 111 being processed is appropriately positioned relative to the system components so that the system components engage the blank at the correct position on the blank during processing of the blank.

As will be described hereinafter, carton blank 111 may be transformed from a generally flattened tubular configuration to an open tubular configuration and the flaps may be folded and sealed to form the desired erected carton configuration. The carton may be configured as a top opening carton suitable to be delivered to a carton loading conveyor with an upwardly facing opening or with a sidewards facing opening suitable for side loading.

Carton blanks 111 may have flaps that provides material that can, in conjunction with a connection mechanism (such as for example with application of an adhesive, sealing tape or a mechanical connection such as is provided in so-called "Klick-Lok™" carton blanks) interconnect flap surfaces, to join or otherwise interconnect, flaps to adjacent flaps (or in some embodiments flaps to panels), to hold the carton in its desired erected configuration.

Carton blanks 111 may be made of any suitable material(s) configured and adapted to permit the required folding/bending/displacement of the material to reach the desired configuration. Examples of suitable materials are chipboard, cardboard or creased corrugated fiber-board. It should be noted that the blank may be formed of a material which itself is rigid or semi-rigid, and not per se easily foldable but which is divided into separate panels and flaps separated by creases or hinge type mechanisms so that the carton can be erected and formed.

Turning now to the components of system 100, various specific constructions of a suitable magazine 110 might be employed in system 100. With particular reference now to FIG. 3, FIGS. 6*a-d*, and FIG. 7, magazine 110 may be configured to hold a plurality of carton blanks 111 in a vertically stacked, flattened configuration, and be operable to move the stack of carton blanks 111 longitudinally in a direction generally parallel to longitudinal axis Y under the control of PLC 132, to a pick up position where an erector head 120*a* and 120*b* can retrieve cartons from the magazine.

Magazine 110 may comprise a single conveyor or other blank feed apparatus to deliver blanks to a pick up location. In the illustrated embodiment, two conveyors are disclosed: an in-feed conveyor 204; and an alignment conveyor 206. In-feed conveyor 204 may be configured and operable to move a stack of blanks 111 from a stack input position (where a stack may be loaded onto conveyor 204 such as by human or robotic placement) to a position where the stack of blanks is transferred to horizontally and transversely aligned, alignment conveyor 206. Alignment conveyor 206 may be positioned longitudinally downstream in relation to in-feed conveyor 204 and be used to move the stack of blanks to the pick up position. Magazine 110 may be loaded with, and initially hold, a large number of carton blanks 111 in a vertical stack, with the stack resting on in-feed conveyer 204. A rear wall 212 mounted to a lower portion of a magazine frame generally designated 202, can be configured to retain the one or more stacks from falling backwards when initially loaded on conveyor 204. Rear wall 212 may have a generally planar, vertically and transversely oriented surface facing the stack of blanks 111. Rear wall 212 and conveyor 204 may be of an appropriate length to be able to store a satisfactory number of stacks of blanks in series on conveyor 204. PLC 132 can control the operation of conveyor 204 to move one stack at a time to the alignment conveyor 206.

In feed-conveyor may have one or more stacks of blanks arranged longitudinally on a conveyor belt 214 so that they can in turn be fed onto alignment conveyor 206. A sensor may be provided in the vicinity of conveyor 204 to monitor the number of stacks waiting on conveyor 204 and that sensor may be operable to send a warning signal to PLC 132 that can alert an operator that the magazine is low and needs to be replenished (e.g. because the stack on the alignment conveyor being processed by erector head 120 is the only one left). The sensor may be a part number 42GRP-9000-QD made by Allen Bradley.

Of particular note, a plurality of stacks of blanks might be provided on conveyor 204. Each stack may be included with some kind of information indicator that can be read by an information reader such as electronic or an optical reading device. For example, a bar code may be provided on a stack of blanks such as on the top or bottom blank of the stack. The bar code may be read by a suitably positioned bar code reader. The bar code reader may be in communication with PLC 132. The bar code may provide information indicative of a characteristic of the blanks in the stack. For example, the bar code may identify the size and/or type of blank in a particular stack. Other information indicators may be used such as for example RFID tags/chips and RFID readers. The information can then be automatically provided by the information reader to PLC 132 which can determine whether the current configuration of system 100 can handle the processing the particular type/size of blanks without having to make manual adjustments to any of the components. It is contemplated that within a certain range of types/sizes of blanks, system 100 may be able to handle the processing of different types/sizes of blanks without manual adjustment of any components of system 100. The bar code/RFID tag may provide the information about the dimensions of the blank as discussed above and then PLC 132 can determine adjustments, if any that need to be made to (a) the erector device operation; (b) the magazine and the tampering apparatuses in the magazine; (c) to provide a suitable path for the movement of the movement sub-system to provide for suitable pick up of a blank from the magazine and suitable handling by the erector device and the folding and sealing apparatus; and (d) adjustment of at least some of the components of the folding and sealing apparatus to be able to process a particular blank or a particular stack of blanks. The result is that system 100 may be able to process automatically, at least some different types of blanks to form different cartons, without having to make manual operator adjustments to any components of system 100.

Conveyor 204 may include a series of transversely and horizontally oriented rollers 210 mounted to the lower portion of a magazine frame 202 for free rotation. Rollers 210 may allow for generally horizontal longitudinal downstream movement of the stack towards conveyor 206. A conveyor belt 214 may be provided that may be driven by a suitable motor such as a DC motor or a variable frequency drive motor 291 (see FIG. 1*b*). Motor 291 may be DC motor and may be controlled through a DC motor drive (all sold by Oriental under model AXH-5100-KC-30) by PLC 132.

Conveyor belt 214 may have an upper belt portion supported on the rollers 210. Once PLC 132 is given an instruction (such as by a human operator through HMI module 133), upper belt portion of belt 214 may move longitudinally downstream towards conveyor 206. In this way belt 214 can move a stack of blanks 111 longitudinally downstream, with the stack of blanks at its outer transverse portions also being supported on the rollers 210. PLC 132 can control motor 291 through the motor drive and thus conveyor 204 can be operated to move and transfer the stack towards and for transfer to the alignment conveyor 206.

Stack alignment conveyer 206 may also include a series of transversely oriented rollers 208 that are mounted for free rotating movement to a lower portion of the magazine frame 202. A conveyor belt 216 may be driven by a motor 292 that may be like motor 291 and with a corresponding motor drive. Motor 292 may also be controlled by PLC 132. Belt 216 may be provided with an upper belt portion supported on rollers 208 and upon which the stack of blanks 111 may be supported. Conveyor belt 214 may be operated to move the stack of blanks 111 further longitudinally until the front face of the stack abuts with a generally planar, vertically and transversely oriented inward facing surface of front end wall 218.

Conveyor belt 214 of conveyor 204 and conveyor belt 216 of conveyor 206 may be made from any suitable material such as for example Ropanyl.

A sensor 242, such as an electronic eye model 42KL-D1LB-F4 made by ALLEN BRADLEY, may be located within the horizontal gap between belt 214 and belt 216. Sensor 242 may be positioned and operable to detect the presence of the front edge of a stack of blanks as the stack of blanks begins to move over the gap between conveyor belt 214 and conveyor belt 216. Upon detecting the front edge, sensor 242 may send a digital signal to PLC 132 (see FIG. 1*b*) signalling that a stack has moved to a position where conveyor 206 can start to move. PLC 132 can then cause the motor 292 for conveyor 206 to be activated such that the top portion of belt 216 starts to move the stack downstream. In this way, there can be a "hand-off" of the stack of blanks from in-feed conveyor 204 to alignment conveyor 206.

Once the rear edge of the stack of blanks 111 has passed the sensor 242 a signal may be sent to PLC 132 (see FIG. 1*b*) which can then respond by sending a signal to shut down the motor 291 driving belt 214 of conveyor 204. Conveyor 204 is then in a condition ready to be loaded with another stack of blanks 111. Meanwhile conveyor 216 can continue to operate as it moves the stack of blanks 111 to the pick up position.

The presence of a stack of blanks 111 at the pick up location may be detected by a sensor 240 that may be the same type of sensor as sensor 242. The sensor 240 may detect the presence of the front edge of a stack of blanks at the pick up position and may send a digital signal to PLC 132 signalling that a stack is at the pick up position. At the pick up position, the stack of blanks may be "squared up" and thereafter, once properly aligned, single carton blanks 111 may be retrieved in series from the stack of blanks 111 by the alternate engagement of the erector heads 120*a*, 120*b* with the upper most blank in the stack.

The magazine 110 may be configured and operable to enable the stack of blanks 111 to be properly positioned and oriented in a pick up position for proper engagement by one of the erector heads 120*a*, 120*b*. During movement of the stack of blanks 111 longitudinally by conveyors 204 and 206, the left hand side of the stack of blanks may be supported and guided by a left hand side wall 200. Side wall 200 may be mounted to a lower portion of lower frame 202 and side wall 200 may be oriented generally vertically and may extend longitudinally for substantially the full lengths of conveyors 204 and 206.

The right hand side of the magazine 110 adjacent conveyor 204 may be left generally open; however to the right hand side of conveyor 206 there may be a right hand side guide wall 201.

Possible mounting arrangements for side walls 200 and 201 are illustrated in further detail in FIGS. 6A-6D. In this regard, lower frame portion 202 may include bottom support plates 251, 255, 259 and 263 that are supported on the ground terrain/floor with these plates being spaced from each other and oriented in a generally transverse, parallel relationship to each other. Each of support plates 251, 255, 259 and 263 has mounted to an upper surface thereof, one of the tracks 253, 257, 261 and 265. Side wall 200 may be supported by connector blocks 267 that fit onto and are capable of sliding laterally on and in relation to tracks 253 and 261. Similarly side wall 201 may be supported by connector blocks 269 that fit onto and are capable of sliding laterally on and in relation to tracks 255 and 263.

A drive mechanism may be provided to drive each of side walls 200 and 201 on their respective tracks. For side wall 200, a drive mechanism that is in electronic communication with PLC 132 can be provided. By way of example, a servo motor 258 with gear head may be provided and be in electronic communication with PLC 132 through a servo drive (as per FIG. 1*b*). Examples that could be used are servo motor MPL-B1530U-VJ42AA made by ALLEN BRADLEY, in combination with servo drive 2094-BC01-MP5-S also made by ALLEN BRADLEY and gear head AE050-010 FOR MPL-A1520 made by Apex.

A lead screw rod 262 may be inter-connected to servo motor/gear head 258. Lead screw rod 262 may pass through a nut such as a brass nut 264. Nut may be fixedly secured to a plate 293. Plate 293 may be interconnected to spaced, generally vertically oriented bar members 294. Bar members 294 may be interconnected to support frame (not shown) forming part of side wall 200. By activating servo motor/gear head 258, the rotation of the servo may rotate the screw rod 262. As rod 262 passes through nut 264, the nut is moved laterally either inwards or outwards, thereby causing wall 200 to slide on tracks 252, 261 inwards or outwards depending upon the direction of rotation of screw rod 262. An encoder may be provided within or in association with servo drive motor 258 and the encoder may rotate in relation to the rotation of the respective drive shaft of the servo drive. The encoder may be in communication with, and provide signals to the servo drive which can then pass on the information to PLC 132. Thus, PLC 132 may be able to determine the longitudinal position of the screw rod 262 in real time and thus the transverse position of side wall 200 and can operate the servo drive 258 to adjust the position of the side wall 200. The particular type of encoder that may be used is known as an "absolute" encoder. Thus once the encoder is calibrated so that a position of the screw rod 262 is "zeroed", then even if power is lost to system 100, the encoder can maintain its zero position calibration. However, as side wall 200 is not moved during processing of a blank 111, the mechanism for adjusting the transverse position of side wall 200 may alternatively be a simple hand crank mechanism instead of a servo drive motor in communication with PLC 132. It should be noted that a proper position for left side wall 200 during the processing of a blank stack is that shown in FIG. 7, with the wall 200 in abutment with the left side edges of the blanks in each stack. The proper positioning of wall 200 will ensure that the datum line W1 when the blanks are flattened is properly transversely aligned to be picked up by erector heads 120*a*, 120*b* and moved through folding and sealing apparatus 130, as described hereinafter in detail to achieve proper folding and sealing of the carton blank.

Similarly, for side wall 201, a drive mechanism 260 (that may be the same types of components that used for side wall 200) that is also in electronic communication with PLC 132 may be provided. By way of example, a servo motor with gear head designated 260 may be provided and also be in electronic communication through a servo drive with PLC 132. A lead screw rod 266 may be inter-connected to servo motor/gear head 266 (which may be like servo/gear head 268). Lead screw rod 266 may pass through a nut such as a brass nut (not visible in Figures) like nut 264. The nut may be fixedly secured to a plate 295. Plate 295 may be interconnected to spaced, generally vertically oriented bar members 296. Bar members 296 may be interconnected to side wall support frame generally designated 271 (see FIG. 6*c*) that forms part of side wall 201. By activating servo motor/gear head 260, the rotation of the servo may rotate the screw rod 266. As rod 266 passes through the nut, the nut is moved laterally either inwards or outwards, thereby causing wall 201 to slide on tracks 257, 265. An encoder may be provided within or in association with servo drive motor 260 and the encoder may rotate in relation to the rotation of the respective drive shaft of the servo motor. The encoder may be in communication with a servo drive and thus provide signals to PLC 132. Thus, PLC 132 may be able in real time to determine the longitudinal position of the screw rod 266 and thus the transverse position of side wall 201. Thus PLC 132 can operate the servo motor 260 to adjust the position of the side wall 201. An "absolute" encoder may also be used in this application.

During operation of system 100 in erecting a carton, side wall 200 may remain stationary, but side wall 201 may be moved laterally as part of the blank stack alignment procedure to provide for generally longitudinal alignment of the side edges of blanks 111 in the stack as they are held between side walls 200 and 201.

Figure 7:
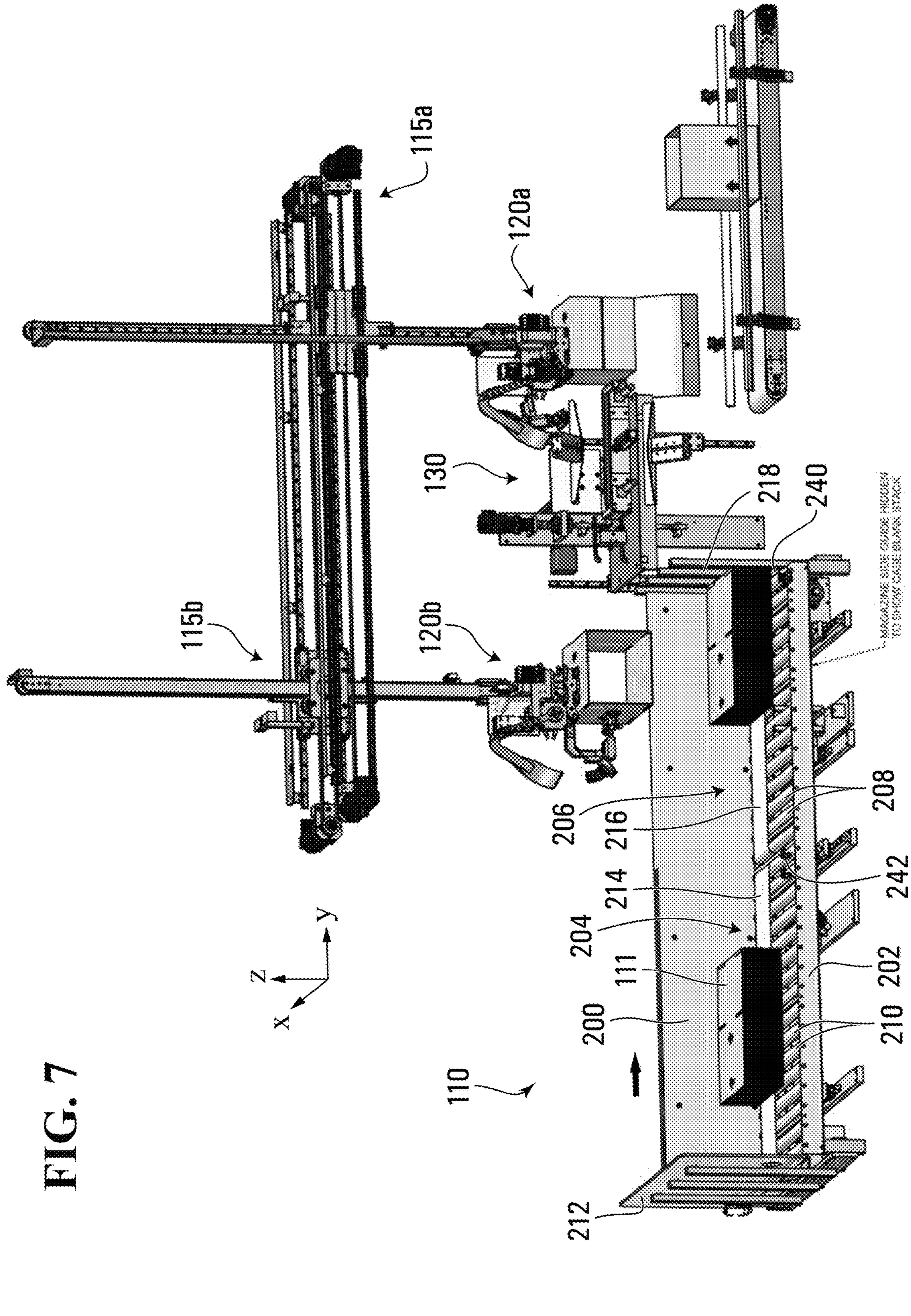
FIG. 7 is a right side perspective view of the system of FIG. 1A but with several components omitted to show the blank intake system and the two erector heads and movement apparatuses, and a folding and sealing apparatus.
Figure 8:
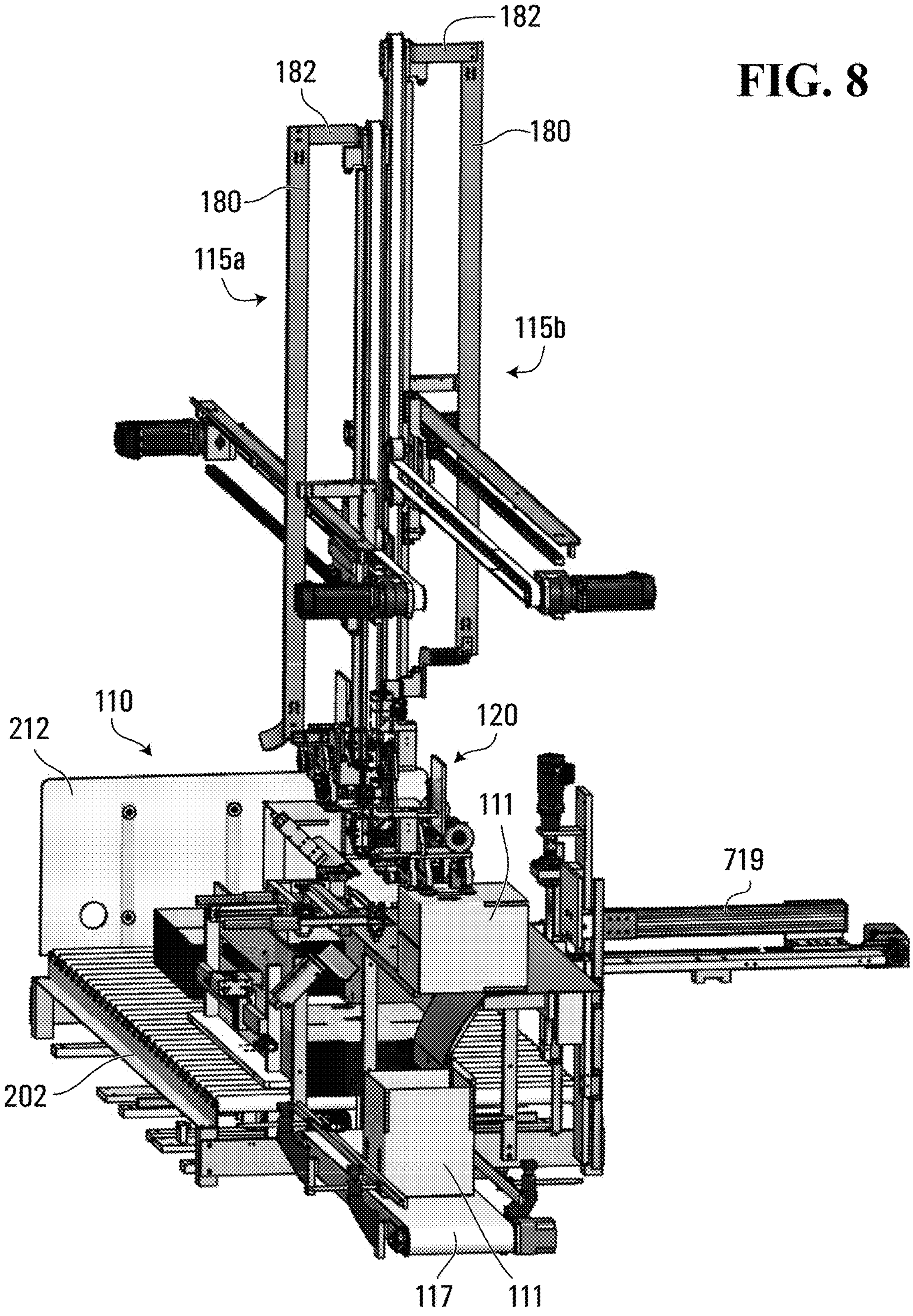
FIG. 8 is a top right rear perspective view of the components of FIG. 7.
Figure 9:
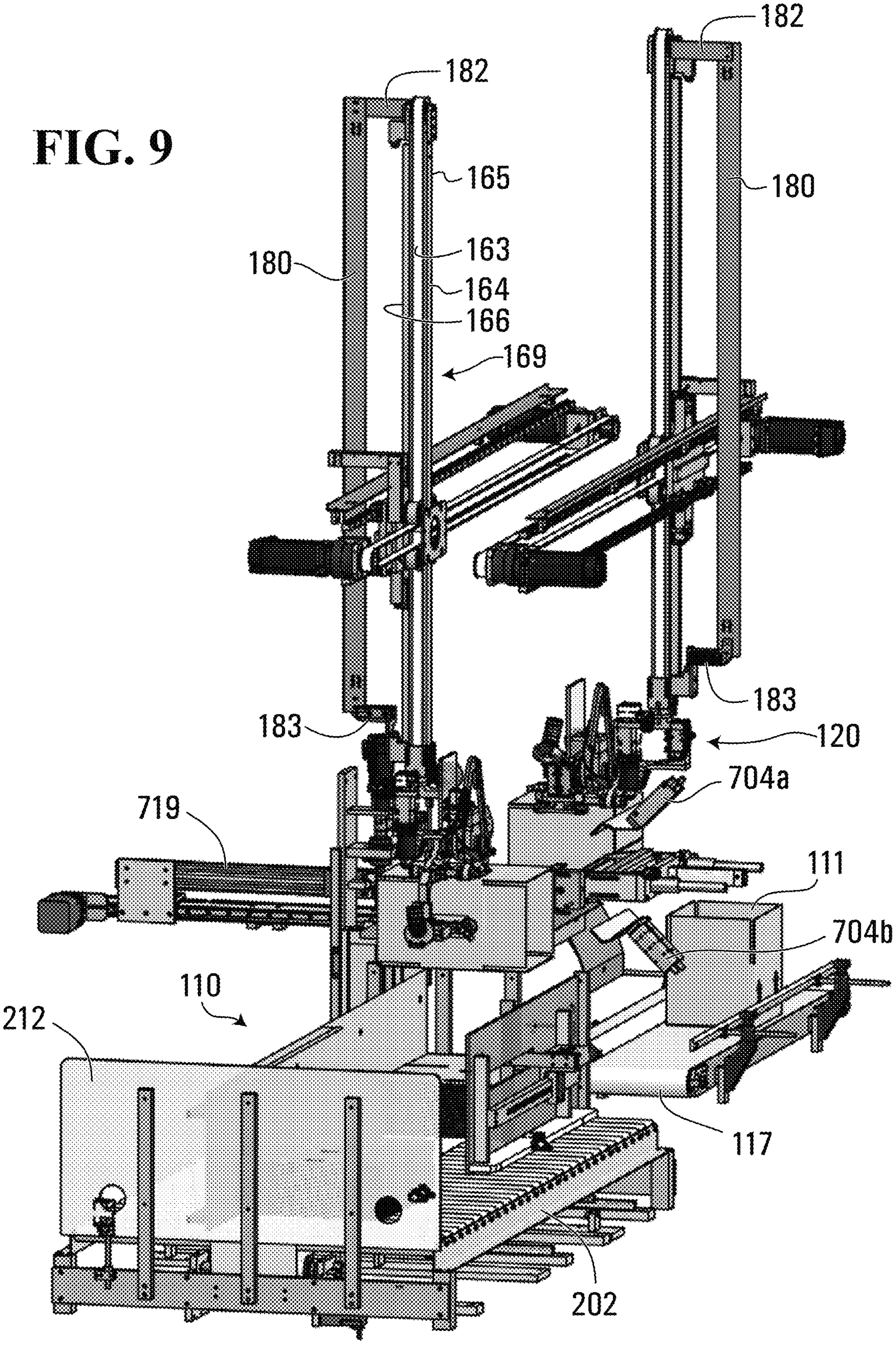
FIG. 9 is a top right front perspective view of the components of FIG. 7.

A lateral tampering apparatus may be secured to side wall 201 and may be used to affect lateral alignment of the front and rear side edges of the blanks 111 in the stack (i.e. the front and rear edges of the blanks in the stack are generally aligned with a vertical axis such as axis Z in FIG. 7). A lateral tampering apparatus generally designated 275 may include a horizontally and longitudinally oriented support plate 270 that may be attached at either end to vertical members of side wall support frame 271. Attached to an outer surface of plate 270 may be a track 272. Secured to track 272 for sliding longitudinal movement along track 272 may be a slider block 273. Attached to slider block 273 may be a pair of upstanding support plates which at their upper ends are secured to a double acting, pneumatic actuator 276 such as the model DFM-25-80-P-A-KF Part #170927 made by Festo. Actuator 276 may have one or more piston arms (not visible in FIG. 6*b* or 6*c* because they are shown retracted). Piston arms of actuator 276 may reciprocate between retracted and extended positions—back and forwards in a longitudinal direction. With reference to FIG. 1*b*, a pneumatic actuator may be supplied with pressurized air communicated through electronic solenoid valves for causing the piston arms to retract and extend. The solenoid valves may be a model CPE14-M1Bh-5J-1/8 made by Festo and may be controlled by PLC 132. Alternatively, a linear servo drive system—similar to one described in connection with the movement of side walls 200 and 201—may be provided for this actuator. Such a servo drive system could be controlled by PLC 132. PLC 132 could make adjustments to the movement of both side walls 200 and 201 as well as this actuator for the lateral tampering apparatus, such that magazine 110 could be automatically adjusted to process a wide range of sizes of blanks.

It should be noted that during the operation of system 100 in erecting cartons, the slider block 273 will not move along track 272. Slider block 273, and the components attached directly or indirectly thereto including actuator 276, will not move longitudinally during operation. However the longitudinal position of slider block 273 can be adjusted during the set-up of system 100 when processing particular sizes of carton blanks.

Attached to the end of the piston arms of actuator 276 may be a transverse plate 278 that may pass through a longitudinally extending slot 279 through side wall 201. The distal end of plate 278 from piston arms is attached to a vertical tamper plate 280 that is positioned transversely inwards from the inner surface of side wall 201. Retraction of the piston arms of actuator 276 can cause plate 278 to engage the rear side edges of the blanks 111 in the stack and as the front edges of those blanks are pushed up against the inner surface of the front wall 218, the front and rear edges of the blanks can be laterally aligned. While a pneumatic actuator 276 is illustrated, other alignment devices could be used. For example, a linear servo drive in communication with PLC 132 might be employed, that would perform the same function but it could electronically position the vertical tampering plate 280, and the operator may not have to adjust it manually during system set up.

By operation of PLC 132, suitable adjustment of right side wall 201 and tamper plate 280, the blanks 111 can be moved to precisely the known pick up location and their orientation may be "squared-up" blanks 111 in a stack of blanks that is held against front wall 218, and may thus ensure that the blanks 111 are in the proper location for being engaged by the erector heads 120*a*, 120*b*.

In particular, once the stack of blanks 111 have generally reached the pick up location, PLC 132 can send a signal to drive mechanism 260 to cause the drive mechanism 260 to cause side wall 201 to move laterally inwards towards the side of stack of blanks 111. PLC 132 will cause the drive mechanism 260 to move a sufficient distance to cause the edges of the blanks 111 to become in contact along their length with inner surface of longitudinally aligned inner surface of side wall 201. However, PLC 132 will not cause side wall 201 to be moved to such an extent that it creates a force on the stack of blanks such that causes the blanks to buckle/be damaged if they are compressed to a significant extent between side walls 200 and 201. PLC 132 may be able to determine how much to move side wall 201 towards side wall 200 by virtue of the carton size dimensions that have been inputted into the PLC, including dimension H (see FIG. 10A). The amount of slight compression can be fine tuned such as by trial and error for different sized carton. It should be noted that for many sized cartons, the manufacturers comply with industry standard carton sizes.

Once the longitudinal alignment has been completed by side wall 201, PLC 132 can cause actuator 276 to be activated to cause the vertical plate 280 to engage the rear edges of the blanks 111 in the stack. PLC 132 may cause the drive mechanism 260 to move a sufficient distance to cause the rear edges of the blanks 111 to come in contact along their length with inner surface of laterally aligned inner surface of plate 280. However, the amount of retraction of the piston arms will not cause side wall vertical plate 280 to be moved to such an extent that it creates a force on the stack of blanks that would cause the blanks to buckle/be damaged if they are compressed too much between plate 280 and front wall 218. The appropriate manual positioning and securement (such as by tightening screws appropriately positioned through block 273, can secure actuator 276 at an appropriate longitudinal position on rail 270.

Thus, by way of review: The tampering actuator 276 may ride on the side guide wall 200. For a carton of a particular size/shape, the tampering actuator 276 can be adjusted manually in a fore-aft direction so that when the actuator 276 is retracted, the vertical tamper bar 280 is in the right position to push the blanks up against the front wall 218 (without squeezing them).

The sliding assembly of components that includes actuator 276 may also have a pointer or indicator, and on the stationary part of the magazine there may be a numeric scale to assist in rapidly manually adjusting the actuator to the correct position on rail 270 for a known case size.

In review the tampering sequence for ensuring the blanks are properly squared up at the pick up location steps include the following:

1. The right-hand-side magazine side guide wall 201 under control of PLC 132 expands wide enough to allow the stack of blanks to enter on alignment conveyor 206, even if the stack is misaligned and/or the blanks in the stack are not perfectly square with each other and in relation to the X-Y axes.
2. The belt 216 advances the stack of blanks 111 towards the front stop datum and may abut with front wall 218
3. The tampering actuator 276 is extended, and then the side guide wall 201 may contract to make contact with the side of the case stack and press the side wall 201 against the left hand side guide wall 200. This aligns the cases so the side edges of blanks are aligned with each other and the longitudinal side wall of the walls 200 and 201.
4. The tampering actuator 276 may retract, and the tampering bar 280 presses the stack forward, thereby aligning the blanks in the stack so that their front and rear edges are vertically aligned with each other and with the inner face of the bar 280 and the inside surface of front wall 218
5. The blanks are then properly positioned so that the erector heads can begin picking up blanks from the stack.

Turning now to other components of system 100, to retrieve blanks from the magazine 110, at least a first engagement device may be provided to engage a panel of a blank 111 and thus be able to hold and move the blank. Where the blank is a tubular blank, system 100 may be provided with a first engagement device for engaging one panel (e.g. Panel A) of a blank and a second engagement device for engaging a second panel (e.g. Panel B) of the blank. 111. The first and second engagement devices may comprise one or more suction cups providing a suction force onto a panel acting generally normal to the surface of the panel that is engaged, as described further below. Other types of suitable engagement devices might be employed. The first and second engagement devices may be rotatable relative to each other so that the first panel can be rotated relative to the second panel. The first and second engagement devices may be mounted to a single common erector head.

With reference to FIG. 7, system 100 may be provided with a movement sub-system that may be a pair of movement apparatuses each supporting and moving one of erector heads 120*a*, 120*b*. Each erector head 120*a*, 120*b* may have a dedicated, independently driven and controlled movement apparatus 115*a*, 115*b*. Thus erector head 120*a* may be supported and moved by movement apparatus 115*a*. Similarly erector head 120*b* may be supported and moved by movement apparatus 115*b*. Movement apparatus 115*a* may be constructed in a manner that is substantially identical to movement apparatus 115*b* but may be configured as mirror image of movement apparatus 115*b*. In this way, movement apparatus 115*a* may support erector head 120*a* from a right hand side and movement apparatus 115*b* may support erector head 120*b* from a left hand side, in such a manner that the erector heads 120*a*, 120*b* may both be moved along the same longitudinal and vertical path. The common path of erector heads 120*a*, 120*b*, may be a cyclical path that lies substantially in or is parallel to a plane that it parallel both vertical axis Z and longitudinal axis Y in FIG. 7. Thus movement of the erector heads 120*a*, 120*b* may only be in vertical Z and longitudinal Y directions (i.e. directions parallel to axes Z and Y in FIG. 7), and there may be no substantial movement in a lateral Z direction (i.e. a direction parallel to axis X in FIG. 7). If the movement of the erector heads 120*a*, 120*b* is restricted to only Z and Y directions, a moving apparatus for each can be constructed that is relatively less complex than if movement in all three directions is required.

The movement of heads 120*a*, 120*b* by movement apparatuses 115*a*, 115*b* respectively, may be synchronized such that they may travel along the same longitudinal and vertical path but they move out of phase with each other so that one erector head does not interfere with the other erector head, as will be described further below. Thus, the relative positions of the two erector heads 120*a*, 120*b* can be arranged so that the heads they do not collide or otherwise interfere with each other during operation of system 100.

Only the detailed construction of left side movement apparatus 115*b* will be described herein, it being understood that movement apparatus 115*a* may be constructed in a substantially identical manner as a mirror image of moving apparatus 115*b*. With particular reference to FIGS. 4, 5, 7, 8, 9 and 17, movement apparatus 115*b* may include a vertical movement device and a horizontal movement device. The vertical movement device may include a generally hollow vertically oriented support tube 169 that may be generally rectangular in cross section. Support tube 169 may be formed from a unitary tubular piece of material or may be formed into opposed, vertically extending and oriented, surfaces 164, 165, 166 and 168 that may be inter-connected together using conventional mechanisms such as bolts, welding etc. Support tube 169 may be secured to a horizontally extending brace plate 182. Brace plate 182 may be interconnected to a vertically extending brace plate 180. The bottom portion of brace plate 180 may be interconnected by way of a series of angled plates generally referred to as 183, to the lower end of support tube 169.

At the upper end of support tube 169 may be mounted a freely rotatable pulley wheel 155*b*. At the bottom end of plates 164, 166, erector head 120*b* may be fixedly attached to support tube 169 by means of a horizontally extending mounting plate that is connected to support tube 169, which engages with a pair of spaced mounting block 190*a*, 190*b* that may be joined with bolts through bolt holes 191*a*, 191*b* in blocks 190*a*, 190*b* that also pass through the mounting plate at the bottom of support tube 169. Thus, as erector head 120*b* is interconnected to support tube 169, erector head 120*b* will move in space with support tube 169.

To support the support tube 169 and erector head 120*b* that is connected thereto, and facilitate movement of the support tube 169 and erector head 120*b* in horizontal motion, a horizontal movement device may be provided and may include a slide block 158 that may use a rail system to move horizontally and may be provided with a pair of spaced, longitudinally and horizontally extending short inner blocks, each one fitting on one longitudinally extending rail 160, 162 that holds the blocks securely but allows blocks to slide horizontally relative to the rails. An example of a suitable rails system is the Bosch Rexroth ball rail system in which the rails are made from steel and the blocks have a race of ceramic balls inside allowing the block to slide on the rails. Rails 160, 162 are generally oriented horizontally and may be attached to the frame 109. Slide block 158 may be mounted to rails 160 or 162 for horizontal sliding movement along the rails. Secured to the front face of slider block 158 are four freely rotatable pulley wheels 155*a*, 155*c*, 155*d* and 155*f* which have drive belt 153 pass around them as described below. Slide block 158 may also use a rail system to allow support tube 169 to be connected to it and also move vertically relative to slide block 158. Accordingly, extending vertically along a back surface of tube 169 may be a vertically and longitudinally extending rail. Support tube may have a runner block interconnected to the vertical rail on support tube 169. Thus support tube 169 can slide vertically relative to slide block 169. Again, a suitable rail system is the Bosch Rexroth ball rail system referenced above.

A drive apparatus may also be provided to drive the horizontal movement device and the vertical movement device. For example, the drive apparatus may include a pair of drive motors interconnected to a drive belt, with the drive belt being inter-connected to the horizontal and vertical movement devices. For example, the drive apparatus may include a left belt drive motor 150 (which may be a servo motor such as the model MPL-B330P-MJ24AA made by Allen Bradley) may be mounted to a longitudinally extending beam member 108 that is connected to frame 109 (see FIGS. 1*a*, 2 and 3). Servo drive 150 may have a drive wheel 152. Similarly, a right belt drive 154 (which may be a servo motor like servo drive 150) may also be mounted to beam member 108 connected to frame 109. Servo drive 154 may have a drive wheel 156. Servo motor 152 may be longitudinally spaced from, and may be horizontally aligned with, servo motor 154. Both servo motors 150 and 154 can be driven in both directions at varying speeds, such rotation being controllable through servo drives by PLC 132 (see FIG. 1*b*). Both servo motors 150 and 154 may be provided with two separate ports 364*a*, 364*b*. One for the ports may be for supplying a power line and the other for a communication line to facilitate the communication with the servo drive and PLC 132. It should be noted that all of the servo motors described in this document may be similarly equipped. Servo motors 150, 154 may also have a third input which may provide input for an electric braking mechanism.

Apparatus 115*a* may also include a continuous drive belt 153 that may for example be made from urethane with steel wires running through it Belt 153 may be engaged and may be driven by motors 150 and 154 under control of PLC 132 as it may independently control through their respective servo drives, the operation of both servo motor 152 and servo motor 154. Belt 153 extends continuously from a start location at the bottom left side of support tube 169, where belt is fixedly attached to a belt block 159*a* that is attached to support tube 169. From there belt extends upwardly on a first portion 153*g* to block pulley 155*f*, around the upper side of block pulley 155*f*. From block pulley 155*f*, belt 153 extends horizontally along a second portion 153*h* to servo drive wheel 152. The belt then passes around and is engaged by servo drive wheel 152, on a third portion 153*a* on the underside of pulley 155*a*, upwards along a fourth portion 153*b* to pulley 155*b*. From there belt extends around pulley 155*b*, downwards on a fifth portion 153*c* to block pulley 155*c*, around block pulley 155*c* along a sixth portion 153*d* to servo drive wheel 156. After passing around and being engaged by servo drive wheel 156, belt 153 extends continuously from around servo drive wheel 156, on to a seventh portion 153*e* to the upper side of block pulley 155*d*. From block pulley 155*d*, belt 153 then extends vertically downwards along an eighth portion 153*f* to belt block 159*b* where the belt terminates. Belt 153 vertically supports the support tube 169 both at the bottom as it is interconnected to support tube 169 with blocks 159*a*, 159*b*, and at the top of support tube 169 where it passes 155*b*. Thus belt 153 is indirectly also vertically supporting erector head 120*b*. Furthermore, by adjusting the relative rotations of servo drive wheels 152 and 156, the relative lengths of all belt portions can be adjusted through the operation of the servo motors 150 and 154. Thus, the relative vertical position of support tube 169 relative to slide block 158 can be adjusted. Additionally, by adjusting the relative rotations of servo drive wheels 152 and 156, through the operation of the servo motors 150 and 154 the horizontal position of slide block 158 on rails 160, 162 can be adjusted thus altering the horizontal position of support tube 169 and erector head 120*b*. It will thus be appreciated that by adjusting the direction and speeds of rotation of drive wheels 152, 156 relative to each other the support tube 169 can be moved vertically and/or horizontally in space within the physical constraints imposed by among other things the position of the servo drive wheels 152 and 156, the length of the belt 153, and the length of support tube 169. The following will be appreciated with reference to FIG. 17 in particular:

- If wheels 152 and 156 both remain stationary then the position of support tube 169 will not be altered;
- If wheels 152 and 156 both rotate in the same clockwise direction and at the same speed relative to each other, then support tube 169 (and thus erector head 120*b*) will move horizontally from right to left;
- If wheels 152 and 156 both rotate in the same counter-clockwise direction and at the same speed relative to each other, then support tube 169 (and thus erector head 120*b*) will move horizontally from left to right;
- If wheel 152 rotates counter-clockwise, and wheel 156 rotates in opposite clockwise rotational directions, but both wheels rotate at the same rotational speed relative to each other, then support tube 169 (and thus erector head 120*b*) will move straight vertically downward;
- If wheel 152 rotates clockwise, and wheel 156 rotates in opposite counter-clockwise rotational directions, but both wheels rotate at the same rotational speed relative to each other, then plates 164, 166 will move straight vertically upwards.

It will be appreciated that if the speeds and directions of the two servo motors are varied in different manner, then the motion of the support tube 169 (and thus erector head 120*b*) can be created that has both vertical upwards or downwards component as well as a horizontally right to left, or left to right movement. Thus any desired path within these two degrees of freedom (vertical and horizontal) can be created for support tube 169 (such as a path having curved path portions) (and thus erector head 120*b*). Thus by controlling the rotational direction and speed of the motors 150, 154 independently of each other, PLC 132 can cause support tube 169 (and thus erector head 120*b*) to move along any path, within the physical constraints imposed by the spacing of the drive wheels 152, 156 and pulley wheel 155*b*, and the bottom of support tube 169 in vertical and horizontal directions to allow for the end erector 120*b* to carry a carton blank 111 through the various processing steps performed by system 100.

It will also be appreciated that by providing two opposed moving apparatuses 115*a*, 115*b*, the movements of each of the end effectors 120 can be co-ordinated and synchronized so that even though they move along the same path, the movement of the end effectors are out of phase (for example by 180 degrees).

Thus the movements of one end effector will not interfere with the movement of the other. An encoder may be provided for each of the servo drive motors 150 and 154 and the encoders may rotate in relation to the rotation of the respective drive wheels 152, 156. The encoders may be in communication with, and provide signals through the servo drives to PLC 132. Thus PLC 132 can in real time know/determine/monitor the position of the belt 153 in space and thus will determine and know the position of the erector head 120*b* in space at any given time. The particular types of encoders that may be used are known as "absolute" encoders. Thus the system can be zeroed such that due to the calibration of both encoders of both servo drives 150 and 154, the zero-zero position of the erector head in both Z and Y directions is set within PLC 132. The zero-zero position can be set with the erector head at its most horizontally left and vertically raised position. PLC 132 can then substantially in real time, keep track of the position of the erector head 120*b* as it moves through the processing sequence for a blank 111.

PLC 132 and the encoders associated with the servo motors 150, 154 and their servo drives on each of apparatuses 115*a*, 115*b* may be capable of being able to be set at zero-zero positions for each of the two separate erector heads 120*a*, 120*b*. PLC 132 can then substantially in real time, keep track of the position of both the erector heads 120*a*, 120*b* as they both independently move through the processing sequence for a blank 111.

Also associated with moving apparatus 115*b* is a first, generally horizontally oriented caterpillar device 114 having an input end 114*a* and an output end 114*b*. A second, generally vertically oriented caterpillar device 118 is also provided and has an input end 118*a*, and an output end 118*b*. Caterpillars 114 and 118 may have a hollow cavity extending along their length. Within the cavities of caterpillars 114, 118 hoses/wires carrying pressurized air/vacuum and electrical/communication wires can be housed. Caterpillar 114 allows such hoses and wires to move longitudinally as the support tube 169 and erector head 120*b* are moved longitudinally. Caterpillar 118 allows such hoses and wires to move vertically as the support tube 169 and erector head 120*b* are moved vertically. The hoses and wires may extend from external sources to enter at an inlet 114*a* of caterpillar 114 and emerge at an outlet 114*b*. Once leaving outlet 114*b*, the hoses and wires may extend to enter at an inlet 118*a* of caterpillar 118 and emerge at an outlet 118*b*. These hoses and wires may then pass from outlet 118*b* into the input hoses 190 and 191 on erector head 120*b* (see FIG. 30). In this way both pressurized air/vacuum and/or electrical communication wires may be brought form locations external to the frame 109 onto the moving erector head 120*b*. An example of suitable caterpillar devices that could be employed is the E-Chain Cable Carrier System model #240-03-055-0 made by Ignus Inc. It should be noted that electrical communication between the PLC 132 and the erector head 120*b* could in other embodiments be accomplished using wireless technologies that are commercially available.

Turning now to FIGS. 30 to 33, left hand side erector head 120*b* is shown in isolation. Right hand side erector head 120*a* may be constructed in the same manner as erector head 120*b*, but may be supported from the right hand side moving apparatus 115*a*, in contrast to erector head 120*b* which may be supported from the left hand side by left hand moving apparatus 115*b*.

Erector head 120*b* may have a body generally designated as 300 that may comprise of a number of components. Many of the components of erector head 120*b* may be made from a strong material such as a metal (e.g. aluminium, steel, etc.), a hard and strong plastic such as or other suitable materials including composite materials.

Erector head 120*b* may be generally configured to handle a range of sizes of carton blanks 111 that can be formed into a carton. Erector head may be configured by providing easy attachment to support tube 169 using mounting blocks 190*a*, 190*b* and bolts etc. to permit for the easy interchange of erector heads 120 so that the system can in some circumstances, be readily adapted to forming differently sized/shaped cartons from differently configured blanks.

In one embodiment, erector head 120*b* may include a rotatable paddle 310 connected to a distal end portion 314*a* of a paddle arm 314. Paddle arm 314 may have an end portion 314*b* opposite to distal end portion 314*a*, that is formed with a circular opening that facilitates arm 314 being connected to a shaft 316. Paddle 310 can rotate with shaft 316 about the longitudinal axis of shaft 316. Shaft 316 may be connected to a rotary actuator 399 such as a double acting rotary pneumatic actuator manufactured by Festo under engineering part #DSM-32-270-CC-FW-A-B. Actuator 399 can cause rotation of shaft 316 clockwise and counter-clockwise around its axis of up to 270 degrees. Rotary actuator 399 may be supplied with pressurized air supplied by hoses (not shown) connected to ports 395 and 397. Those hoses may also be connected to a solenoid valve device 340 which may be controlled by PLC 132. In this way the rotation clockwise and counter-clockwise of paddle 310 may be controlled by PLC 132.

Also formed as part of body 300 of erector head 120*b* is a bottom suction plate 327 that is generally shaped in a square cross configuration to provide flanged openings for such cups. In each of the open flanges of plate 327 is positioned a suction cup 312. It should be noted that while many types of suction cups may be employed on the erector head, a preferred type of suction cup is the model B40.10.04AB made by Piab. Two of the suction cups 312 are mounted to a generally longitudinally oriented support block 319*a* and the other two suction cups are mounted to a second generally longitudinally oriented support block 319*b*.

Support blocks 319*a* and 319*b* are generally oriented longitudinally in space apart, parallel relation to each other and each block 319*a*, 319*b* is joined to other body components of body 300. Blocks 319*a*, 319*b* each have open passageways that interconnect each suction cup 312 with an outlet from a vacuum generator 330. Vacuum generator 330 may be any suitable vacuum generator device such as for example the model VCH12-016C made by Pisco. Vacuum generators 330 each have an inlet interconnected to a hose (not shown) that can carry pressurized air to the vacuum generator. The vacuum generator converts the pressurized air supplied to the inlet port, into a vacuum at one of the outlet ports. That vacuum outlet port is interconnected through the passageway in blocks 319*a*, 319*b* to a suction cup 312 so that the suction cup can have a vacuum force. Interposed along the pressurized air channel running between each vacuum generator 330 and the source of pressurized air that may be an air compressor (see FIG. 1*b*), may be located a solenoid valve device 340 that may for example be a model CPE14-M1BH-5L-1/8 made by Festo. Valve device 340 may be in electronic communication with PLC 132 and be controlled by PLC 132. In this way PLC 132 can turn on and off the supply of vacuum force to each of the suction cups 312. To channel the compressed air appropriately, valves in valve device 340 can be driven between open and closed positions by solenoids responsive to signals from PLC 132. Electrical lines carrying signals to and from PLC 132 could also pass through hose 190 to operate the valve device 340.

Still with reference to FIGS. 30 to 33, downward extending end portions 323 of longitudinal support block 319 have openings 331 that are configured to receive a transversely mounted shaft 342. Shaft 342 may be mounted for rotation within openings 331. At one end of shaft 342 may be mounted a gear wheel device 360 that is configured to rotate with shaft 342. Gear wheel 360 may be interconnected to a drive wheel of a gear box 362 to form a mitre gear connection. Gear box 362 may be driven by a servo motor 364 mounted above gear box 362. Servo motor 364 may also be a model MPL-B1530U-VJ44AA made by ALLEN BRADLEY and gear box may be a model AER050-030 FOR MPL-A1520 AB SERVO MOTOR made by Apex.

Figure 30:
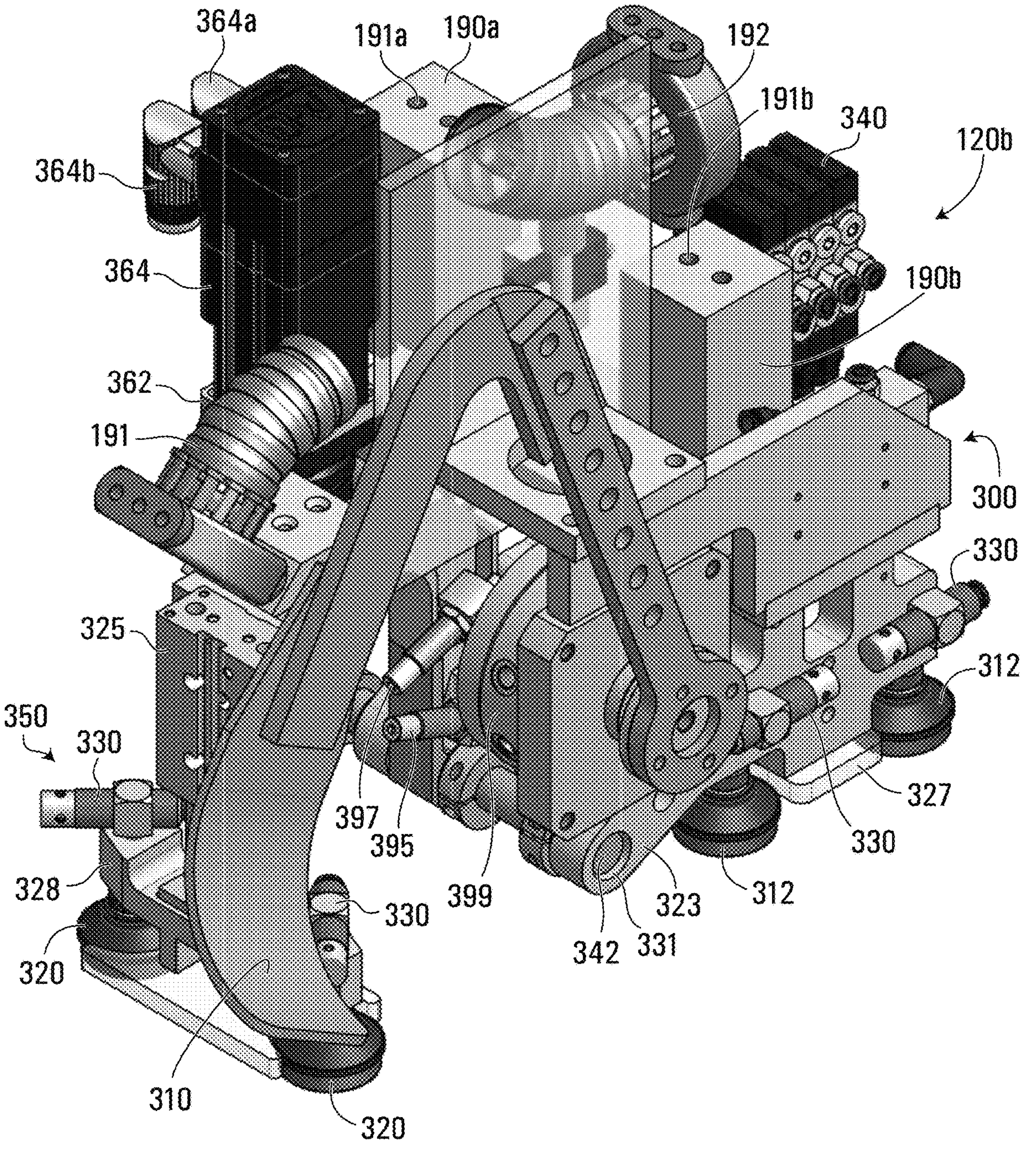
FIG. 30 shows a top right perspective view of a first embodiment of an erector head.
Figure 31:
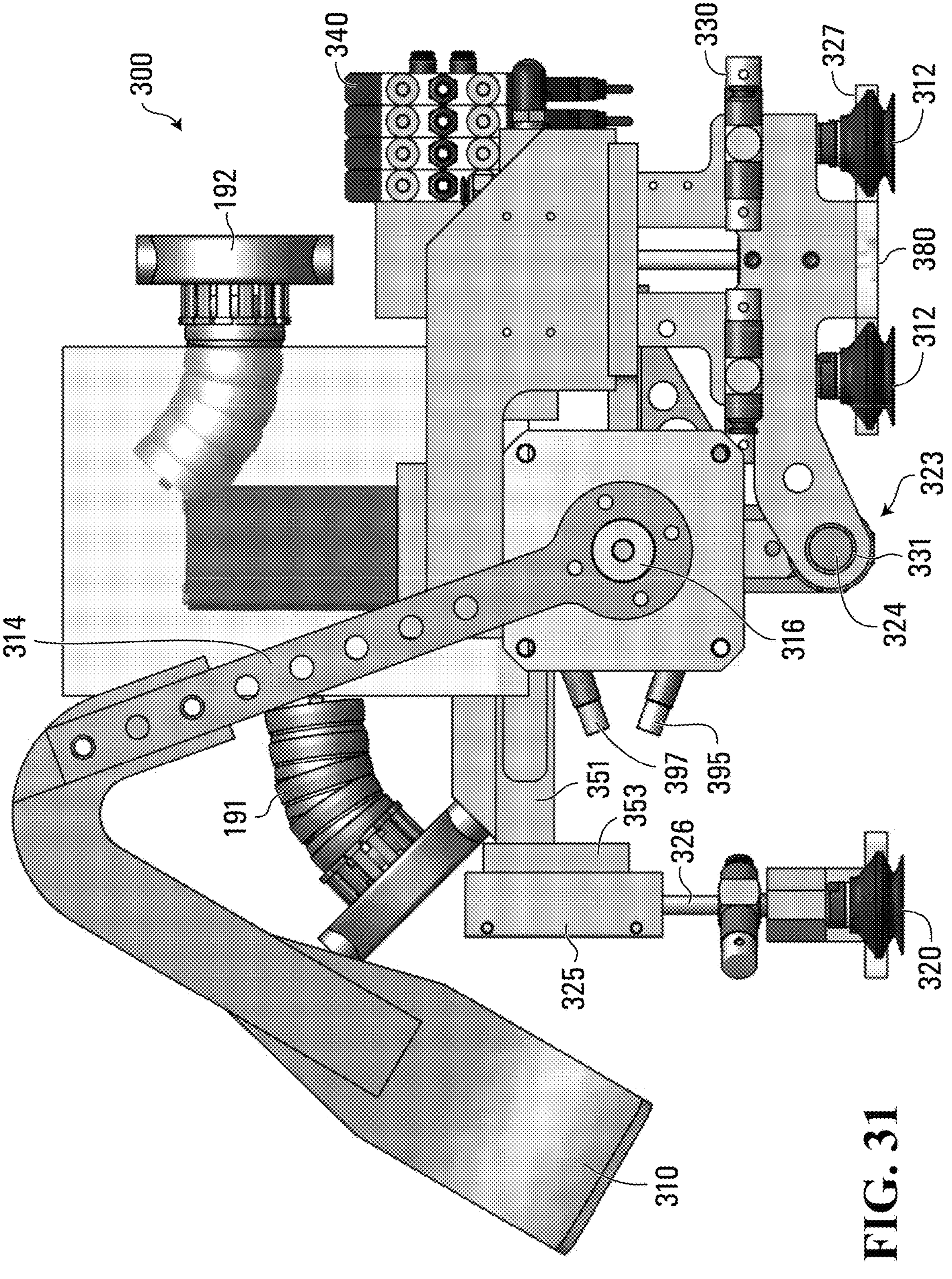
FIG. 31 is a side elevation view of the erector head of FIG. 30.
Figure 32:
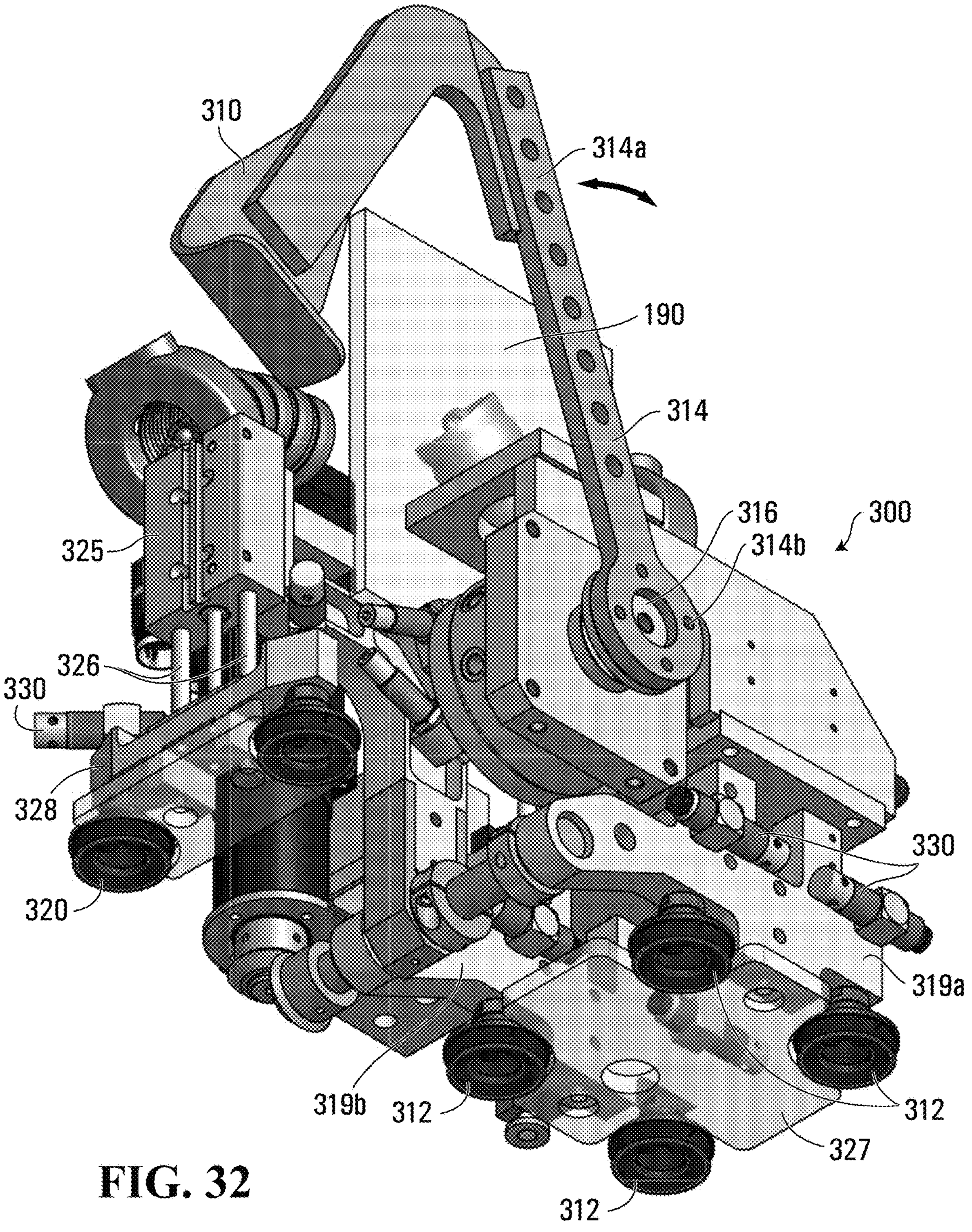
FIG. 32 is a bottom right perspective view of the erector head of FIG. 30.
Figure 33:
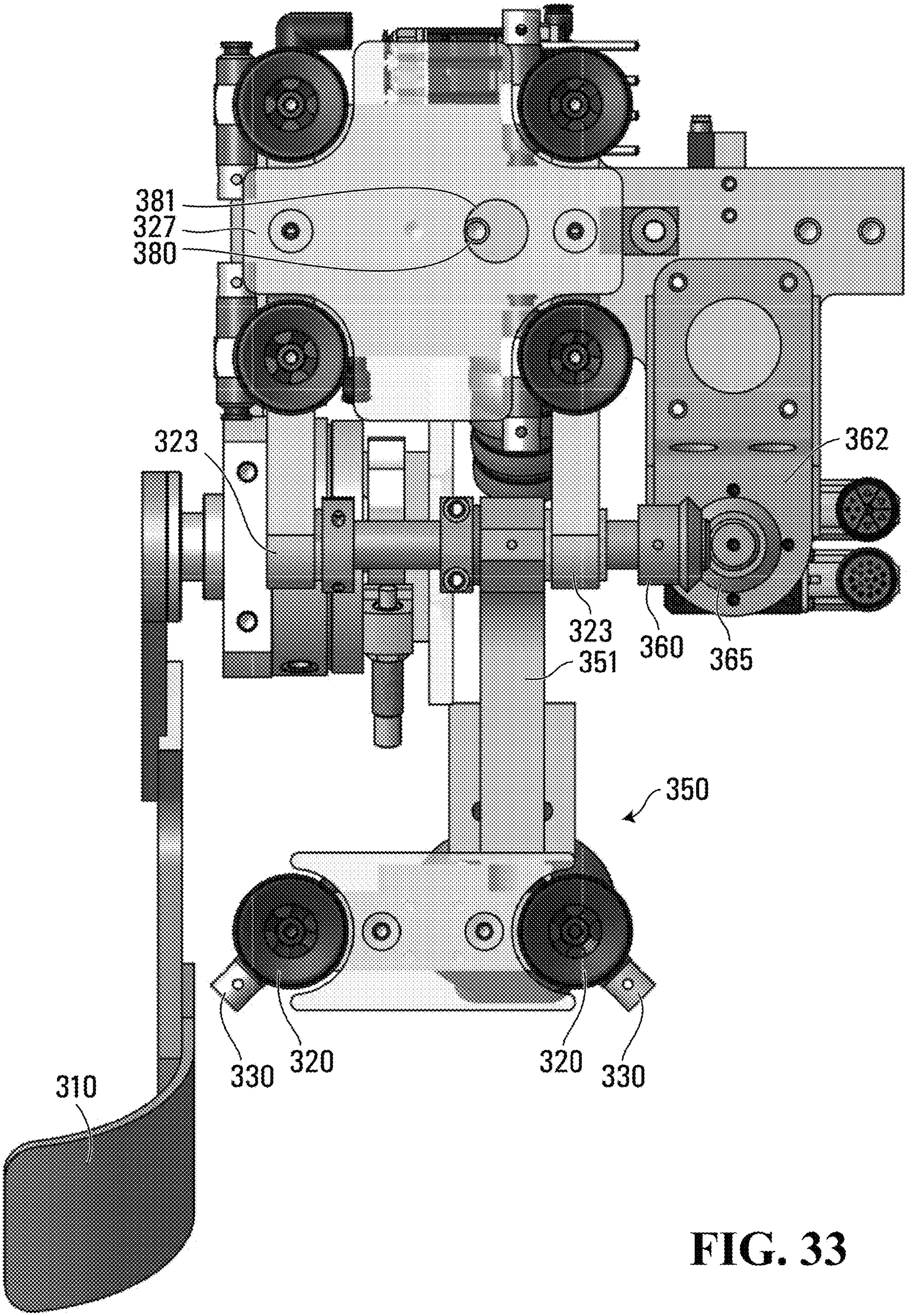
FIG. 33 is a bottom plan view of the erector head of FIG. 33.

In FIG. 30, servo motor 364 is shown with two separate ports 364*a*, 364*b*. One for the ports may be for supplying a power line and the other for a communication line to facilitate the communication with the servo drive and PLC 132. It should be noted that all of the servo motors described in this document may be similarly equipped. Servo motor 364 may, through connection with a servo drive (see FIG. 1*b*), be controlled by and be in communication with PLC 132. An encoder may be provided within or in association with servo motor 364 and the encoder may rotate in relation to the rotation of the respective drive shaft of the servo motor. The encoder may be in communication with, and provide signals to the servo drive and thus to PLC 132. PLC 132 may be able to determine the rotational position of the shaft 342. Thus, when appropriate signals are provided from PLC 132, so servo motor 364 can be operated and can cause shaft 342 to rotate in a particular desired direction at a particular desired rotational speed for a desired amount of time. Thus PLC 132 can control the rotational position of shaft 342.

Mounted to shaft 342 between end portions 323 of support blocks 319*a*, 319*b* is a rotator device generally designated 350. Rotator device 350 is fixedly attached to shaft 342 and will rotate with shaft 342. Rotator device 350 includes an arm 351 having one end fixedly mounted to shaft 342. The opposite end of arm 351 has a mounting block 353 attached to it.

Secured to mounting block 353 may be a pneumatic actuator 325 that may for example be a model DFM-12-80-P-A-KF, or part #170905 made by Festo. Actuator 325 may be supplied with pressurized air to activate the device that may be controlled by solenoid valve device 340 in the supply line. The solenoid valve 340 may be in communication with and be controlled by PLC 132 (see FIG. 1*b*). Actuator 325 may be actuated to reciprocate piston arms 326 between an extended position and a retracted position. PLC 132 may send a signal to valve device 340 to operate actuator 325 to extend piston arms 326 at a particular angular position of arm 351 and/or location of erector head 120*b* that is provided by the encoder associated with servo motor 364. Similarly, PLC 132 may send a signal to valve device 340 to activate arms 326 to be retracted at a particular shaft 342 angular position, and to retract piston arms 326 at a particular angular position, of arm 351 and/or a particular location of erector head 120*b*. PLC 342 may cause, acting through valve device 340, actuator 325 to be actuated at approximately the same time as the cups 320 have contacted the surface of downward facing panel D and/or when rotation of arm 351 is just about to begin or has just commenced. Piston arms 326 may be completely extended by the time arm 351 has rotated about 45 degrees.

Mounted to distal ends of piston arms 326 is a mounting block 328 which may be configured to support a pair of suction cups 320. Blocks 328 may have open passageways (not shown) that interconnect each suction cup 320 with an outlet from another vacuum generator 330. Vacuum generator 330 may be any suitable vacuum generator device such as for example the model VCH12-016C made by Pisco. As indicated above, vacuum generators 330 each have an inlet interconnected to a hose (not shown) that can carry pressurized air to the vacuum generator. Vacuum generators 330 convert the supplied pressurized air supplied the inlet port to a vacuum at one of the outlet ports. That vacuum port is interconnected through the passageway in block 328 to a suction cup 320 so that the suction cup can have a vacuum force. Interposed along the pressurized air channel running between each vacuum generator 330 associated with suction cups 320 and the source of pressurized air may be located the same valve device 340. Valve device 340 may be interconnected electronically (either with a wireless system or wired communication connection) to PLC 132 and be controlled by PLC 132. In this way PLC 132 can also turn on and off the supply of vacuum force to each of the suction cups 320.

With reference also to FIG. 11, suction cups 312 can be employed to engage and hold onto the top panel A of blank 111. Once a blank 111 is retrieved from the top of the stack of blanks, the rotator arm 351 can be rotated approximately 180 degrees such that suction cups 320 of rotator device 350 can engage and hold onto the underside panel D of blank 111. Once suction cups 320 have engaged panel D the arm 351 can be rotated 90 degrees backwards in the opposite rotational direction and the opposing vacuum forces created by suction cups 312 above and suction cups 320 below, cause the tubular blank 111 to be moved from a flattened configuration to an open configuration as panel D is rotated substantially 90 degrees relative to panel A. The air suction force that may be developed at the outer surfaces of suction cups 320 and 312 will be sufficient so that when activated they can engage and hold top panel A in a stationary position relative to erector head 120*b* and rotate panel D relative to panel A to open up the tubular blank to a generally rectangular configuration. The vacuum generated at suctions cups 320 and 312 can also be de-activated by PLC 132 at appropriate times by sending signals to valve device 340.

The opening of the blank 111 may be assisted by the extension of piston arms 326 of actuator device 325 during rotation of the rotator arm 351. Preferably when rotator arm 351 has rotated somewhere in the range of about 30-60 degrees back to the 90 degree position, and preferably when it is at approximately 40-50 degrees, and most preferably when it is at about 45 degrees, then the piston arms 326 may be fully extended. This extension of arms 326 and thus of suction cups 320 in a generally tangential direction relative to the rotation of arm 351 compensates for the offset of the axis of rotation of the arm 351 compared to the axis of rotation of the blank that extends along the fold line between panels A and D. The effect of the extension of piston arms 326 once the arm is rotated such as to 90 degrees ensures that the panel D is also oriented at 90 degrees to panel A.

Once a blank 111 has been opened to the configuration shown in FIG. 11, then PLC 132 can send a signal to valve device 340 which causes rotary actuator 399 to rotate shaft 316 and thus rotate paddle 310. Paddle 310 can then engage trailing flap K of blank 111 and cause it to fold about its fold line where it joins to panel D. Thus flap K can be folded inwards towards the bottom opening of blank 111. Leading bottom flap J may also be folded about its fold line which joins it with panel B by engagement of the flap with upper and lower folding rails/ploughs 700, 701 that form part of folding and sealing apparatus 130. As the blank 111 held by erector head 120*b* is moved longitudinally downstream into the folding and sealing apparatus 130 the leading bottom flap J can be folded inwards so that both bottom flaps K and J are folded inwards to start the formation of the bottom of the carton.

Another feature of erector head 120*b* that can be noted is that a carton location sensor apparatus may be provided and may include a reciprocating sensor rod 380 which, when not in contact with a blank, extends downwards through an aperture 381 in plate 327, below the level of the plane of suction cups 312. When the erector head 120*b* is brought vertically downwards to retrieve a blank on a stack of blanks 111 in magazine 110, the erector head's movement just prior to suction cups 312 contacting with the upper surface of the blank will be generally vertically downwards. Prior to the suction cups 312 contacting the surface of a panel A of a blank, sensor rod 380 will engage the surface of panel A and cause sensor rod 380 (which may be resiliently displaced due to a spring mechanism biasing the rod downwards) to be pushed upwards. This movement upwards of sensor rod 380 relative to plate 327 will physically cause a sensor (not shown) to be activated and send a signal to PLC 132. The sensor may be an inductive proximity sensor. The metal cylinder fixed on the rod is sensed by the sensor's circuitry because it changes the inductance of the induction loop inside the sensor. The sensor may be 871FM-D8NP25-P3 made by ALLEN BRADLEY. PLC 132 may respond to that signal by causing servo drives 150 and 154 to slow down so that the final few centimeters (e.g. 3.5 cm) of movement downwards towards contact between cups 312 and the upper surface of panel A occurs at a much slower rate and also PLC knows how much further vertically downwards erector head 120*b* must be lowered to establish proper contact between suction cups 312 and panel A. It should also be that sensor rod 380 and associated sensor device can also be used to ensure that PLC 132 is aware of whether once a blank has been engaged in the magazine 110, it stays engaged with erector head 120 until the appropriate release location is reached, such as once erection of the carton has been completed.

The particular arrangement of suction cups and rotating paddle on erector heads 120 can be designed based upon the configuration of the carton blank and the particular panels and flaps that need to be rotated. It will also be appreciated that on erector head 120 that is illustrated, suction cups are used to apply a force to hold and/or rotate panels of a carton blank. However alternative engagement mechanisms to suction cups 312 and 320 could be employed.

With particular reference to Figures including FIGS. 1 to 15 and 17, system 100 may also include a folding and sealing apparatus 130. Rail and plough apparatus may be configured to cause all remaining flaps of a blank 111 to be appropriately folded and sealed to produce a carton configuration that is suitable for delivery to a discharge conveyor such as discharge conveyor 117. Apparatus 130 may include the following components: upper and lower folding rails/ploughs 700 and 701; a carton support plate 703; a discharge chute 750; an upper flap closing device 705; a lower flap closing device 707; a right hand compression device 706; and a left hand compression device 704; and a glue applicator 709 (see FIG. 1) having one or more nozzles positioned to apply adhesive to flaps such as flaps J and K. Each of the rails and actuator devices of apparatus 130 may be supported by rods or other members to interconnect the components to support frame 109.

Figure 26:
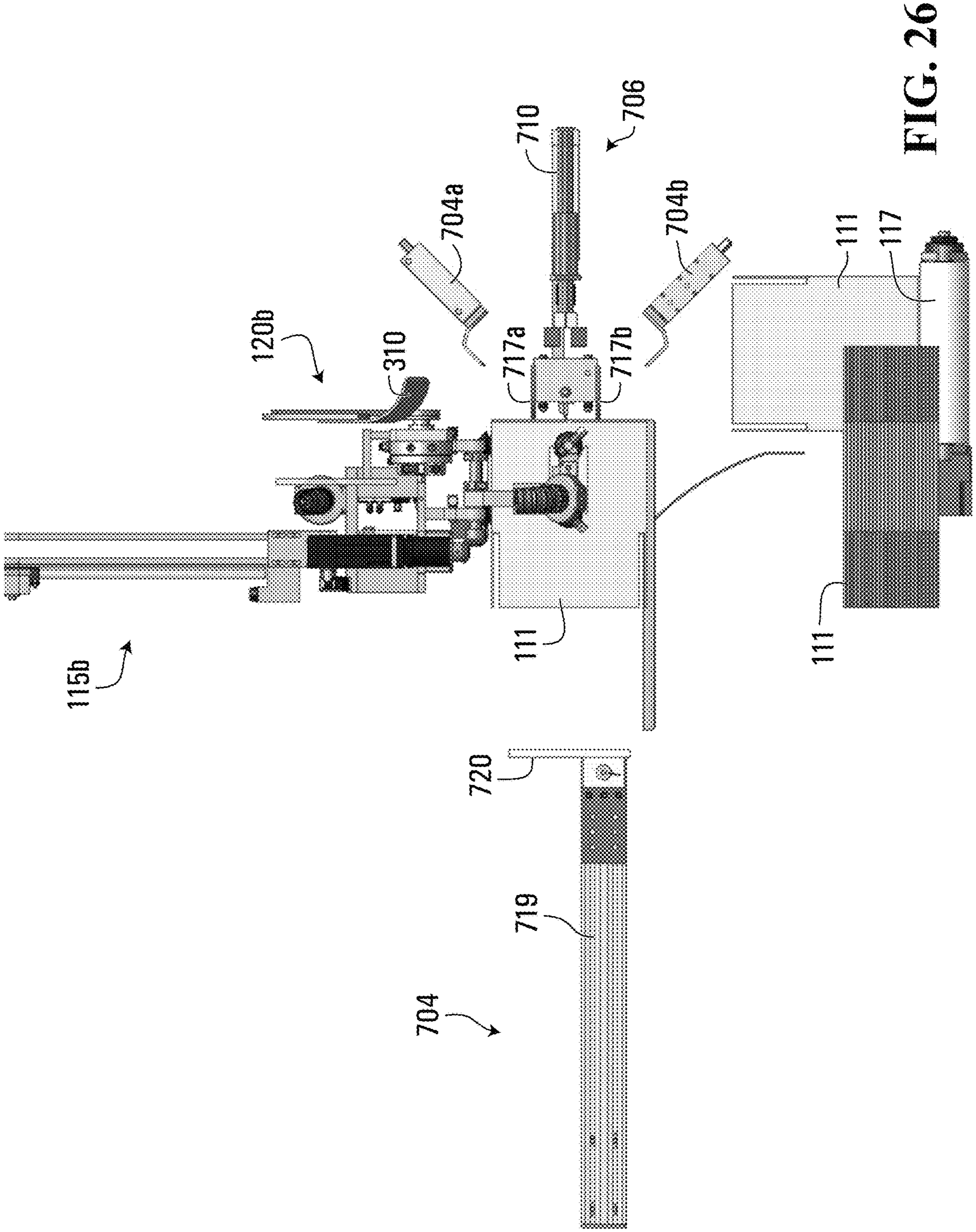
FIG. 26 is a rear elevation view of the components of FIG. 17.

Upper flap actuation device 705 may include a pneumatic actuator device 704*a* having its piston arms connected to an upper plough 708*a*. Similarly, lower flap actuation device 707 may include a pneumatic actuator device 704*b* having its piston arms connected to an upper plough 708*b*. Actuator devices 704*a*, 704*b* may be the model DFM-25-100-P-A-KF, part #170928 made by Festo Right hand compression device 706 may include a central pneumatic actuator 710 with telescoping extendible support rods 712 and 714 horizontally aligned and disposed on either side of actuator 710. Actuator 710 may be a model DNC-32-100-PPV-A part #163309 made by Festo. With particular reference to FIG. 26, actuator 710 may have piston arms that along with ends of support rods 712 and 714 connected to a longitudinally extending sealing plate 716 having attached thereto longitudinally extending upper rail 717*a*, and lower rail 717*b*. Upper rail 717*a* is positioned to be able to engage upper major flap F and lower rail 717*b* is positioned to engage lower major flap G when piston arms of actuator device 710 are extended horizontally and transversely inwards to push flaps F and G into engagement with flaps K and J that are positioned underneath.

Figure 26A:
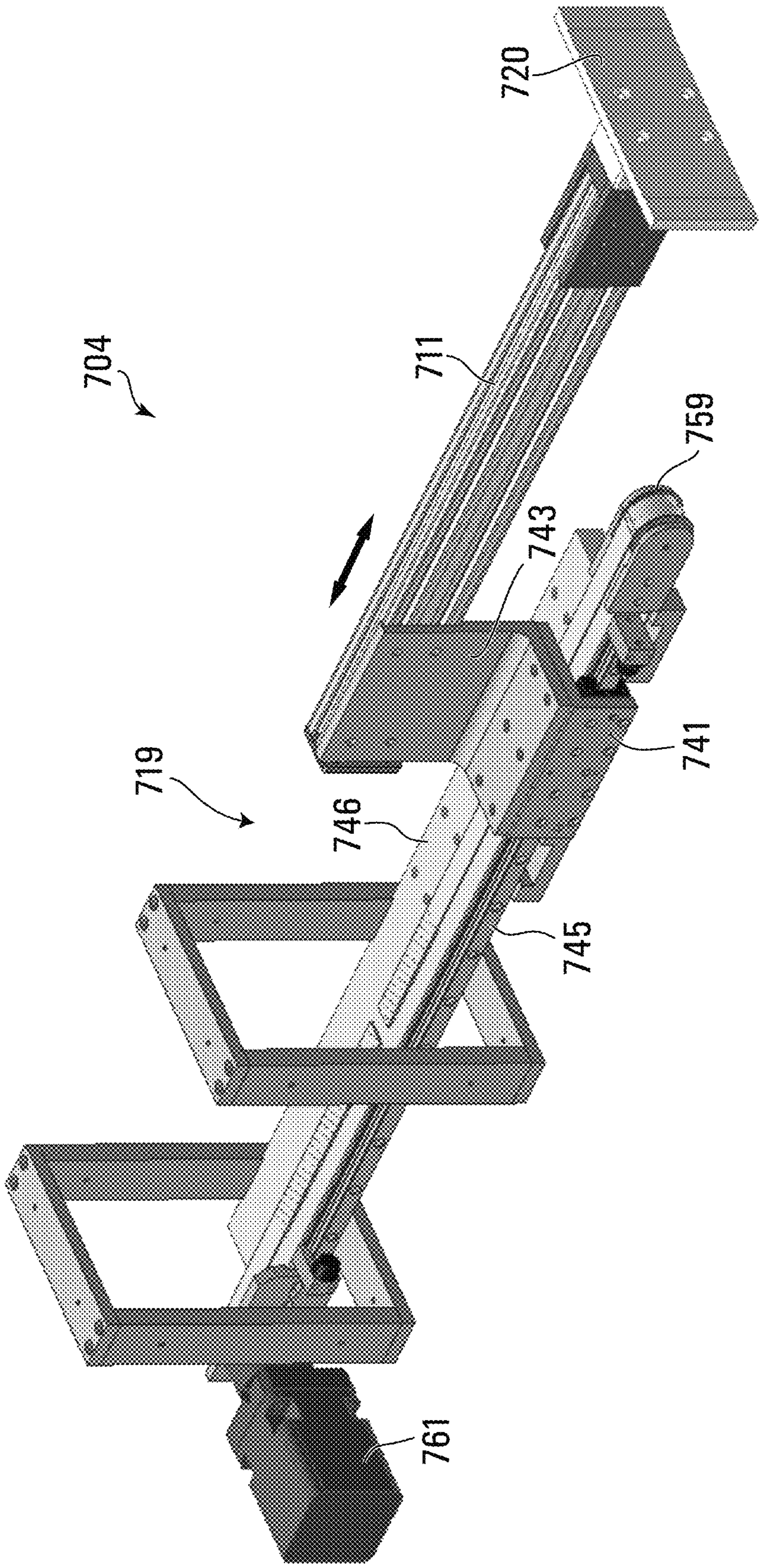
FIG. 26A is a schematic perspective view of part of the folding and sealing apparatus of system shown in FIG. 1A.

Left hand compression ram device 704 has an actuator arm 711 which may be actuated by an actuator device 719 with a vertically and longitudinally disposed plate 720 attached to the end of the actuator arm. Actuator device 719 may be a double acting pneumatic actuator (not shown) that may be provided with pressurized air through hoses, with the air flow being controlled by the solenoid valve device that may be controlled by PLC 132. Other embodiments are possible. For example, with reference to FIG. 26A, a servo-driven actuator for arm 711 may be provided that includes a mounting block 741 that can travel along a rail guide 745 that is secured to a horizontal and longitudinally extending plate forming part of a support frame 746. Mounting block 741 can slide horizontally along rail 745. An L-shaped plate 743 interconnects arm 711 to sliding block 741. Sliding block 741 may also be connected such as with nuts and bolts on its underside to a drive belt 757 made of any suitable material such as for example the same material that may be used in the belts for the moving apparatuses 115—namely a urethane timing belt with steel wires running through it. Continuous drive belt 757 may extend between a freely rotating pulley 759 mounted to an end of frame 746, and a drive wheel of a servo motor 761. Through a servo drive and an absolute encoder. Servo motor 761 may be an Allen Bradley model AB MPL-B320P-MJ22AA and may be interconnected with servo drive to PLC 132. The servo drive may be Allen Bradley model AB. 2094-BM01-S. Motor 761 may be coupled to drive wheel for the belt thorough an APEX GEARBOX model AE070-005.

PLC 132 may control the rotation of the drive wheel driven by the servo motor 761 through use of an encoder (that may be an absolute encoder). Thus the movement of belt 757 can be controlled and PLC can determine in real time, the position of ram arm 711 and thus of compression plate 720. Depending upon the type of, and thickness of material from which blank 111 is formed, the positioning of plate 720 relative to the plate of right hand compression device 706 can be adjusted by PLC 132 to ensure an appropriate degree of compression of the flaps of blank 111 positioned there between.

Each of actuator devices 704*a*, 704*b*, 710 may be double acting cylinders and they may be supplied with pressurized air that is controlled through an electronic valve device (not shown). The valve device may a model CPE14-M1Bh-5J-1/8 valve unit that may be in communication with and be controlled by PLC 132. In this way, PLC 132 can cause the piston arms to be extended and retracted during the processing of carton blanks to achieve the closure and sealing of the flaps.

Actuator device 704*a* and its plough 708*a* may be appropriately positioned and angled downwards (such as at about 45 degrees to the vertical) to be able to fold down major flap F sufficiently to be able to be engaged by right hand compression device 706. Similarly, actuator devices 704*b* and its plough 708*b* may be appropriately positioned and angled upwards (such as at about 45 degrees to the vertical) to be able to fold up major flap G sufficiently to be able to be engaged by right hand compression device 706, substantially simultaneously, or at least allowing of right hand compression device 706 to be able to compress both flaps F and G at the same time towards minor flaps J and K that have upper surfaces containing some adhesive.

Applicator 709 can have nozzles appropriately positioned and their operation may be controlled by PLC 132. Applicator 709 can apply a suitable adhesive to flaps such as leading minor flap J and trailing minor flap K, once they have been folded inwards to form part of the carton bottom. An example of a suitable applicator 709 that can be employed is the model ProBlue 10 applicator made by Nordson Inc. An example of a suitable adhesive that could be employed with on a carton blank 111 made of cardboard is Cool-Lok 034250A-790 adhesive available from Lanco Adhesives, Inc. Applicator 709 may be in electronic communication with PLC 132 which can signal the applicator to apply adhesive at an appropriate time during the positioning of the erector heads 120*a*, 120*b*

Left hand compression device 704 may be used to enter the carton from the left side and compress flaps F, G, J and K between ram plate 720 of left hand compression device 704 and the rails 717*a*, 717*b* of right hand compression device 706. This compression assists in ensuring that the panels are compressed together to ensure that the adhesive appropriately bonds the flaps together to make a solid carton bottom.

In some embodiments, once the left hand compression device 704 and right hand compression device 706 have completed the compression of the flaps, PLC 132 can send a signal to solenoid valve devices causing the compression devices to be withdrawn. The carton will then have been fully erected and is suitable to be loaded with one or more items. Erector head 120*b* may then carry the erected carton to a discharge chute 750 and then release it such that it falls onto discharge conveyor 117 which can then move the erected carton away for further processing. In other embodiments such as the one illustrated, the erected carton 111 can be released and fall onto support plate 703 and remain there until the next carton blank carried by another erector head moved by another movement apparatus (such as erector head 120*a* moved by movement apparatus 115*a*) moves the next carton blank into the location where it will be folded, sealed and compressed. In doing so the newly arrived carton blank pushes the previous fully erected carton downstream where it may fall onto discharge conveyor 117. Carton discharge conveyors are well known in the art and any suitable known carton conveyor may be utilized.

Other examples of transfer devices that might be employed to transfer the carton from apparatus 130 to a carton discharge conveyor include a "blow-off" system that may use one or more jets of compressed air, a suction cup system, the use of pushing arm or simply allowing for freefall of the formed carton.

A sensor 243 (see FIG. 2) such as an electronic eye model 42KL-P2LB-F4 made by ALLEN BRADLEY may be located near the bottom of discharge chute 750. Sensor 243 may be positioned and operable to detect the presence or absence of an erected carton at the input to the discharge conveyor 117. In this way, PLC 132 can be digitally signalled if an erected carton blank 111 is in place at the bottom of the chute 750 such that another erected carton can not be discharged down the chute 750. If so, the system 100 can be stopped by PLC 132 until any fault at discharge conveyor 117 can be rectified.

The overall operation of system 100 will now be described further.

As an initial step PLC 132 may be accessed by an operator through HMI 133 to activate system 100. The system 100 may be initialized with PLC 132 ensuring that all components are put in their "start" positions. At substantially the same time, a stack of cartons may be placed at the input end of conveyor 204 and system 100 may then be activated (such as by PLC 132 being instructed through HMI 133 to commence the processing of a stack of blanks 111.

PLC 132 may then send an instruction to the drive motor of input conveyor 204 to commence to drive belt 214 causing stack of blanks 111 to move downstream. Sometime prior to the stack of blanks reaching alignment conveyor 206, the right-hand-side magazine side guide wall 201 under control of PLC 132 will be driven by servo motor 260 to expand wide enough to allow the stack of blanks to enter on alignment conveyor 206, even if the stack is misaligned and/or the blanks in the stack are not perfectly square with each other. The stack of blanks is moved downstream, until once the front edge of the stack of blanks passes the downstream edge of conveyor 204, sensor 242 will send a signal to PLC 132 indicating that the front edge of the stack has reached the input to alignment conveyor 206. In response, PLC 132 may then send an instruction to the drive motor of input conveyor 204 to commence to drive belt 216 causing stack of blanks 111 to move downstream towards end wall 218 of magazine 110. Once the front edge of the stack of blanks 111 reaches end wall 218, sensor 240 will send a signal to PLC 132 indicating that the front edge of the stack of blanks has reached end wall 218. In response, PLC 132 can then initiate the tampering sequence to "square up" the stack of blanks, as detailed above.

In review, the tampering sequence for ensuring the blanks are properly squared up at the pick up location steps, may include the following steps. The tampering actuator 276 may be extended having been activated by pressurized air controlled by PLC 132 and the associated valve. Then the side guide wall 201 may contract to make contact with the side of the case stack and press the side wall 201 against the left hand side guide wall 200. This aligns the cases so the side edges of blanks are aligned with each other and the longitudinal side wall of the walls 200 and 201. The tampering actuator 276 may then retract, and the tampering bar 280 press the stack forward, thereby aligning the blanks in the stack so that their front and rear edges are vertically aligned with each other and with the inner face of the bar 280 and the inside surface of front wall 218. The stack of blanks 111 is then properly positioned so that the erector heads 120*a* and 120*b* can begin picking up blanks from the stack.

Figure 17:
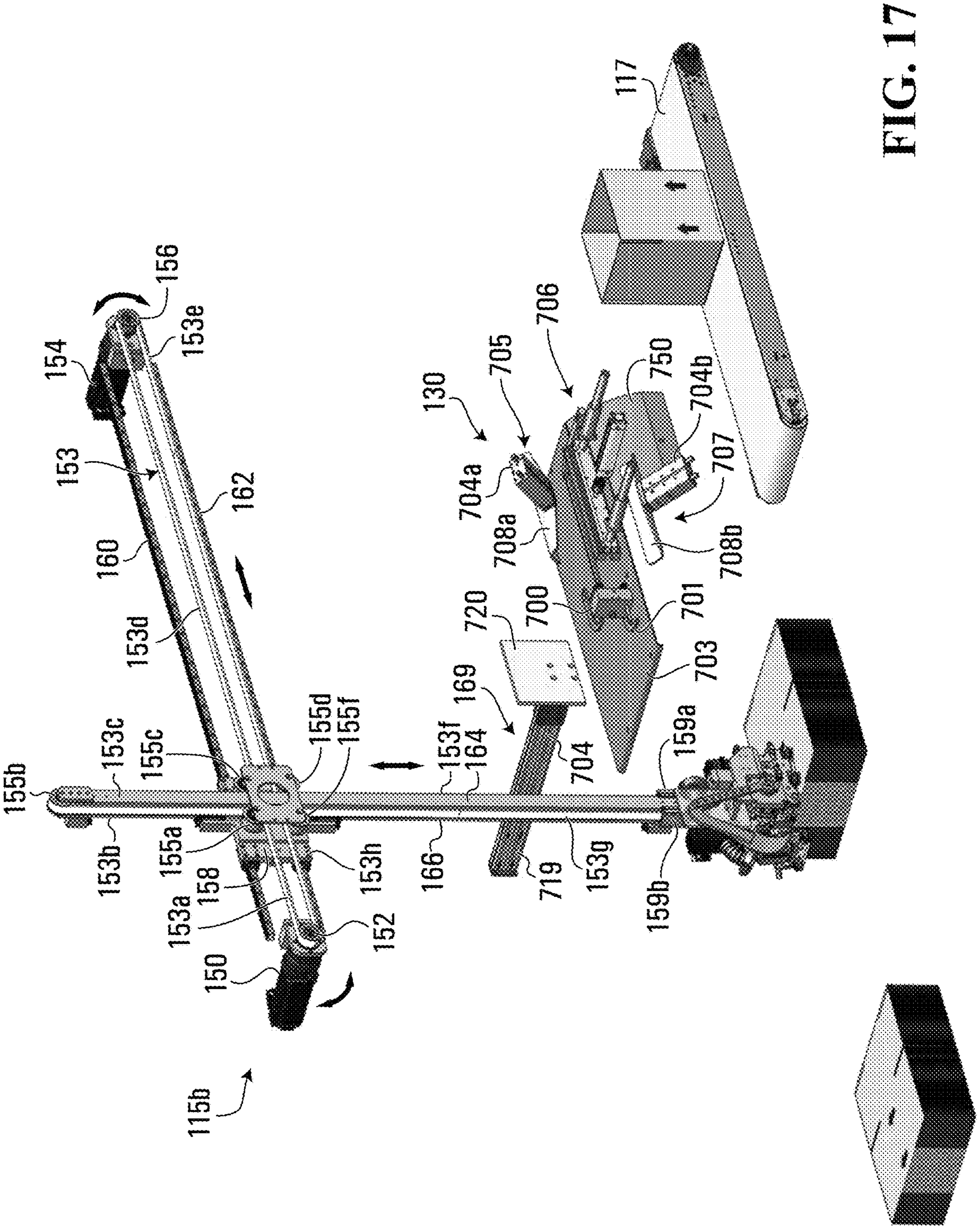
FIGS. 17-25 and 27-29 are schematic right perspective views of system of FIG. 1A, but showing only a single movement apparatus, erector head and some parts of the folding and sealing apparatus, in various sequential stages of a blank of FIGS. 10A to 10E being processed into an erected carton.

One of the erector heads such as erector head 120*b* will be positioned by the control of PLC 132 over movement apparatus 115*b*, at the zero position calibrated for the head 120*b*. PLC 132 may then cause servo motors 150 and 154 to be operated to achieve the following sequence of operations:

First the head 120*b* may be moved to the pick up position as shown in FIG. 17.

As the erector head 120*b* is being brought vertically downwards to retrieve the top blank on a stack of blanks 111 in magazine 110, the erector head's movement just prior to suction cups 312 contacting with the upper surface of the blank will be generally vertically downwards. Prior to the suction cups 312 contacting the surface of a panel A of a blank, sensor rod 380 will engage the surface of panel A can cause sensor rod to be pushed upwards. This movement upwards of sensor rod 380 relative to plate 327 will physically cause the sensor to be activated and send a signal to PLC 132. PLC 132 may respond to that signal by causing servo drives 150 and 154 to slow down so that the final few centimeters (e.g. 3.5 cm) of movement downwards towards contact between cups 312 and the upper surface of panel A occurs at a much slower rate. Also PLC knows how much further vertically downwards erector head 120*b* must be lowered to establish proper contact between suction cups 312 and panel A. It should also be that sensor rod 380 and associated sensor device can also be used to ensure that PLC 132 is aware of whether once a blank has been engaged in the magazine 110, it stays engaged with erector head 120 until the appropriate release location is reached, such as once erection of the carton has been completed.

Figure 18:
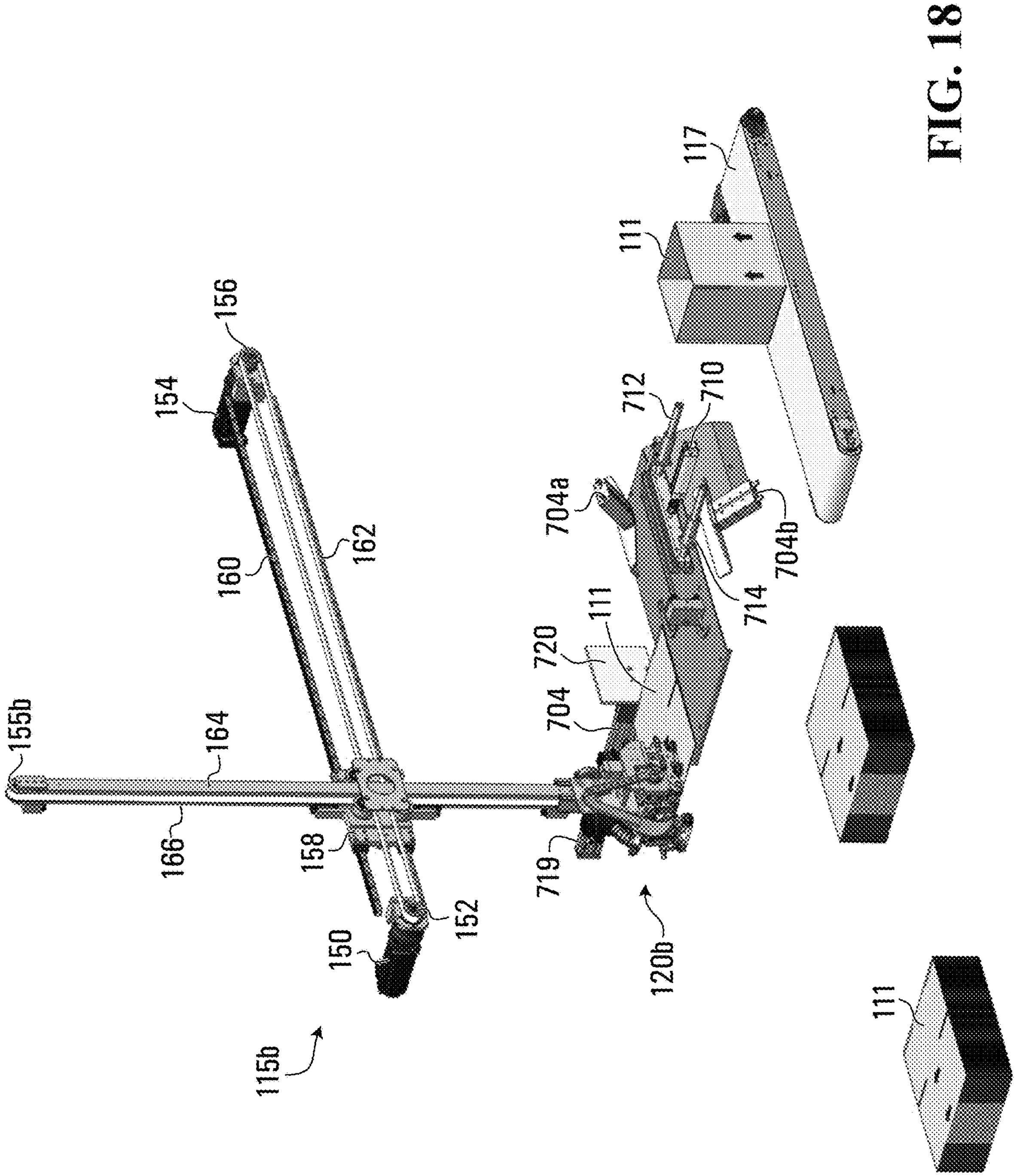

PLC 123 will also operate the valve device 340 on head 120*b* to cause suction force to be developed at suction cups 312 and optionally also 320 (although suction at suction cups 320 can be delayed);

With the head 120*b* in the pick up position shown in FIG. 17 and the suction force being applied at suction cups 312, the head 120*b* can engage the panel A (see location of suction cup outline on FIG. 10A) and then commence to lift upwards the blank as shown in FIG. 18. PLC 132 will know how high to lift the upper surface of blank 111, to ensure that once opened up, the datum line W1 will be appropriately vertically located so that components of folding and sealing apparatus 130 will be able to fulfil their functions as described above.

Figure 19:
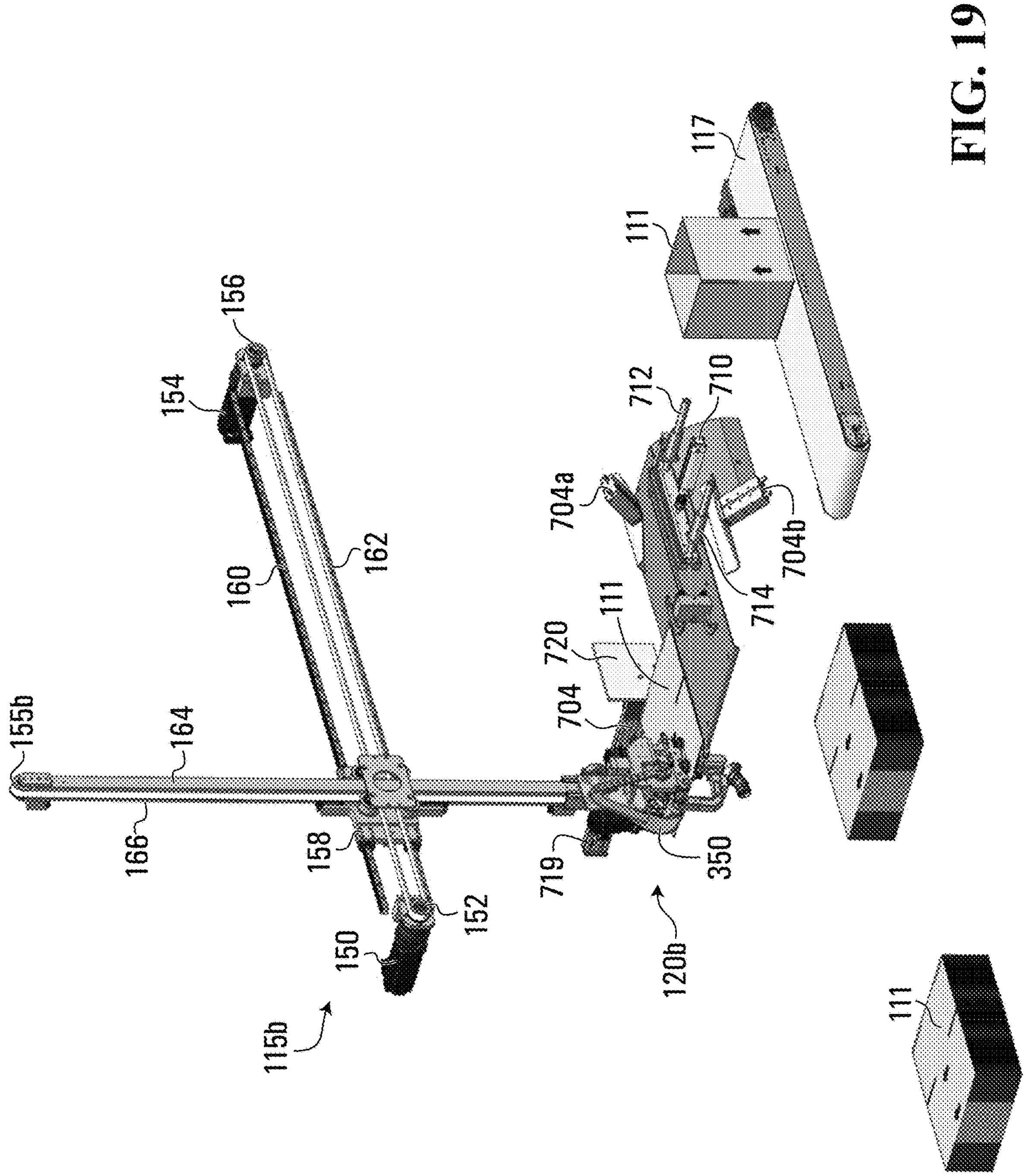

Preferably when erector head 120*b* has reached a determined vertical position, and preferably while the erector head 120*b* is not moving longitudinally towards folding and sealing apparatus 130, PLC 132 will send a signal to cause servo motor 134 to rotate which will then cause shaft 342 to rotate in a particular desired direction at a particular desired rotational speed for a desired amount of time. PLC 132 can control the rotational position of shaft 342 to cause rotator device 350 which is fixedly attached to shaft 342 to rotate with shaft 342. Thus rotator device 350 may be rotated to the position shown in FIG. 19 and at that position suction cups 320, which will have suction engaged, will attach to the underside of blank 111, and in particular to panel D.

Figure 20:
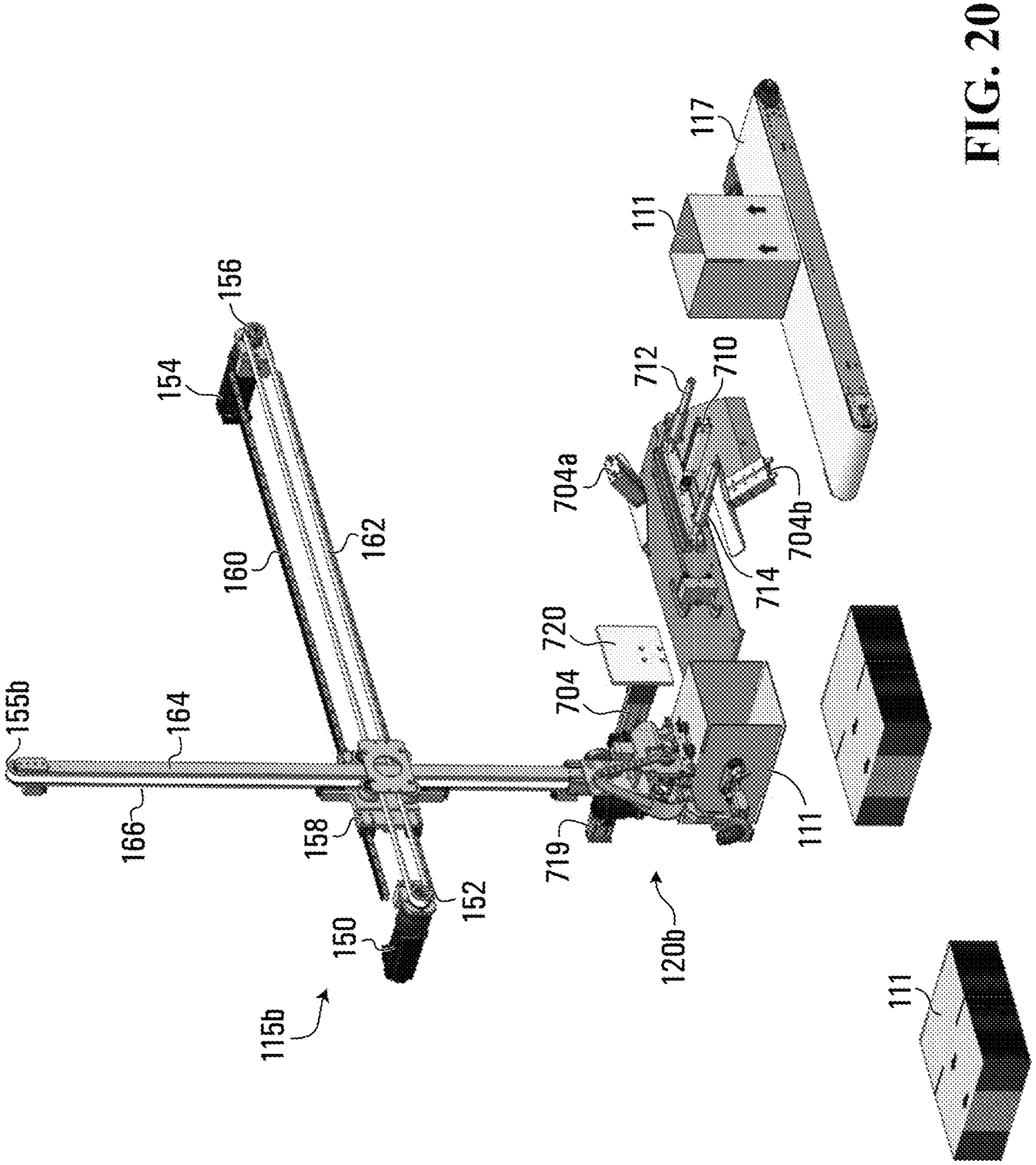

The next operation is the blank opening whereby through control of PLC 132, opposed forces provided by suction cups 312 acting upwards on top and suction cups 320 acting in an opposite downward direction will start to pull the flattened blank apart. The forces are then continued by the suction cups 312 above and 320 below, as rotator device 350 is rotated 90 degrees backwards to the position shown in FIG. 20.

During the backwards rotation of rotator device 350, actuator device 325 may be supplied with pressurized air controlled through valve device 340 to activate the actuator device. PLC 132 may send a signal to valve device 340 to operate actuator device 325 to extend piston arms 326 at a particular angular position of arm 351 and or location of erector head 120*b* that is provided by the encoder associated with servo motor 364. PLC 342 may cause, acting through valve device 340, actuator device 325 to be actuated at approximately the same time as the cups 320 have contacted the surface of downward facing panel D and the rotation of arm 351 is just about to begin or has just commenced. Piston arms 326 may be completely extended by the time arm 351 has rotated about 45 degrees. The piston arms 326 may continue to be extended and stay extended when rotator device 350 is at the 90 degrees position shown in FIG. 20.

Figure 21:
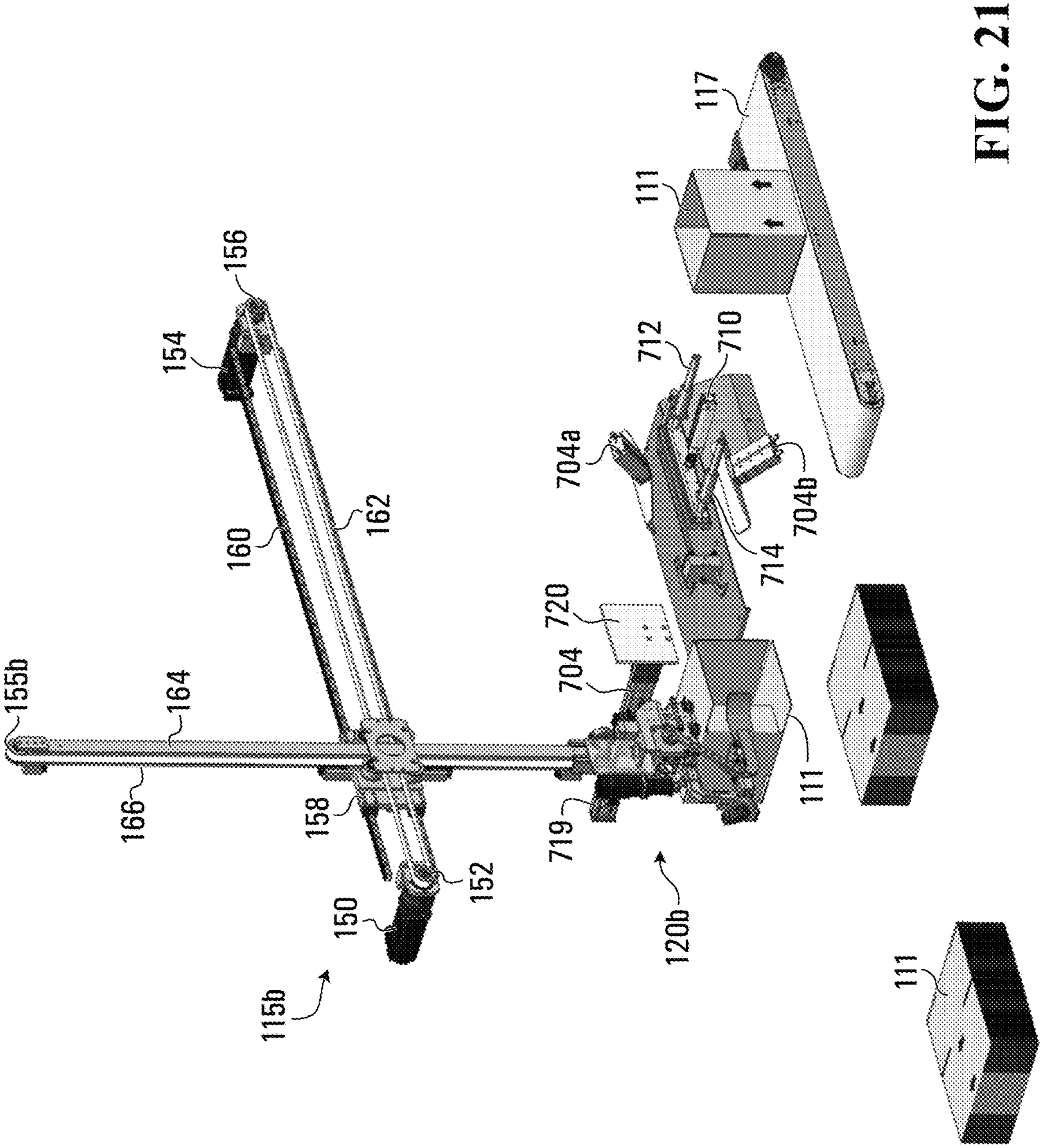

Once the blank 111 has been opened, erector head 120*b* can securely hold the blank by the suction forces exerted by cups 312 and 320, to panels A and D. Also, once opened the flaps K and J need to be folded inwards towards the bottom opening of the carton. In the embodiment shown in Figures such as FIGS. 17 to 29, the trailing minor flap K is closed by actuation of paddle 310 as shown in FIG. 21. Thus PLC 132 can send a signal to valve device 340 which causes rotary actuator 397 to rotate shaft 316 and thus rotate paddle 310. Paddle 310 can then engage trailing minor flap K of blank 111 and cause it to fold about its fold line where it joins to panel D. Thus, flap K can be folded inwards towards the bottom opening of blank 111.

Figure 22:
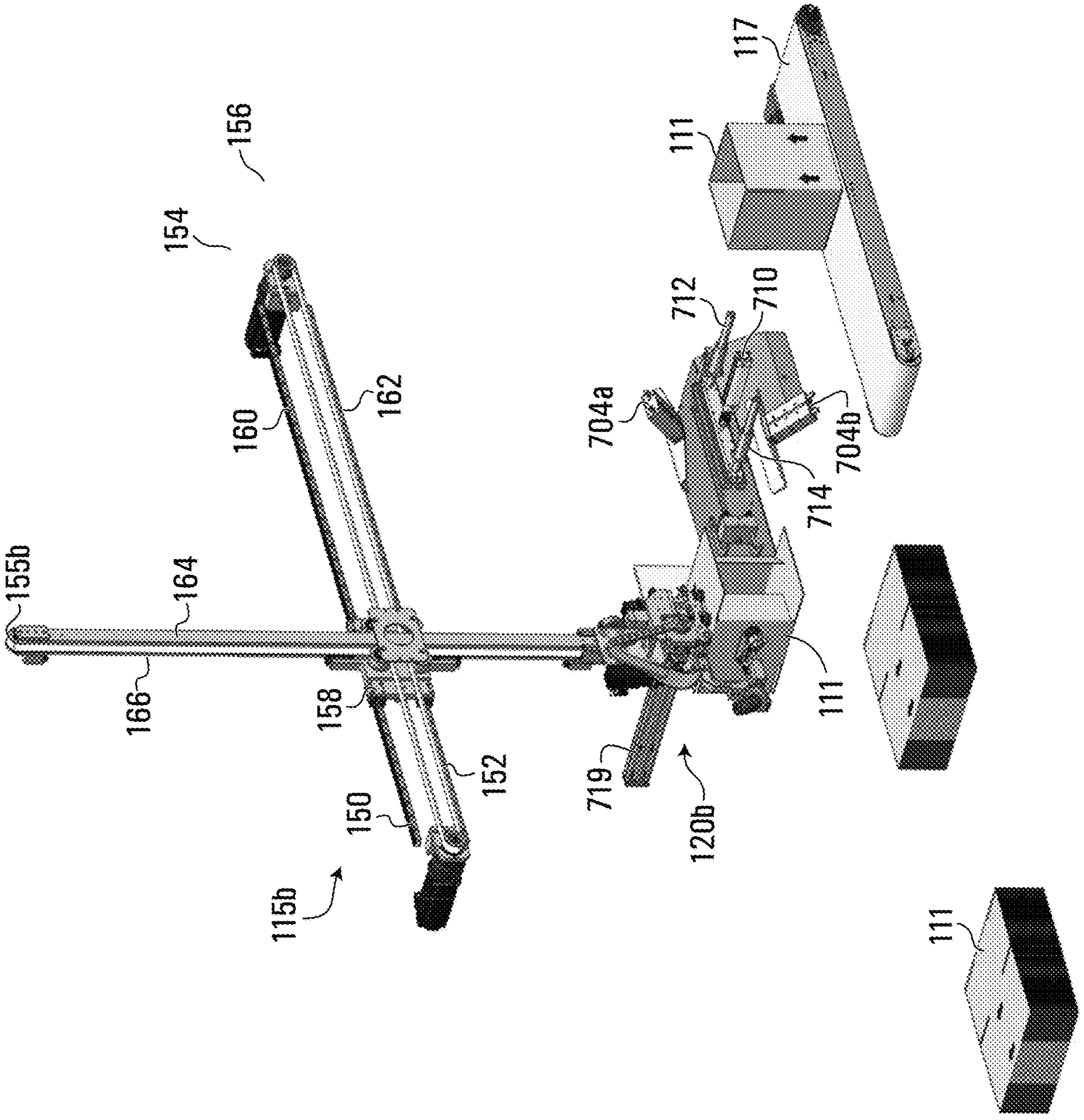

Leading bottom flap J may also be folded about its fold line which joins it with panel B by engagement of the flap with upper and lower folding rails/ploughs 700, 701 that form part of folding and sealing apparatus 130 as erector heads 120*b* is moved longitudinally downstream towards apparatus 130. As the blank 111 held by erector head 120*b* is moved longitudinally downstream into the folding and sealing apparatus 130 the leading bottom flap J can be folded inwards by rails/ploughs 700, 701, so that both bottom flaps K and J have been folded inwards to start the formation of the bottom of the carton, as is shown in FIG. 22.

Figure 23:
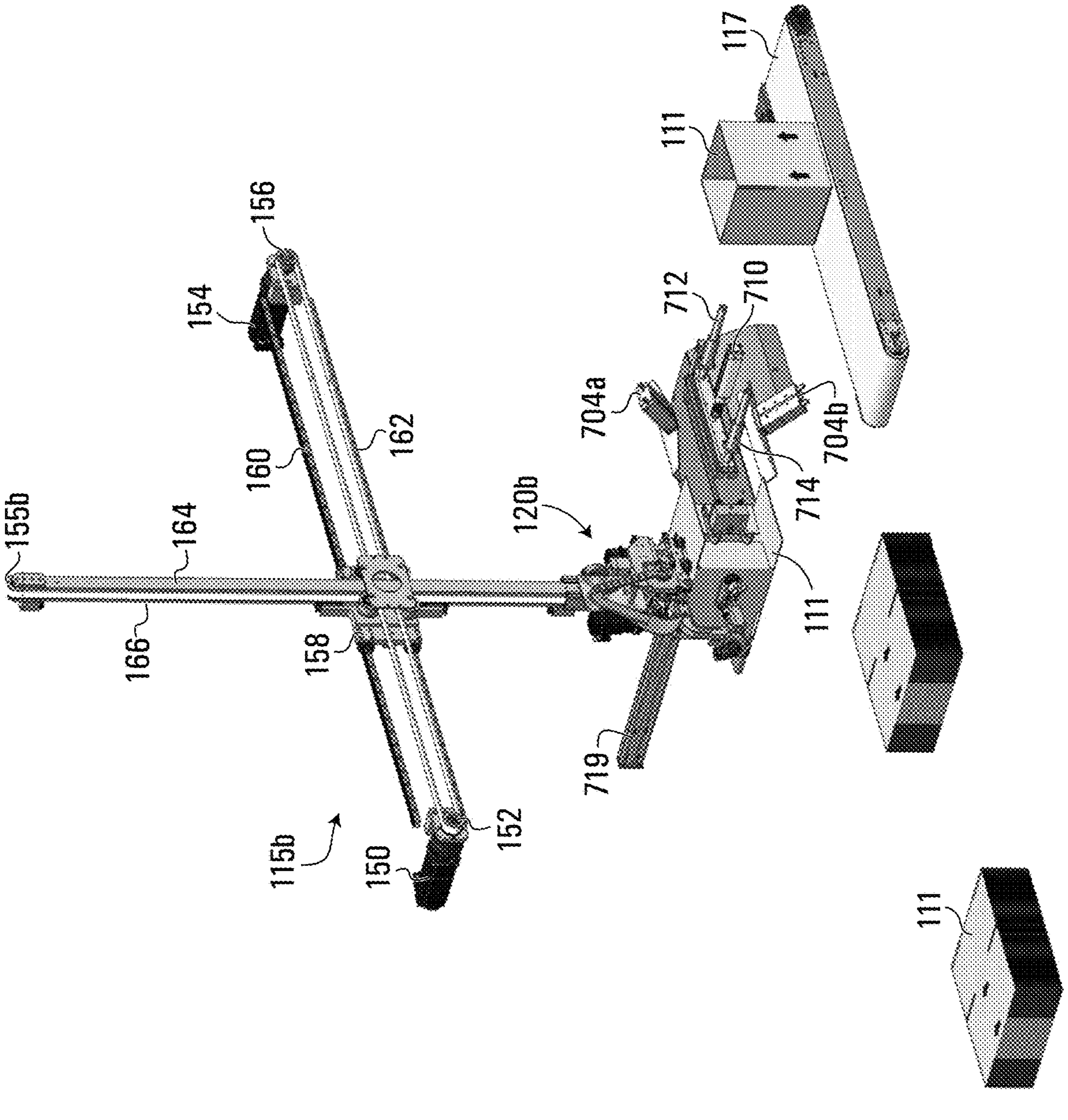
Figure 24:
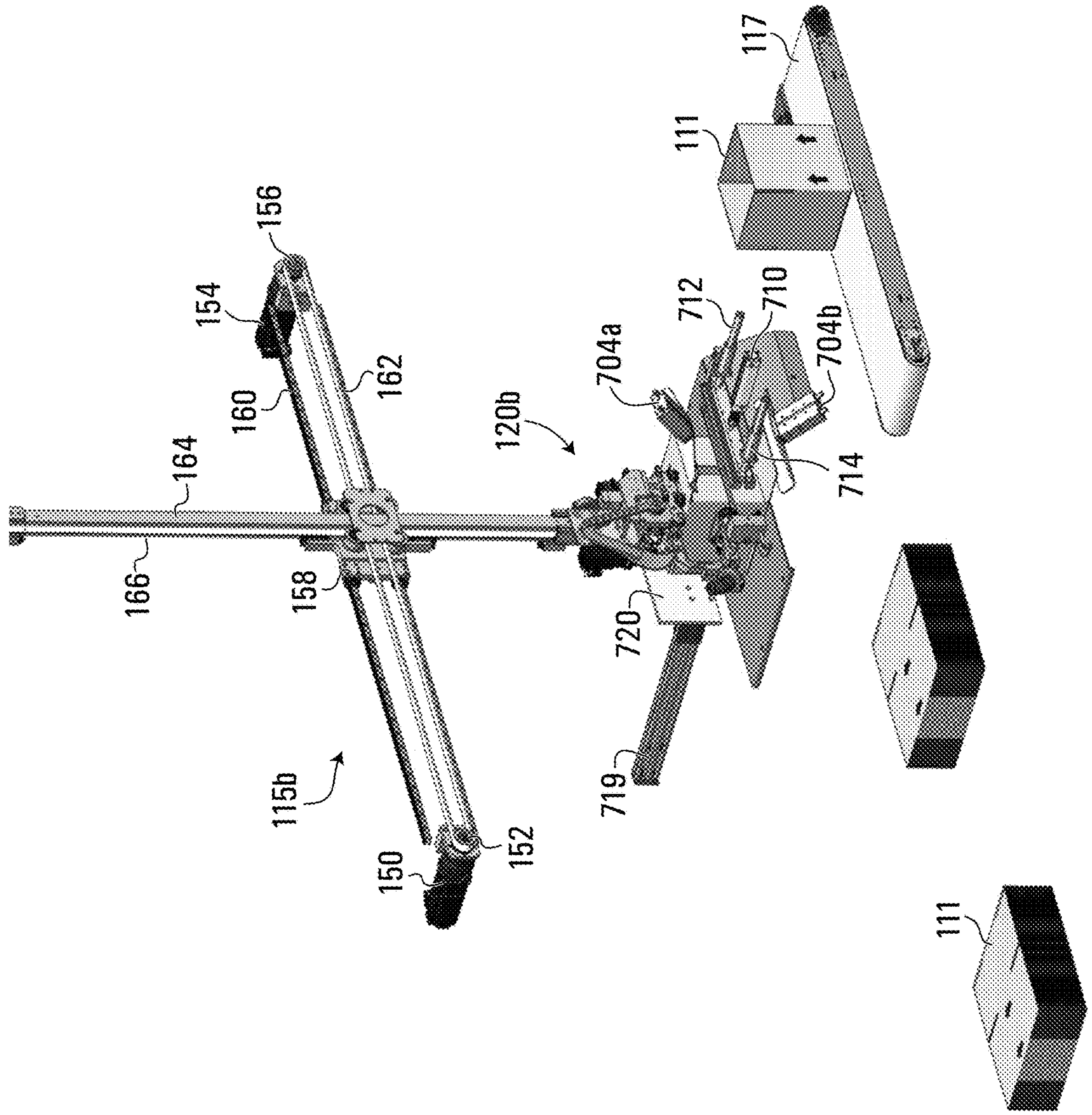
Figure 25:
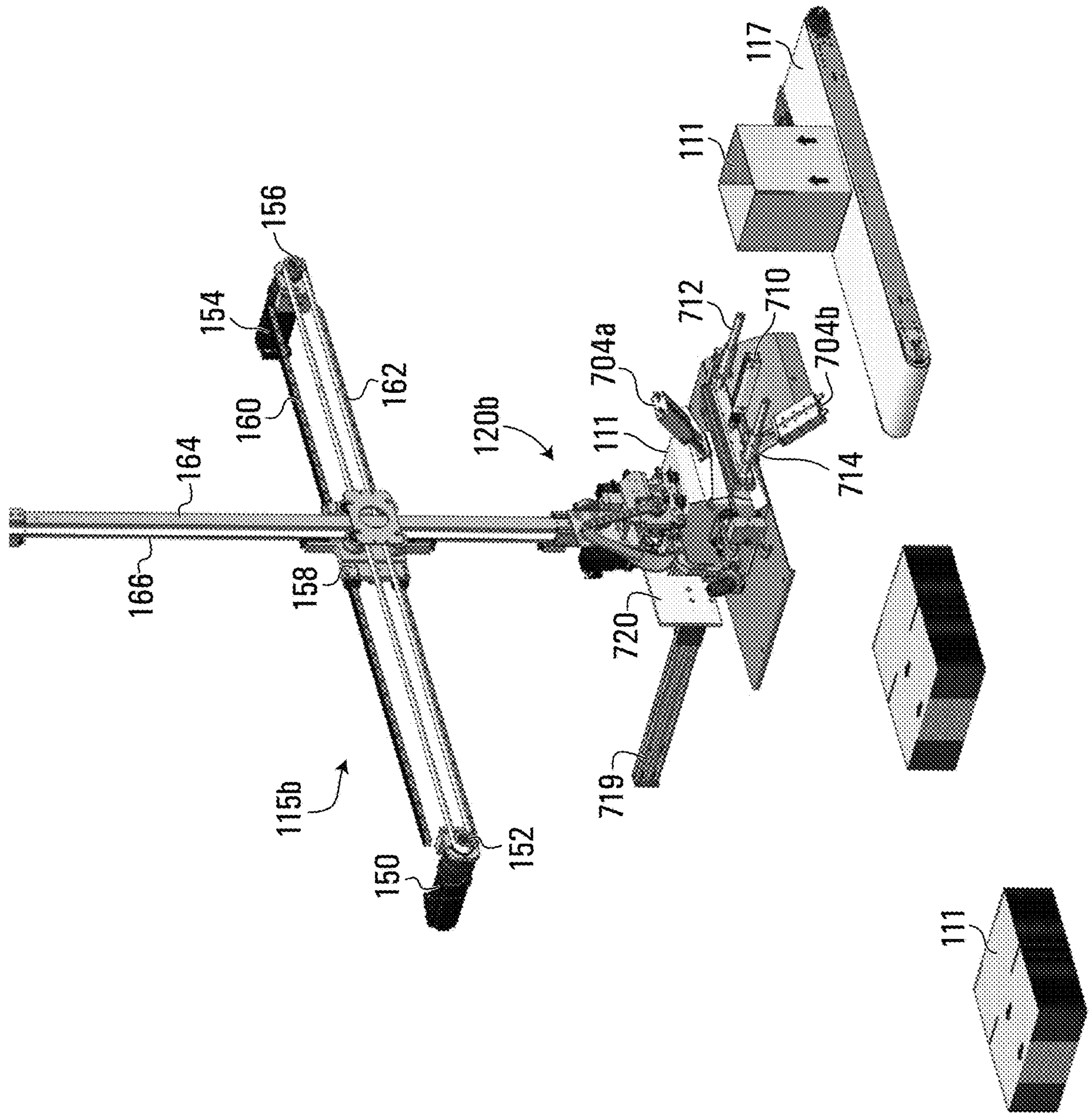

Also when the flaps K and J have been folded inwards, under the control of PLC 132, or pursuant to another control or trigger, adhesive applicator 709 can through appropriately positioned nozzles, apply a suitable adhesive at appropriate positions on the flaps K and J such as shown. The application of glue can occur before, during, or after PLC 132 has caused movement apparatus 115*b* to move erector head 120*b* to a downstream location where the major flaps F and G can be folded and compressed onto minor flaps K and J. As shown in FIG. 23, glue may be applied while movement apparatus 115*b* is moving erector head 120*b* to the downstream location for closing the bottom opening by folding and compression.

Next upper flap actuation device 705 may be activated by PLC 132 acting through a valve device to cause pneumatic actuator device 704*a* to extend piston arms connected to an upper plough 708*a*. Similarly, lower flap actuation device 707 may also be activated substantially simultaneously by PLC 132 such that pneumatic actuator device 704*b* extends its piston arms connected to lower plough 708*b* as shown in sequential FIGS. 24 and 25.

Next, as shown in FIG. 26, right hand compression device 706 with its central pneumatic actuator 710 may have piston arms extended so that longitudinally extending sealing plate 716 having attached thereto longitudinally extending upper rail 717*a*, and lower rail 717*b* engages the upper and lower major flaps F and J. Upper rail 717*a* is positioned to be able to engage upper major flap F and lower rail 717*b* is positioned to engage lower major flap G when piston arms of actuator device 710 are extended horizontally and transversely inwards to push flaps F and G into engagement with flaps K and J that are positioned underneath. Upper and lower flap actuation devices 705 and 707 may be withdrawn by PLC 132 when compression device 706 has engaged flaps F and G.

Figure 27:
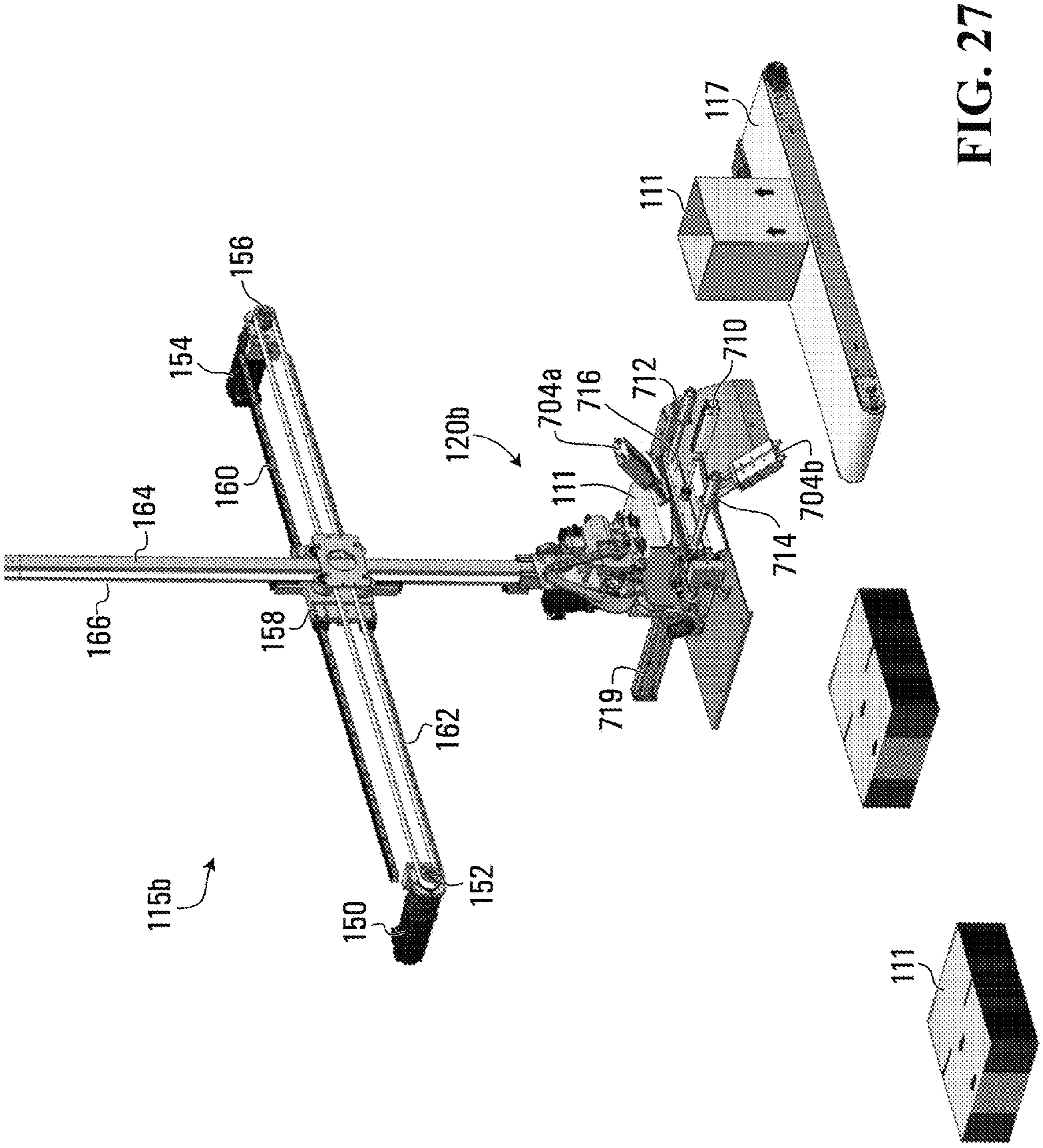

Next, as shown in FIG. 27, left hand compression device 704 may be used to enter the carton from the left side and compress flaps F, G, J and K between ram plate 720 of left hand compression device 704 and the rails 717*a*, 717*b* of right hand compression device 706. This compression assists in ensuring that the panels are compressed together to ensure that the adhesive appropriately bonds the flaps together to make a sold carton bottom.

Figure 28:
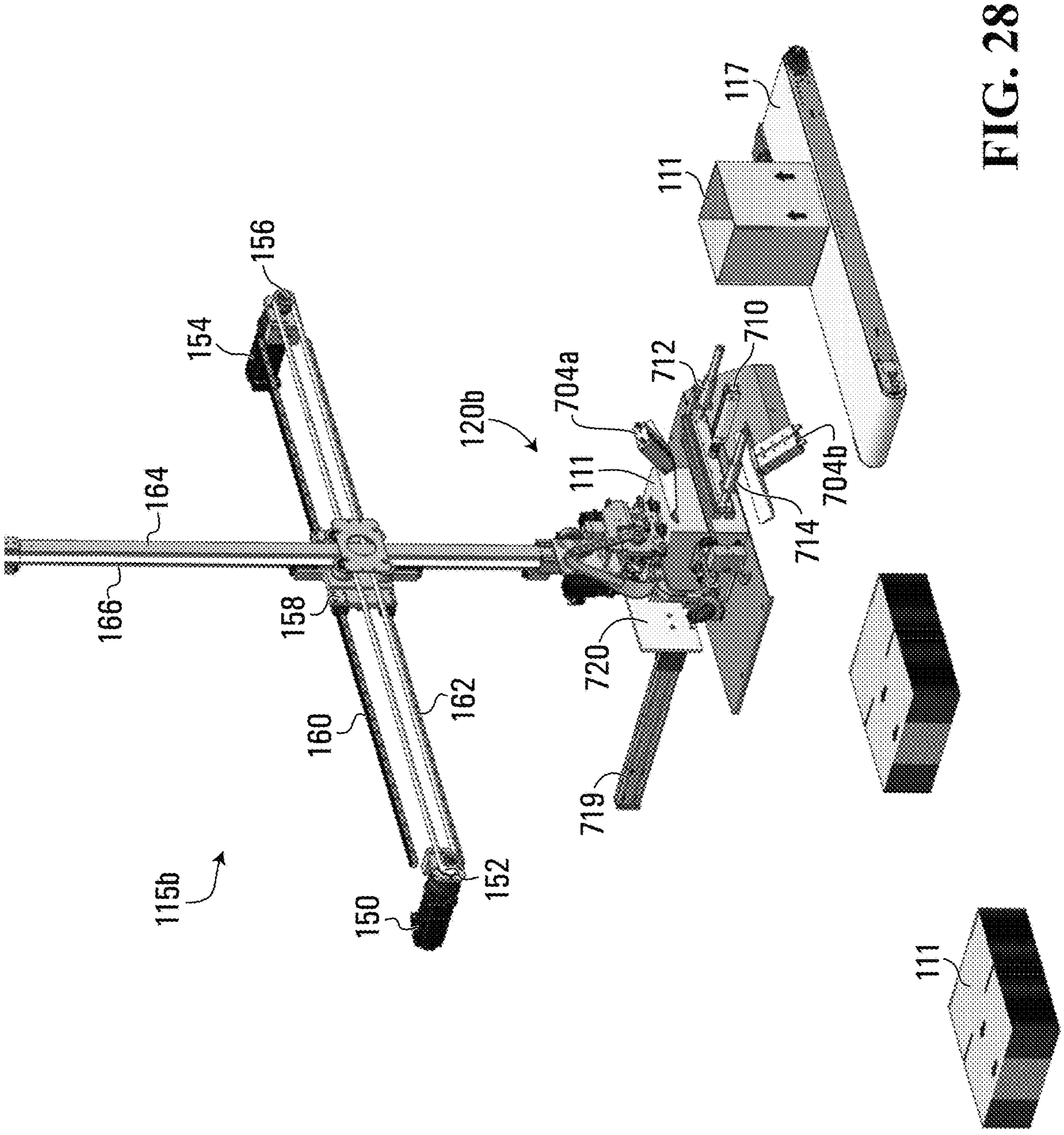
Figure 29:
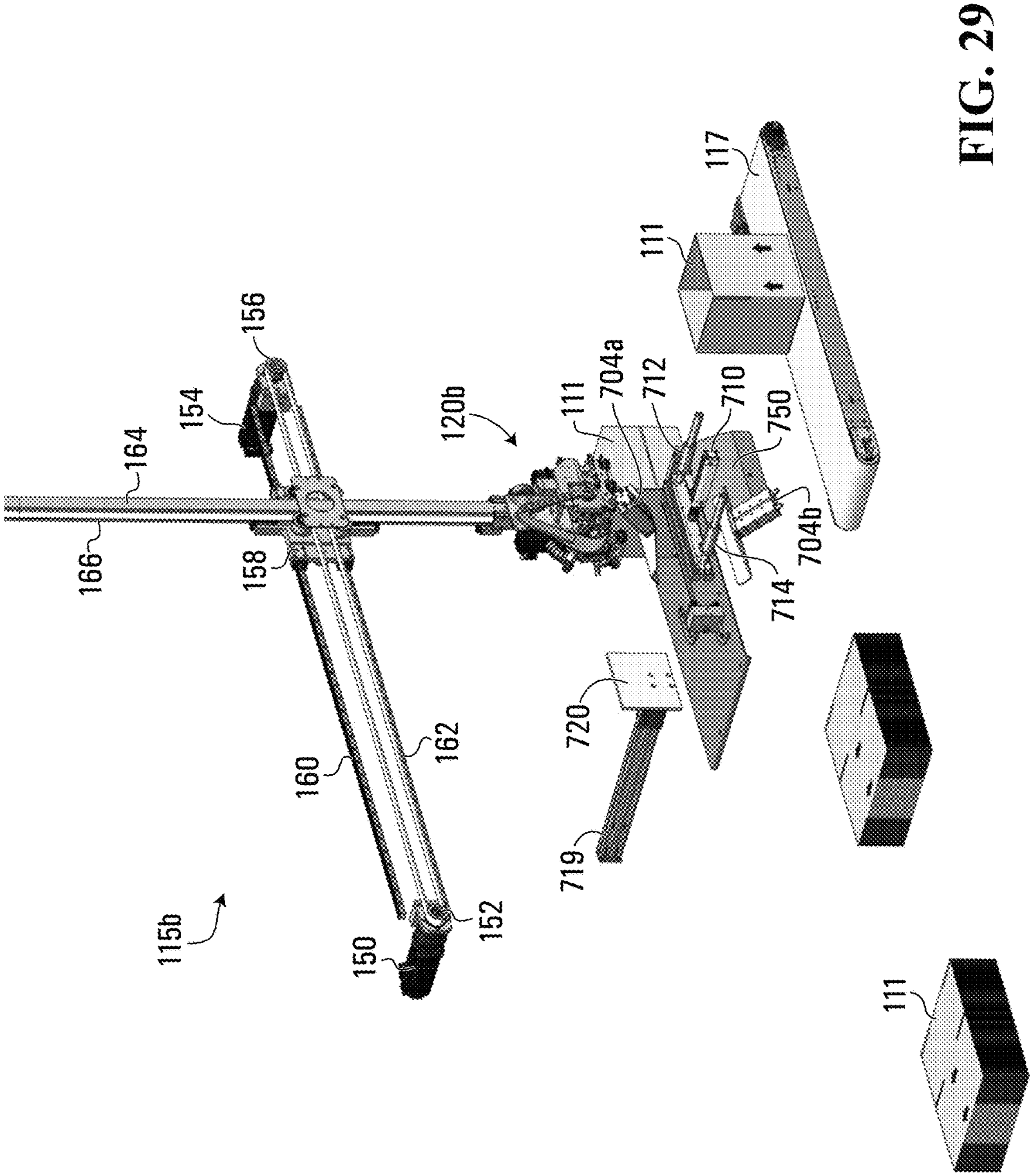

Once the compression has been held for a short time (for example about 0.5 seconds) to allow the glue to sufficiently set/harden and bond the flaps together, the compression can be released by withdrawing left hand compression device 704 and right hand compression device 706 as shown in FIG. 28. The carton is then fully erected and released from both apparatus 130 and from erector head 120*b* as PLC 132 will cause suction cups 320 and 312 to have their suction force turned off by valve device 340. Additionally, PLC 132 can cause rotator device 350 to be rotated backwards a further 90 degrees to the horizontal ready position shown in FIG. 29.

Thereafter, erector head 120*b* can release the erected carton which can then fall onto support plate 703 and remain there until the next carton blank carried by another erector head moved by another movement apparatus (such as erector head 120*a* moved by movement apparatus 115*a*) moves the next carton blank into the location where it will be folded, sealed and compressed, and in doing so pushes the previous fully erected carton downstream to chute 750 where it may fall onto discharge conveyor 117.

Figure 12:
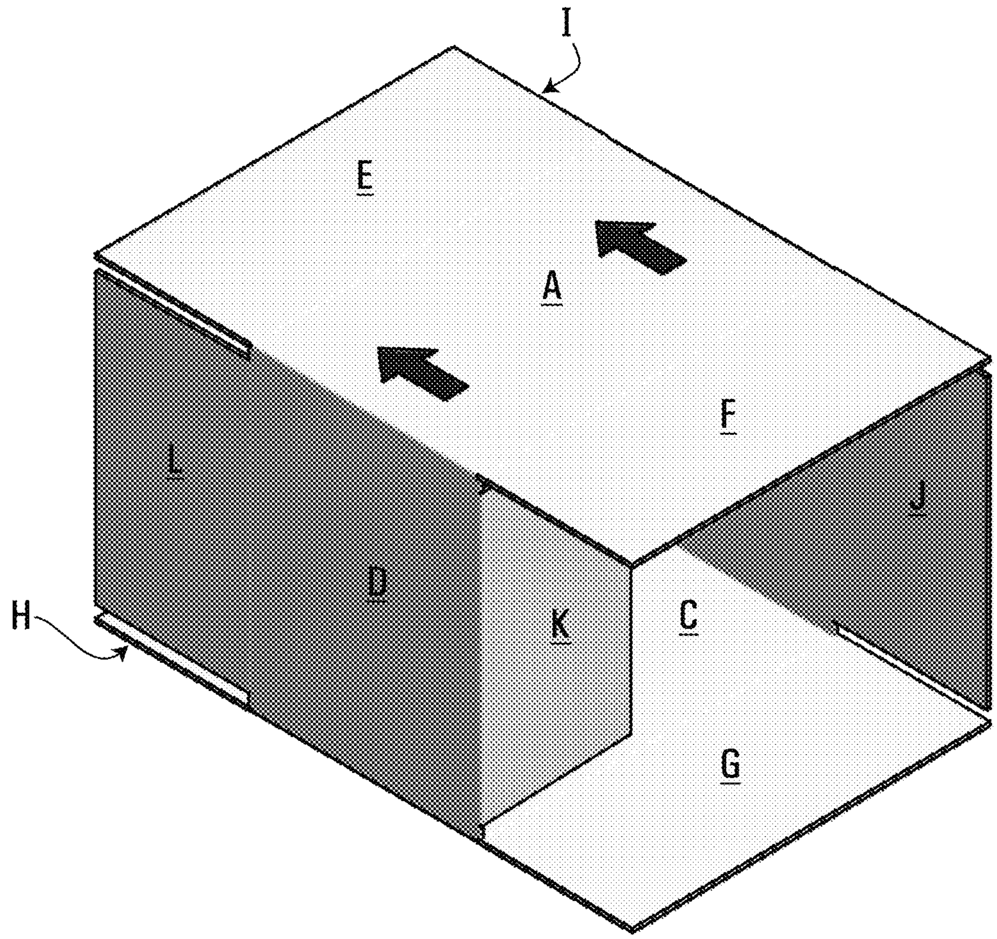
Figure 13:
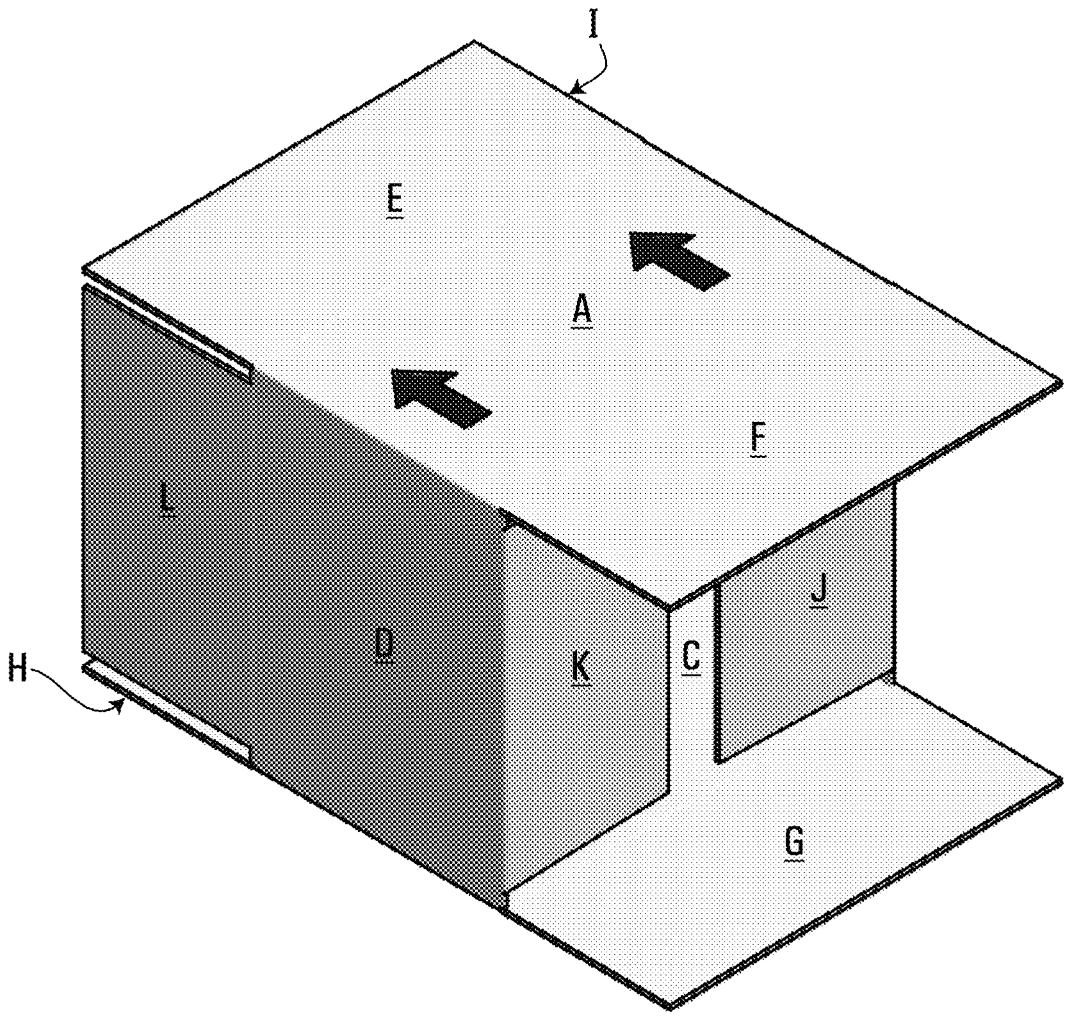
Figure 14:
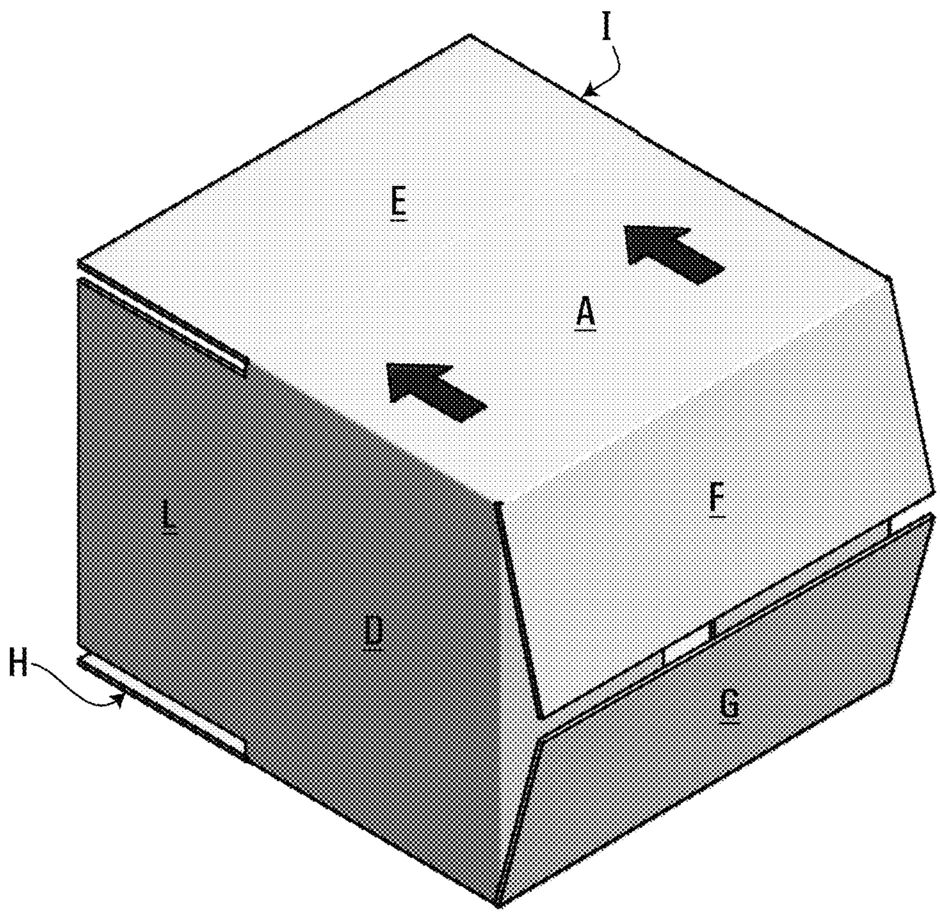
Figure 15:
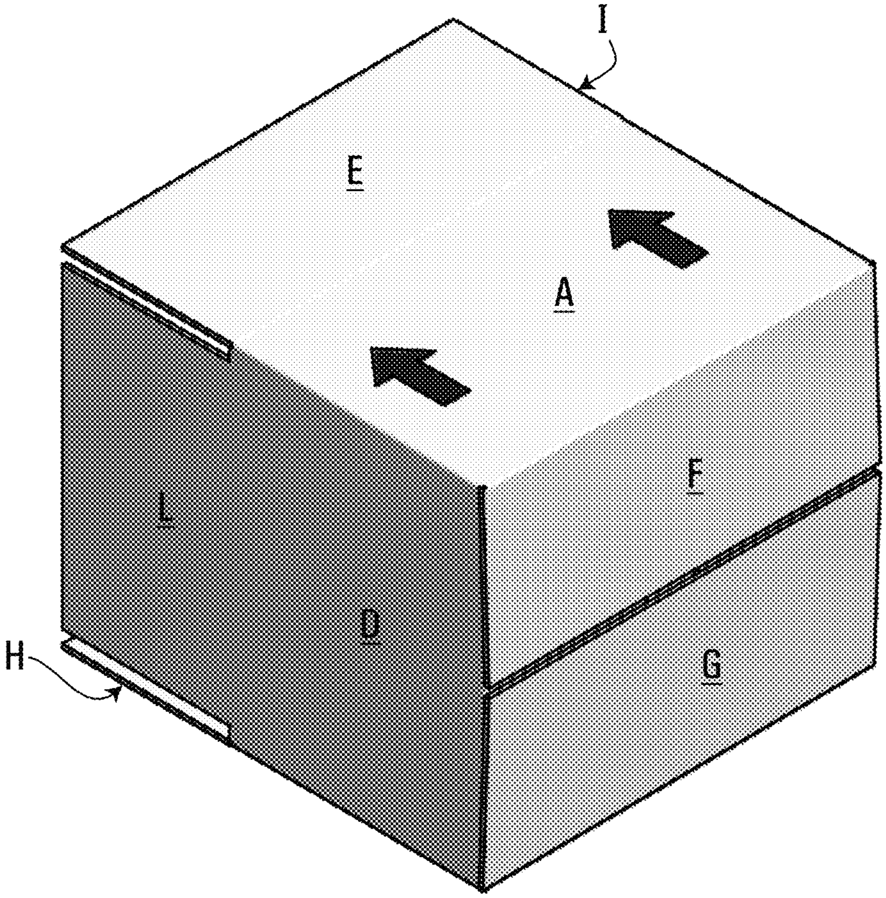
Figure 16:
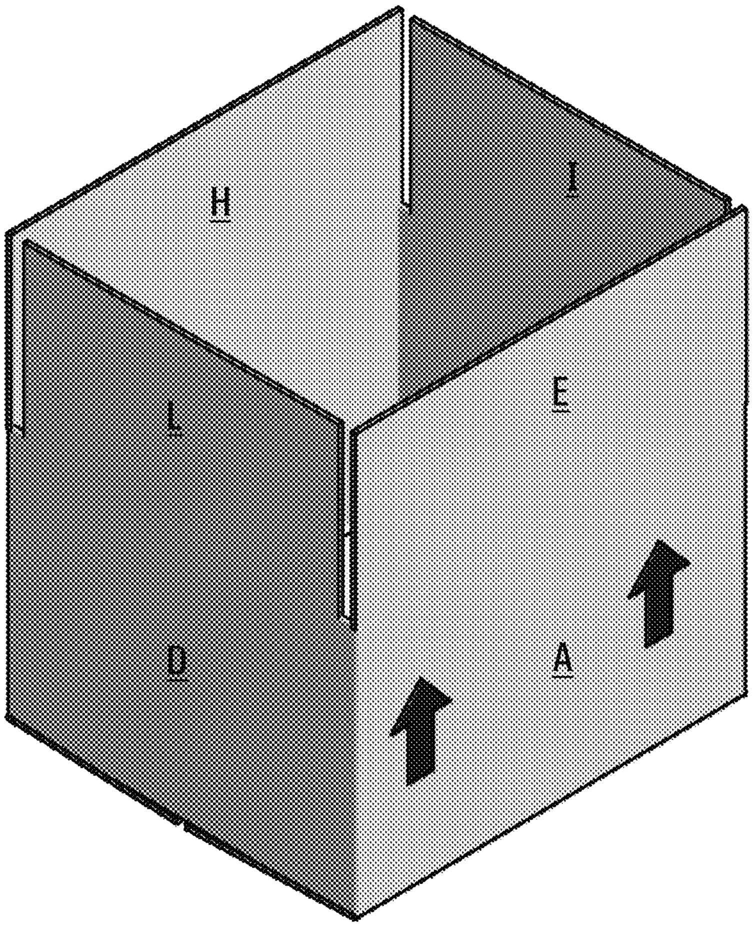

The entire sequence of movement of a blank 111 as it is processed by system 100 is shown in isolation in FIGS. 10A-D, and FIGS. 11 to 16. In FIGS. 10A-D the blank is shown in its flattened tubular configuration. In FIG. 11 it is shown in its opened configuration after being opened by an erector head like erector head 120. In FIG. 12 it is shown with the trailing minor flap K folded inwards and in FIG. 13 it is shown with leading minor flap J also folded inwards. In FIG. 14 blank 111 is shown with the major bottom flaps F and G folded inwards and in FIG. 15 the blank is shown when the flaps J, K, F and G are being or have been compressed to seal the bottom of the carton. Finally in FIG. 16 the erected carton is shown with its opening facing upwards so that it may be loaded with one or more items.

While the foregoing handling of a carton blank 111 by erector head 120*b* has been occurring, erector head 120*a*, being supported and moved by movement apparatus 115*a*, can be carrying out the same process but do so out of phase with erector head 120*b*. For example, the cyclical movement and operation of erector head 120*a* may be 180 degrees out of phase with the movement and operation of erector head 120*b*. By providing two erector heads 120*a* and 120*b* operating simultaneously, but out of phase so one does not interfere with the other, the processing capacity of blanks can be increased significantly. But in using only one erector head 120, the processing capacity of the system 100 may still be relatively high. In part the relatively high processing capacity is also due to the relatively short "stroke" (i.e. longitudinal distance) that the erector heads must travel when carrying out the blank retrieval, erection, folding, sealing and compression. This means that the components do not have to travel such a great distance as in conventional carton erectors. When using two erector heads with moving apparatuses, 100 may be capable of processing about 35 cartons per minute.

Many variations of the embodiments described above are possible. By way of example only an alternate configuration for an erector head 1120 and folding and sealing apparatus 1130 is shown in FIGS. 34*a* to 44.

Figure 34A:
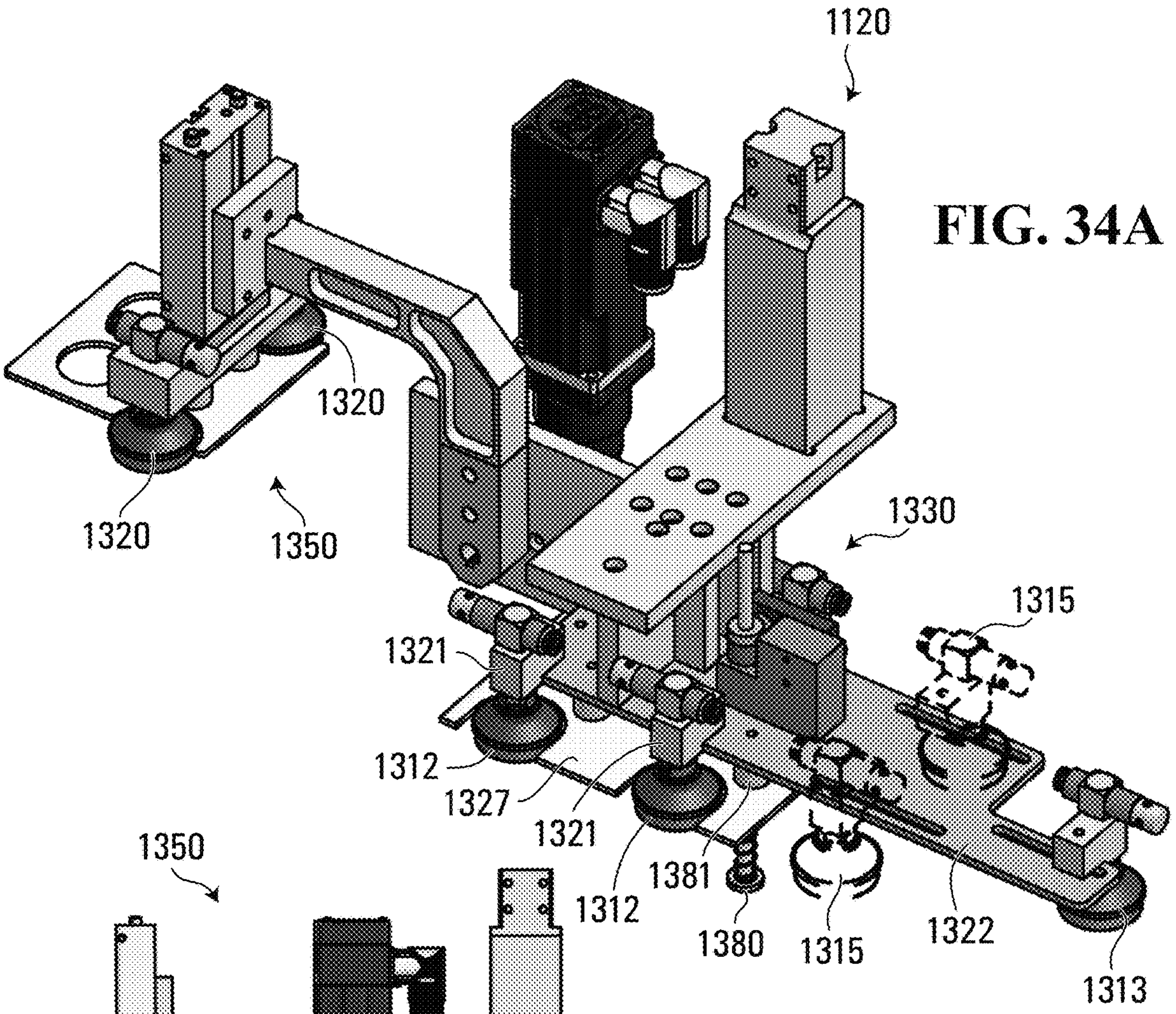
FIG. 34A is a top right perspective view of a second embodiment of an erector head.
Figure 34B:
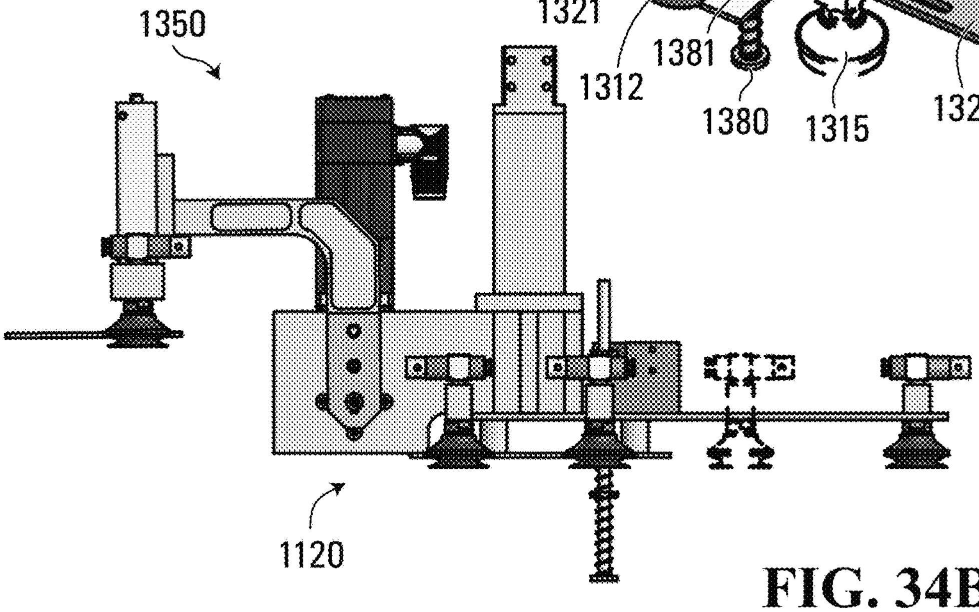
FIG. 34B is a right side elevation view of the erector head of FIG. 34A.

With reference to FIGS. 34*a* and 34*b*, erector head 1120 is built in substantially the same way as erector head 120 and functions in the same way apart from the following major differences. Erector head 1120 does not include a paddle member like paddle 320 on erector head 120. As will be described hereinafter, the component and functionality for closing minor trailing flap K of a blank 111 can be moved off the erector head and may become part of a modified folding and sealing apparatus 1130 (see for example FIG. 36).

Erector head 1120 may have body generally designated 1330, that includes a bottom suction plate 1327 that is generally shaped in a square cross configuration to provide flanged openings for such cups. In each of the open flanges of plate 1327 is positioned a suction cup 1312. Suction cups 1312 are mounted with support blocks 1321 to a mounting plate 1322. Also mounted with mounting blocks is a suction cup 1313 and optionally cups 1315. Cups 1313 and 1315 may be employed to support a panel B of a blank 111 if the configuration of the panel and/or materials from which blank 111 is made, require additional support for the blank 111 at least when it is retrieved from the stack of blanks 111 in the magazine and even until the rotary actuator device 1350 (which may be substantially the same as rotary actuator 350 on erector head 120) engages the bottom panel D of the blank prior to opening the blank.

In some applications, without the additional support provided by cup 1313 and possibly cups 1315, the panels B and C may not remain in a generally flattened configuration when the blank if picked up by cups 1312 engaged with panel A.

It should be noted that suction cups and vacuum generators used on erector head 1120 may be same as used on erector head 120. For simplicity, electrical cables and hoses for pressurized air are not shown on erector head 1120 but like erector head 120 can be installed in appropriate locations.

Also, a valve device like valve device 340 above, to control the flow of air is not shown but may be employed on erector head 1120 and may be in electronic communication with PLC 132 and be controlled by PLC 132. In this way PLC 132 can turn on and off the supply of vacuum force to each the vacuum generators associated with each of the suction cups on erector head 1120.

Figure 35A:
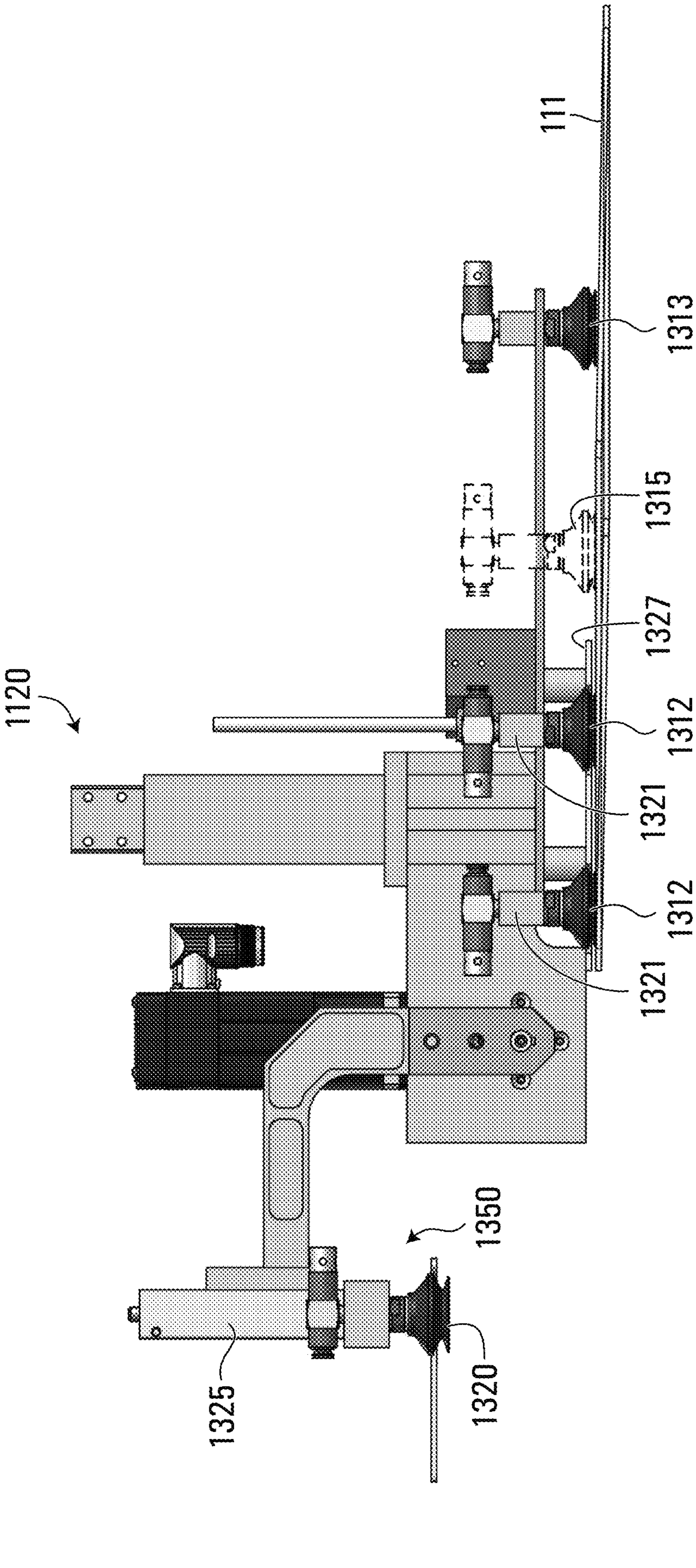
FIGS. 35A, 35B and 35C show the erector head of FIG. 34A in various stages of opening a blank.
Figure 35B:
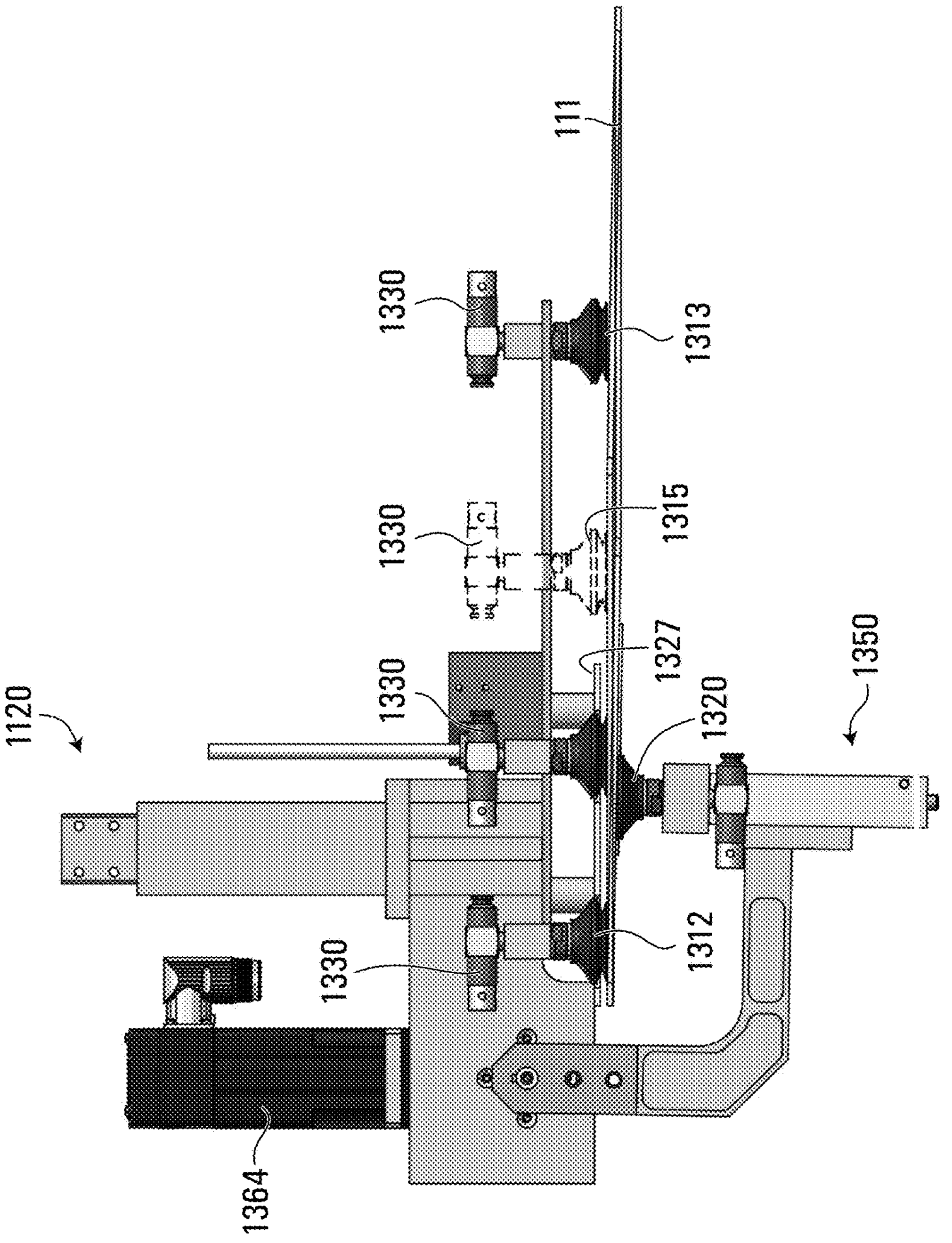
Figure 35C:
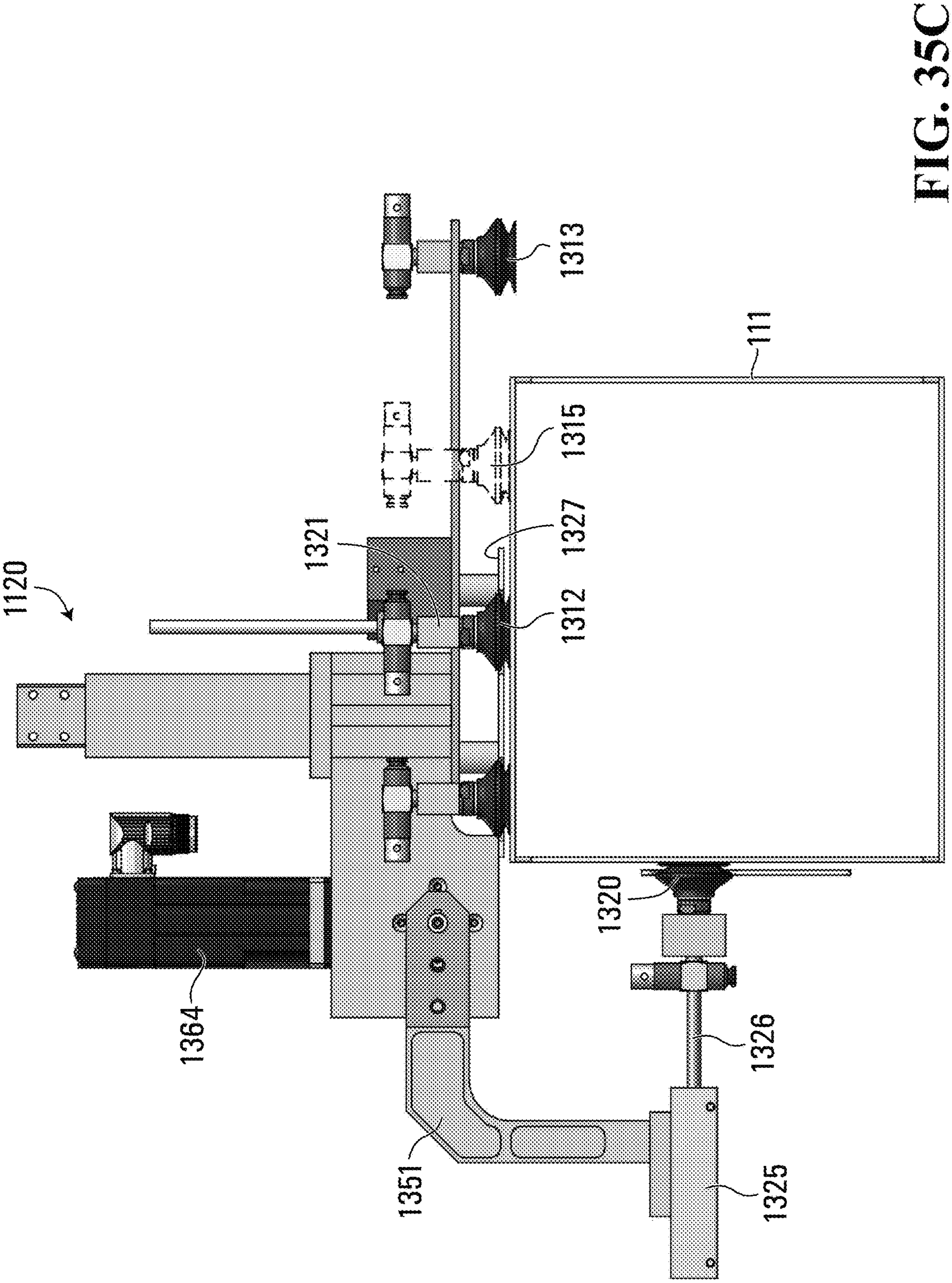

The sequence of opening a blank using erector head 1120 is shown in FIGS. 35*a*, 35*b*, and 35*c*. Actuator 1325 may be actuated to reciprocate piston arms 1326 between an extended position and a retracted position. PLC 132 may send a signal to valve device to operate actuator 1325 (like actuator 325) to extend piston arms 1326 at a particular angular position of arm 1351 and/or location of erector head 1120*b* that is provided by the encoder associated with servo motor 1364 (like servo motor 364). Similarly, PLC 132 may send a signal to valve device (not shown) to activate arms 1326 to be retracted at a particular shaft 1342 angular position, and to retract piston arms 1326 at a particular angular position, of arm 1351 and/or a particular location of erector head 1120. PLC may cause, acting through valve device, actuator 1325 to be actuated at approximately the same time as the cups 1320 have contacted the surface of downward facing panel D and/or when rotation of arm 1351 is just about to begin or has just commenced. Piston arms 1326 may be completely extended by the time arm 1351 has rotated about 45 degrees. At the same time or sometime before, rotary actuator 1350 is activated to start the rotation, the PLC may through the valve device cause suction to be released form suction cup 1313 to allow panel B of blank 111 to rotate relative to panel A.

By way of further explanation, the two erector heads of system 100 can each in turn be employed to engage and hold onto the top panel A of blank 111. Once a blank 111 is retrieved from the top of the stack of blanks, the rotator arm 1351 can be rotated approximately 180 degrees such that suction cups 1320 of rotator device 1350 can engage and hold onto the underside panel D of blank 111. Once suction cups 1320 have engaged panel D, suction at suction cup 1313 can be released and the arm 1351 can be rotated 90 degrees backwards in the opposite rotational direction and the opposing vacuum forces created by suction cups 1312 and possibly 1315 above, and suction cups 1320 below, can cause the tubular blank 111 to be moved from a flattened configuration to an open configuration as panel D is rotated substantially 90 degrees relative to panel A. The air suction force that may be developed at the outer surfaces of suction cups 1320 and 1312 and possibly 1315 will be sufficient so that when activated they can engage, hold top panel A in a stationary position relative to erector head 1120 and rotate panel D relative to panel A to open up the tubular blank to a generally rectangular configuration. The vacuum generated at sections cups 1320, 1312, 1313 and possibly 1315, can also be de-activated by PLC 132 at appropriate times by sending signals to valve device, such as when it is appropriate to release the fully erected carton.

As with erector head 120, on erector head 1120, opening of the blank 111 may be assisted by the extension of piston arms 1326 of actuator device 1325 during rotation of the rotator arm 1351. Preferably when rotator arm 1351 has rotated somewhere in the range of about 30-60 degrees back to the 90 degree position, and preferably when it is at approximately 40-50 degrees, and most preferably when it is at about 45 degrees, then the piston arms 1326 may be fully extended. This extension of arms 1326 and thus of suction cups 1320 in a generally tangential direction relative to the rotation of arm 1351 compensates for the offset of the axis of rotation of the arm 1351 compared to the axis of rotation of the blank that extends along the fold line between panels A and D. The effect of the extension of piston arms 1326 once the arm is rotated such as to 90 degrees ensures that the panel D is also oriented at 90 degrees to panel A.

Another feature of erector head 1120 that can be noted is that a carton location sensor apparatus may be provided and may include a reciprocating sensor rod 1380 which, when not in contact with a blank, extends downwards through an aperture 1381 in plate 1327, below the level of the plane of suction cups 1312. In a manner similar to sensor rod 380 in erector head **120*b*, when the erector head 1120 is brought vertically downwards to retrieve a blank on a stack of blanks 111 in magazine 110, the erector head's movement just prior to suction cups 1312, 1313 and possibly 1315, contacting with the upper surface of the blank will be generally vertically downwards. Prior to the suction cups contacting the surface of a panel A of a blank, sensor rod 1380 will engage the surface of panel A which can cause the sensor rod to be pushed upwards. This movement upwards of sensor rod 1380 relative to plate 1327 will physically cause a sensor (not shown) to be activated and send a signal to PLC 132. Like in the previous embodiment, the sensor may be an inductive proximity sensor. The metal cylinder fixed on the rod is sensed by the sensor's circuitry because it changes the inductance of the induction loop inside the sensor. The sensor may be 871FM-D8NP25-P3 made by ALLEN BRADLEY. PLC 132 may respond to that signal by causing the movement apparatus (not shown but may be like apparatus 115*b*) to slow down so that the final few centimeters (e.g. 3.5 cm) of movement downwards towards contact between cups 1312 and the upper surface of panel A occurs at a much slower rate and also PLC knows how much further vertically downwards erector head 1120 must be lowered to establish proper contact between suction cups and panel A. It should also be that sensor rod 1380 and associated sensor device can also be used to ensure that PLC 132 is aware of whether once a blank has been engaged in the magazine 110, it stays engaged with erector head 1120** until the appropriate release location is reached, such as once erection of the carton has been completed.

With reference now to FIGS. 36 to 44, it will be observed that unlike with erector head 120, with erector head 1120, each opened blank is moved towards folding and sealing apparatus 1130 to fold both leading minor panel J and trailing minor panel K with the folding and sealing apparatus 1130.

Folding and sealing apparatus 1130 mounted to a plate 1175 forming part of frame 1109 may be constructed in the same manner as apparatus 130 mounted to frame 109, as described above. However, apparatus 1130 may be provided with an angled paddle device 1310 that is connected to a distal end of a paddle arm 1314, that may be mounted to frame 1109. Paddle arm 1314 may be connected to a shaft 1316 a rotary actuator 1399 for rotation therewith. The rotary actuator may be a double acting rotary pneumatic actuator manufactured by Festo under engineering part #DSM-32-270-CC-FW-A-B. Actuator 1399 can cause rotation of arm 1314 clockwise and counter-clockwise around its axis of up to 270 degrees. Rotary actuator 1399 may be supplied with pressurized air supplied by hoses (not shown) connected to ports 1395 and 1397. Those hoses may also be connected to a solenoid valve device (not shown) which may be controlled by the PLC 132. In this way the rotation clockwise and counter-clockwise of paddle 1310 may be controlled by PLC 132.

Figure 36:
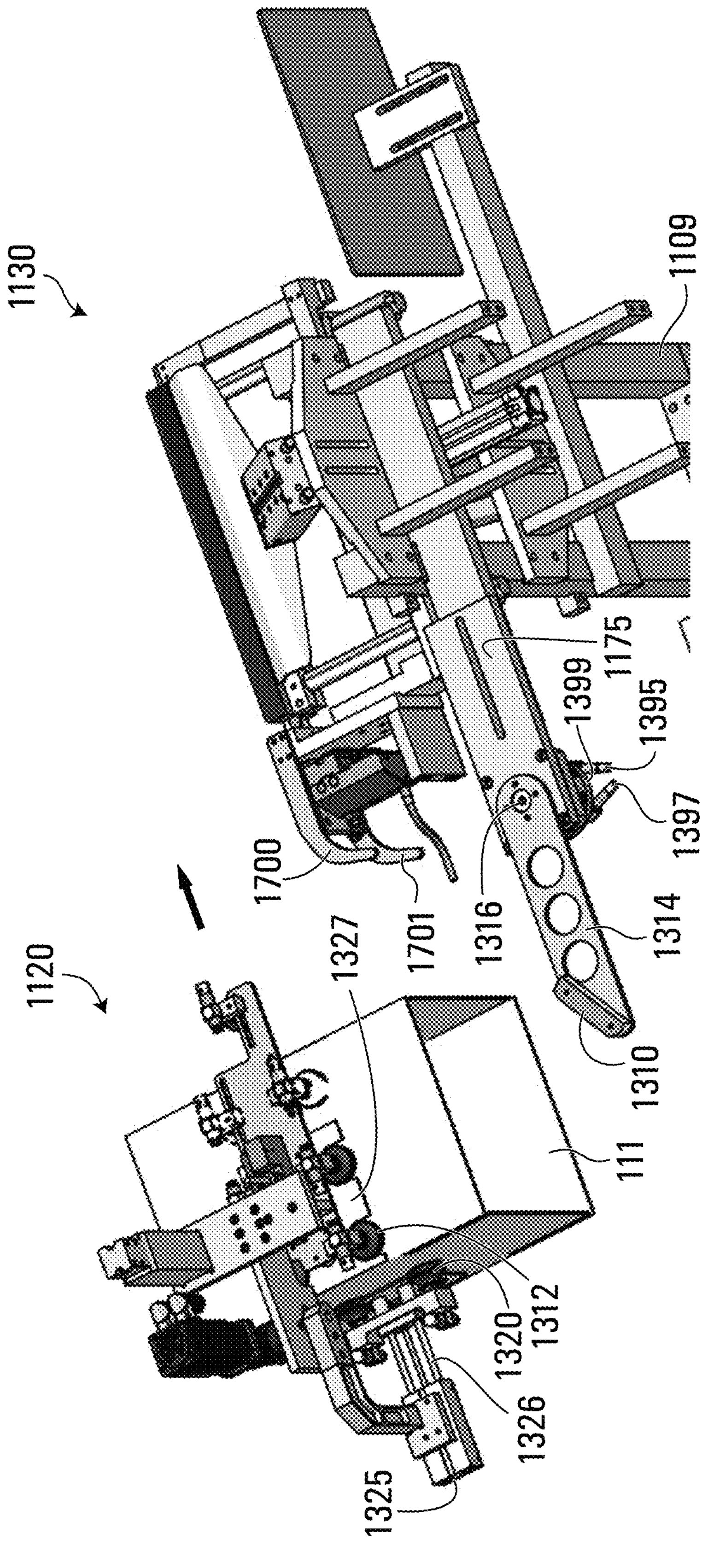
FIGS. 36-44 show the erector head of FIG. 34A and a sealing apparatus in various stages of erecting a blank and assembling it into a carton.
Figure 37:
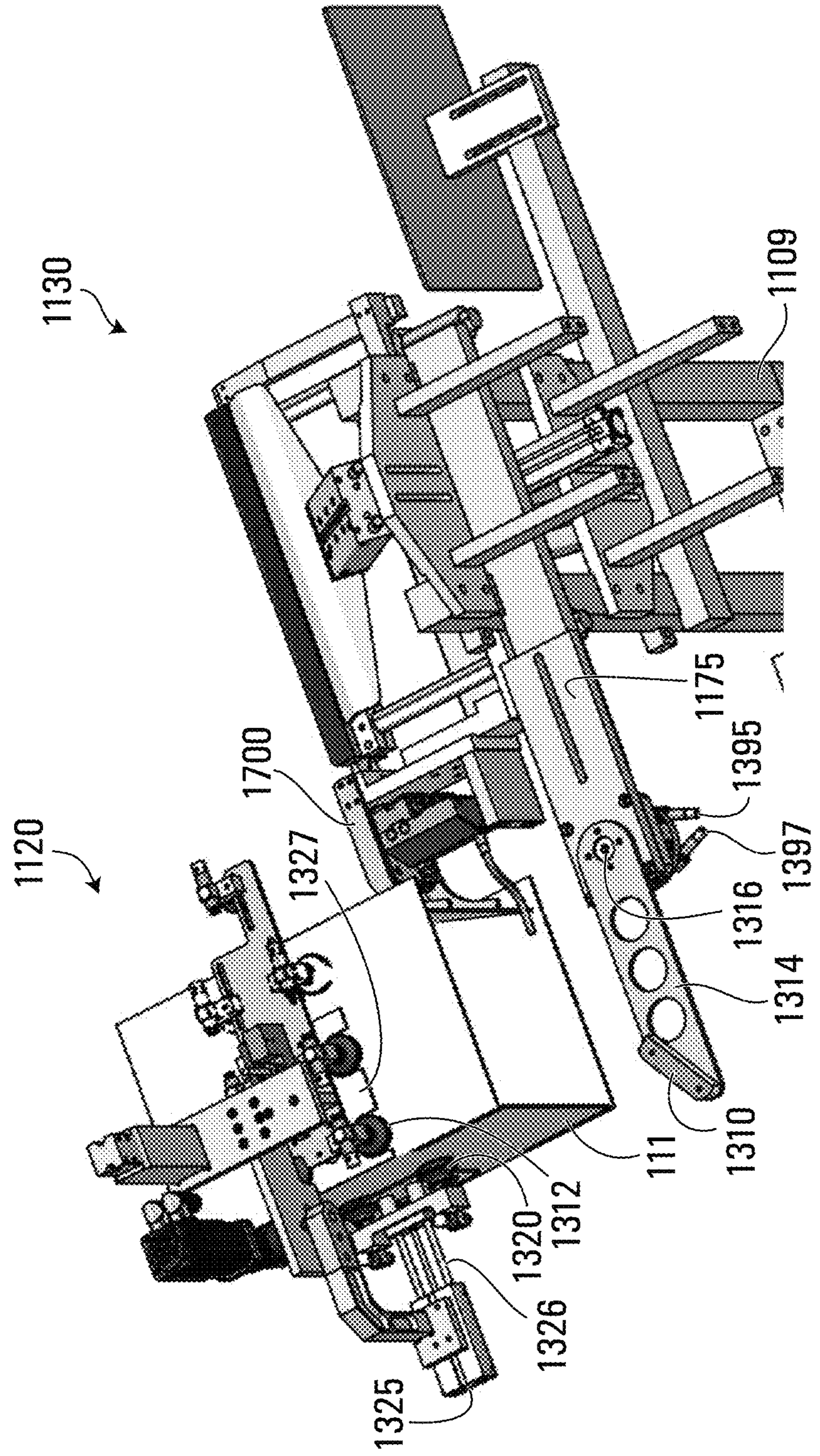
Figure 38:
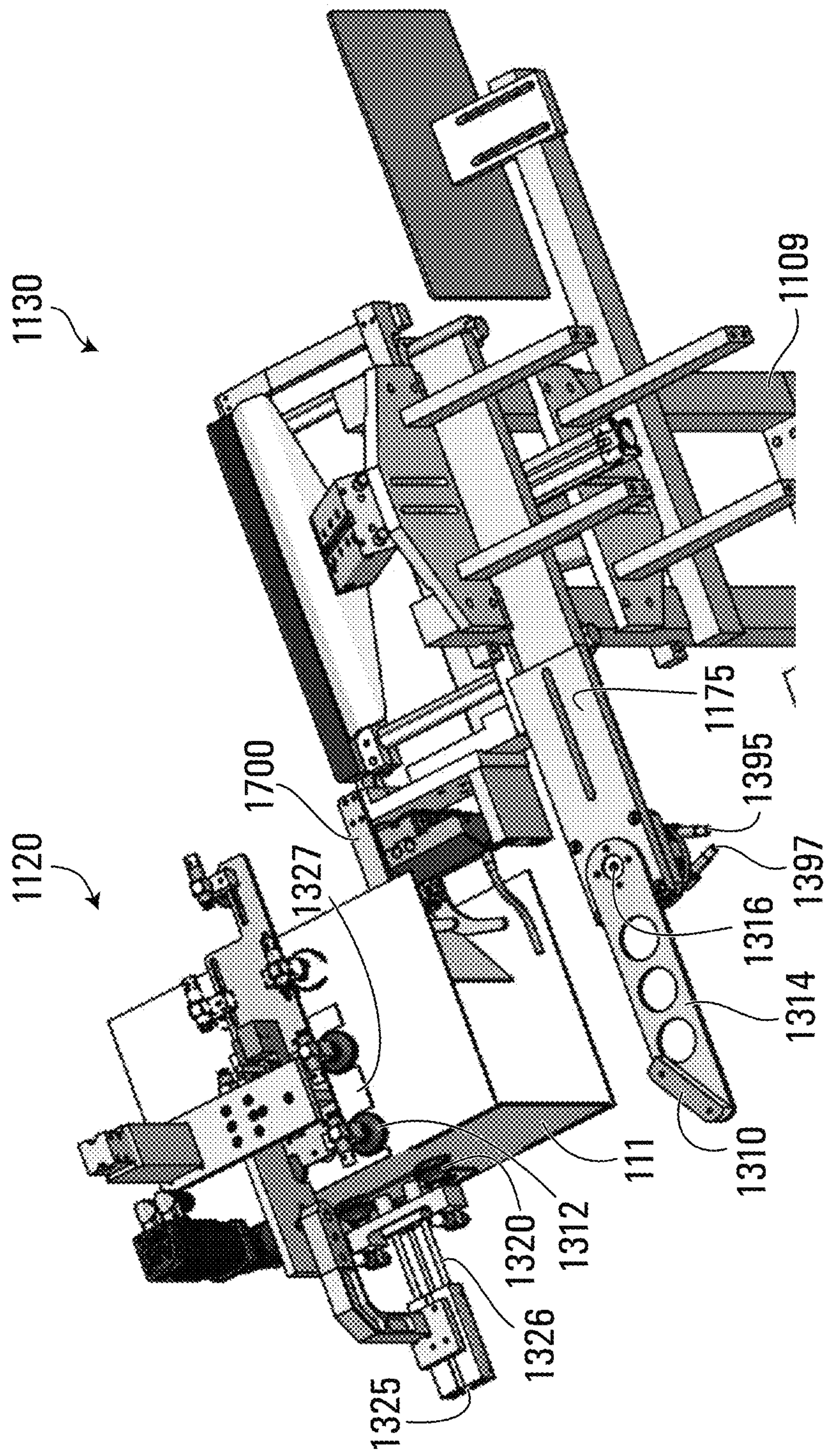
Figure 39:
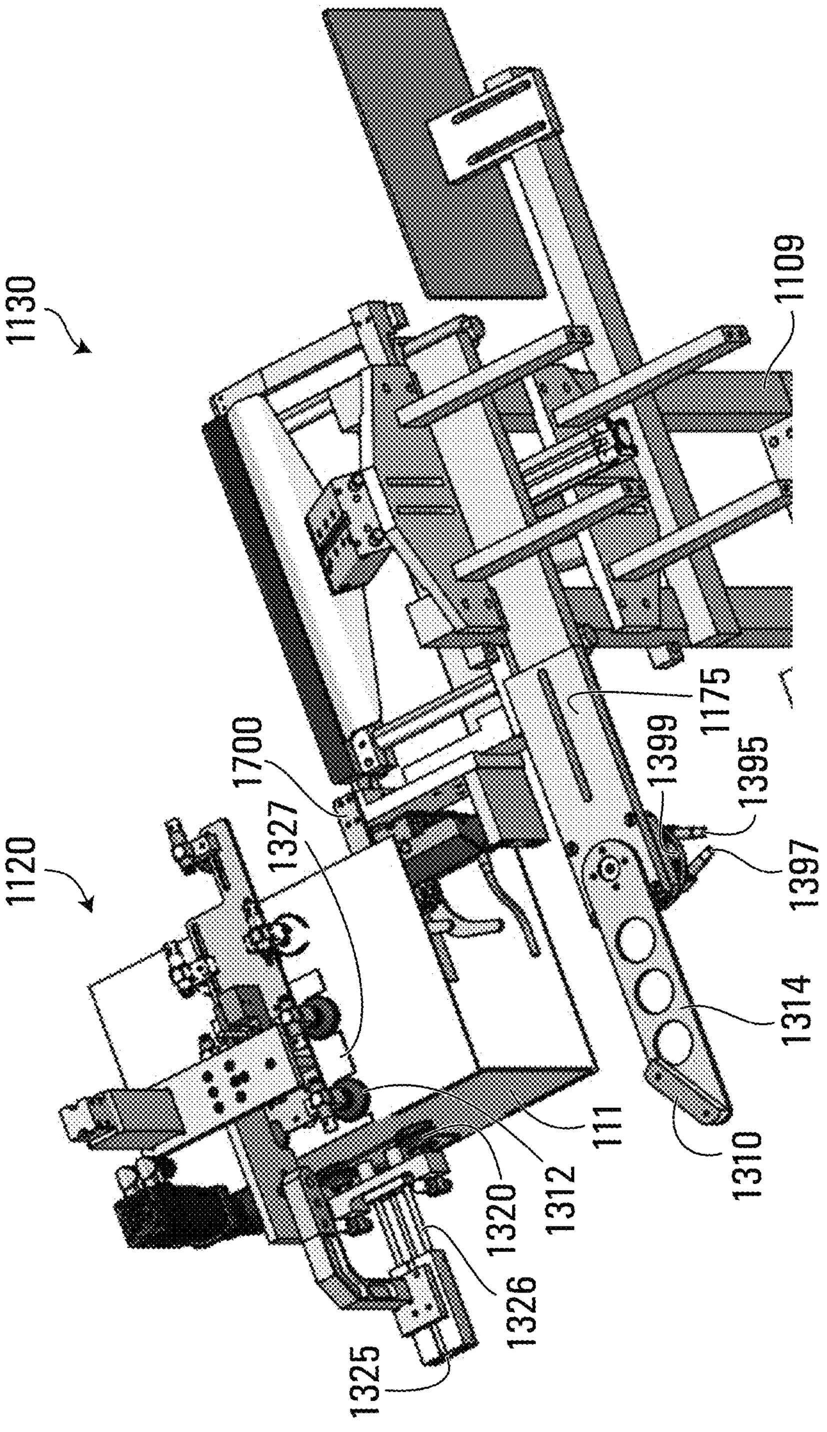
Figure 40:
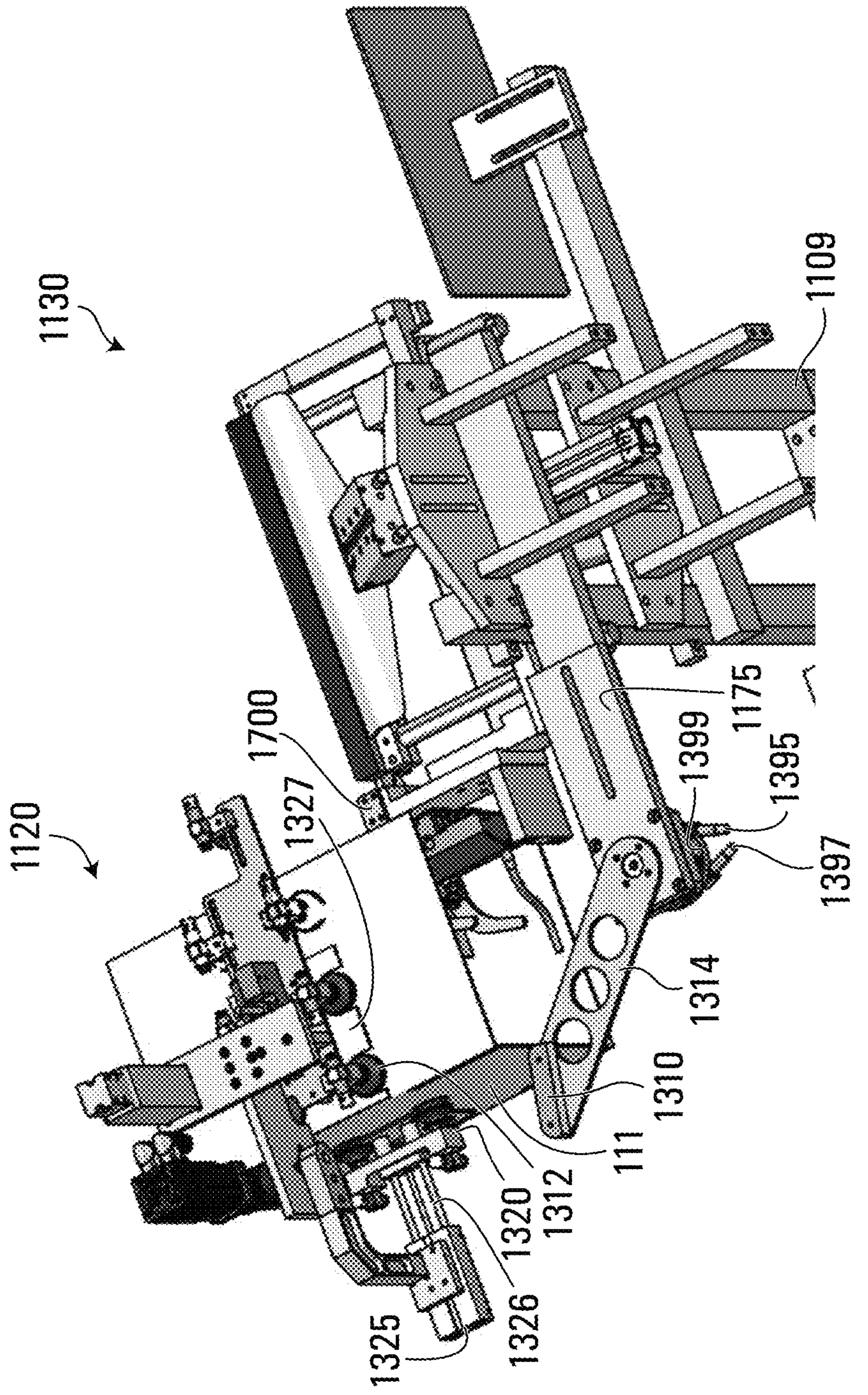
Figure 41:
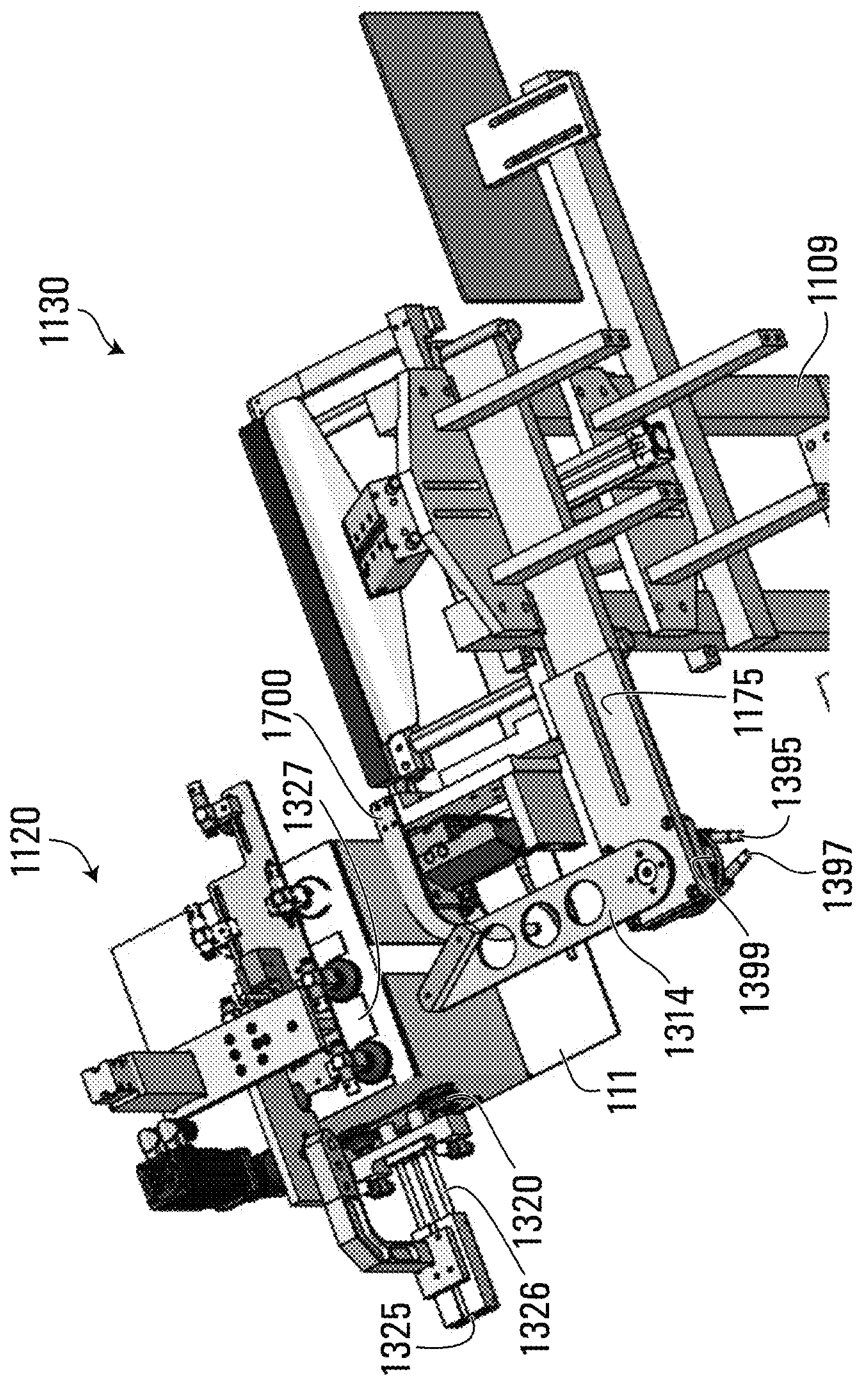
Figure 42:
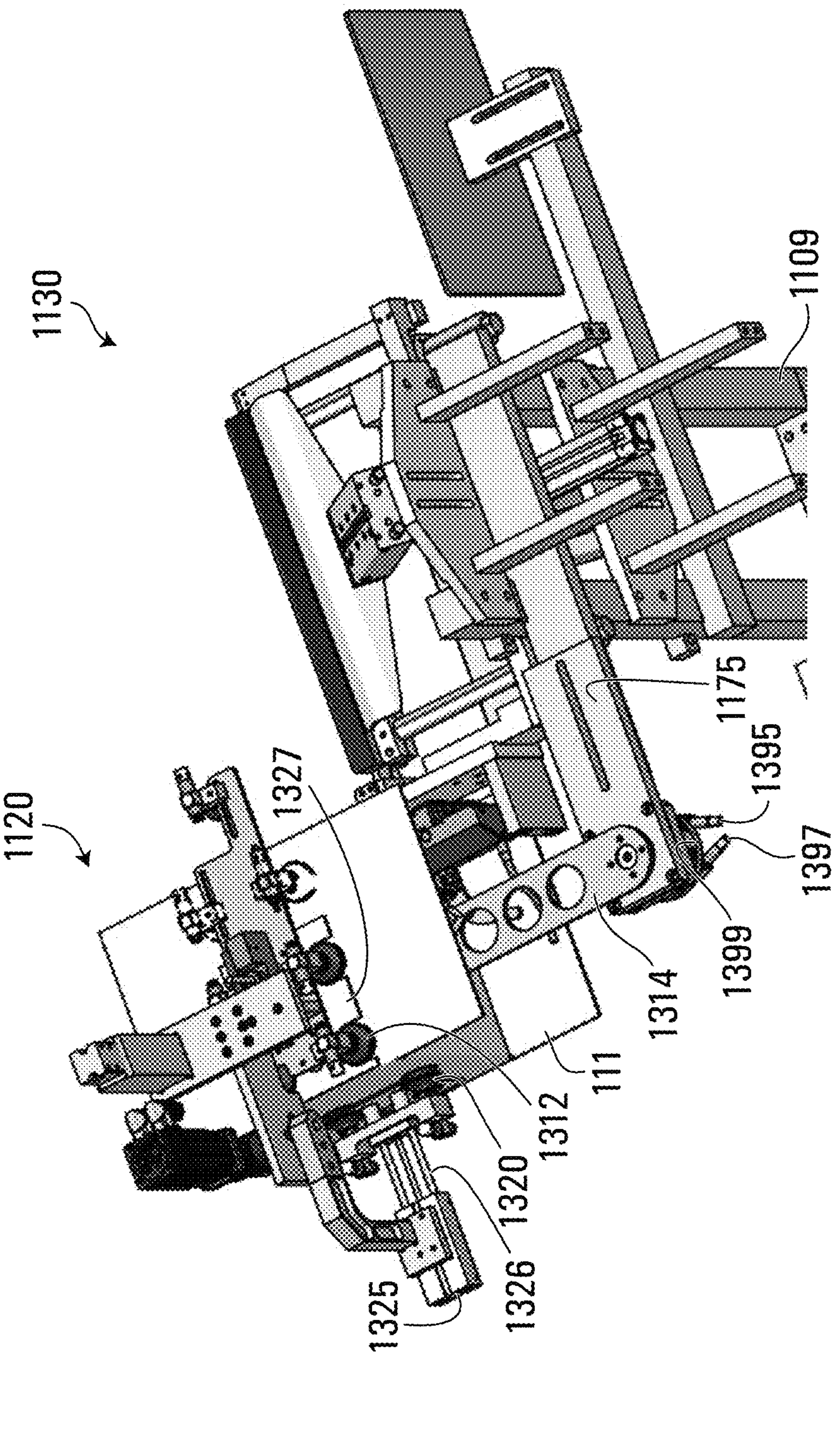
Figure 43:
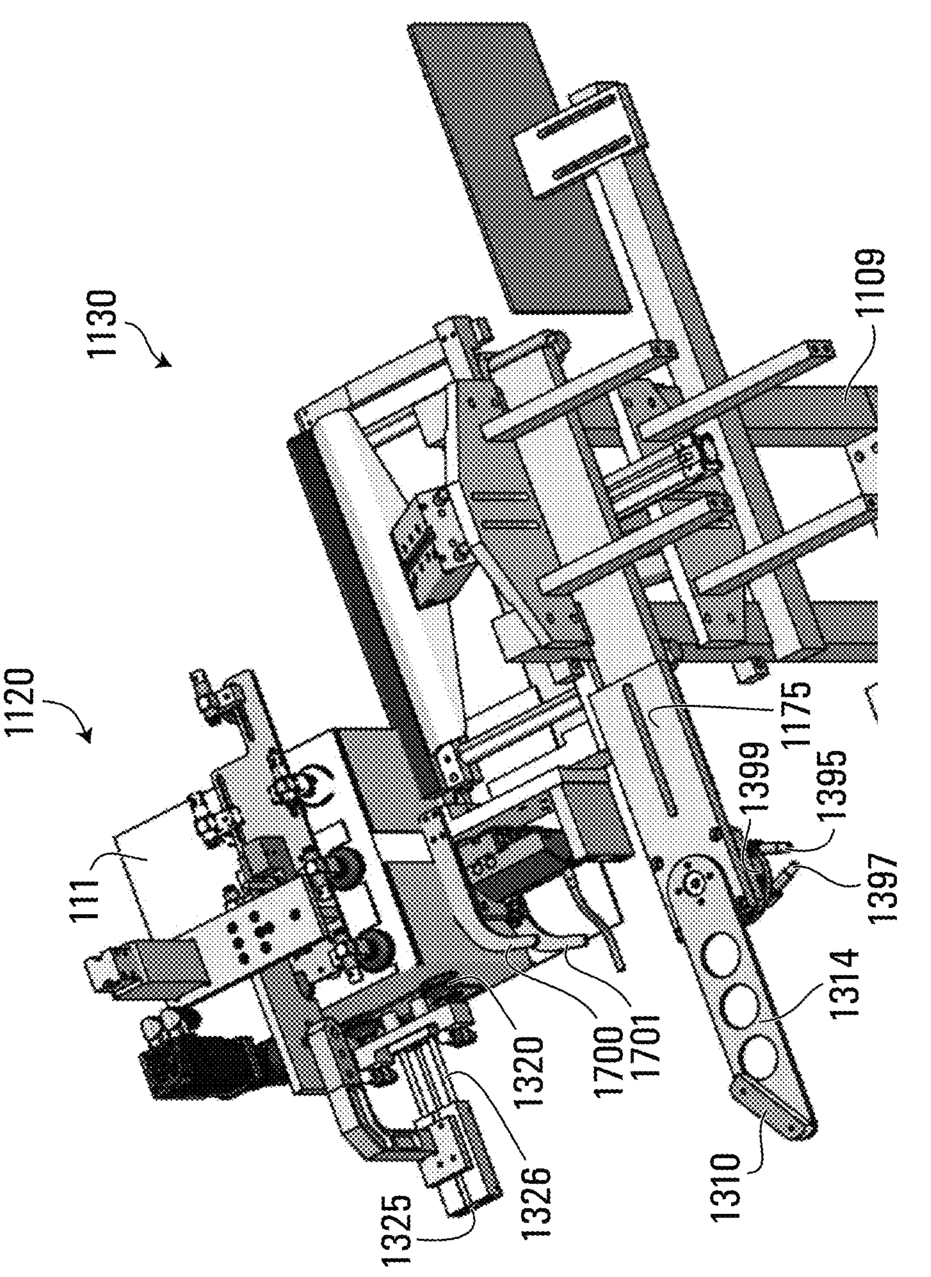
Figure 44:
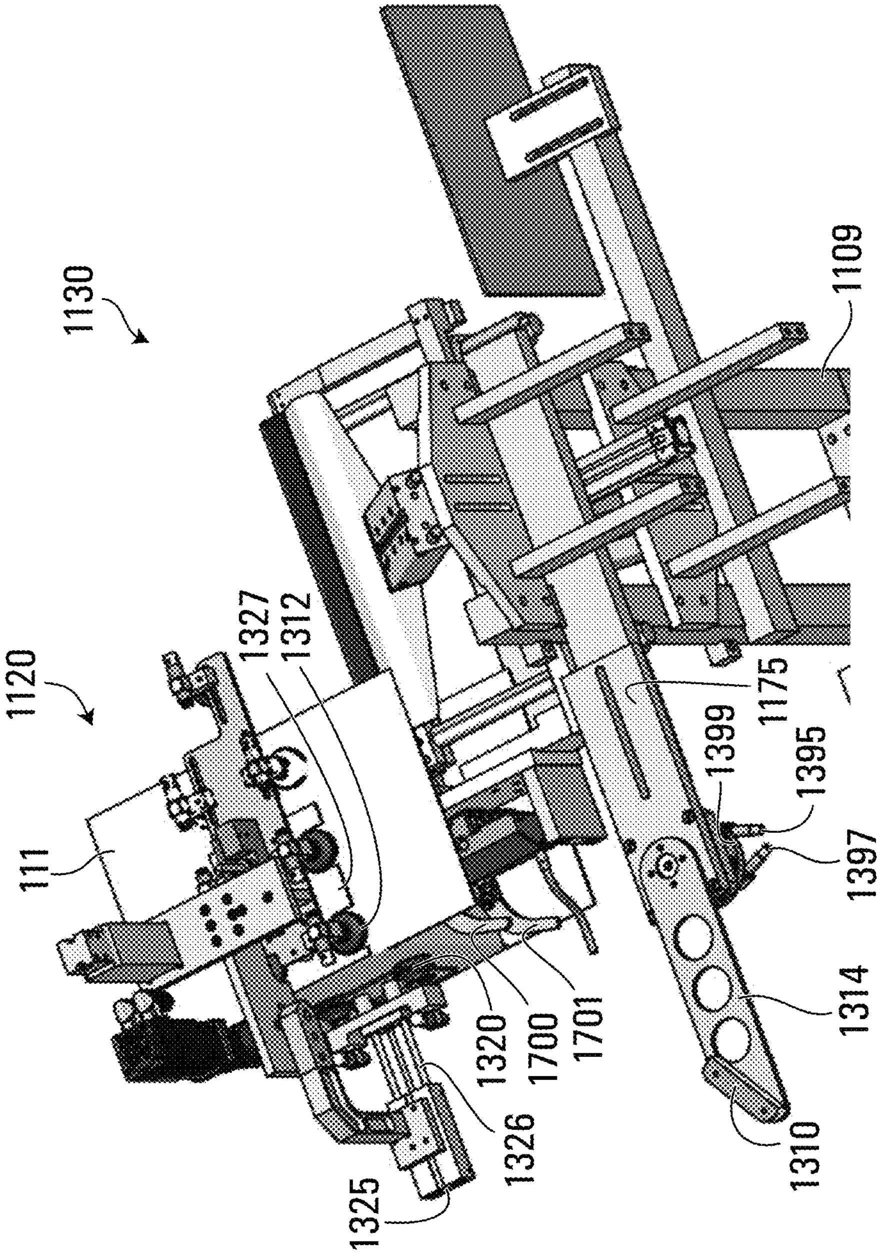

Once a blank 111 has been opened to the configuration shown in FIG. 36, then PLC 132 can send a signal to cause erector head 1120 to move towards apparatus 1130. As shown in the sequence of FIGS. 37 to 39, initially, leading minor flap J will be engaged by ploughs 1700 and 1701 to fold flap J inwards. While or after that is being completed, as shown in the sequence in FIGS. 40 to 42, next the valve device can cause actuator 1399 to rotate shaft 1316 and thus rotate arm 1314 with paddle 1310 attached thereto. Paddle 1310 can then engage trailing flap K of blank 111 and cause it to fold about its fold line where it joins to panel D. Thus flap K can be folded inwards towards the bottom opening of blank 111. Thereafter as shown partially in FIGS. 43 to 44, the carton blank 111 held by erector head **1120*b* can be moved longitudinally further downstream into the folding and sealing apparatus 130 where the minor flaps may be glued and the major top and bottom flaps F and G may be folded inwards and compressed, in substantially the same manner as described above in relation to erector head 120*b* and movement apparatus 115*b***.

The particular arrangement of suction cups and rotating paddle on erector heads 1120 can be designed based upon the configuration of the carton blank and the particular panels and flaps that need to be rotated. It will also be appreciated that on erector head 1120 that is illustrated, suction cups are used to apply a force to hold and/or rotate panels of a carton blank. However alternative engagement mechanisms to suction cups may be used.

Figure 50:
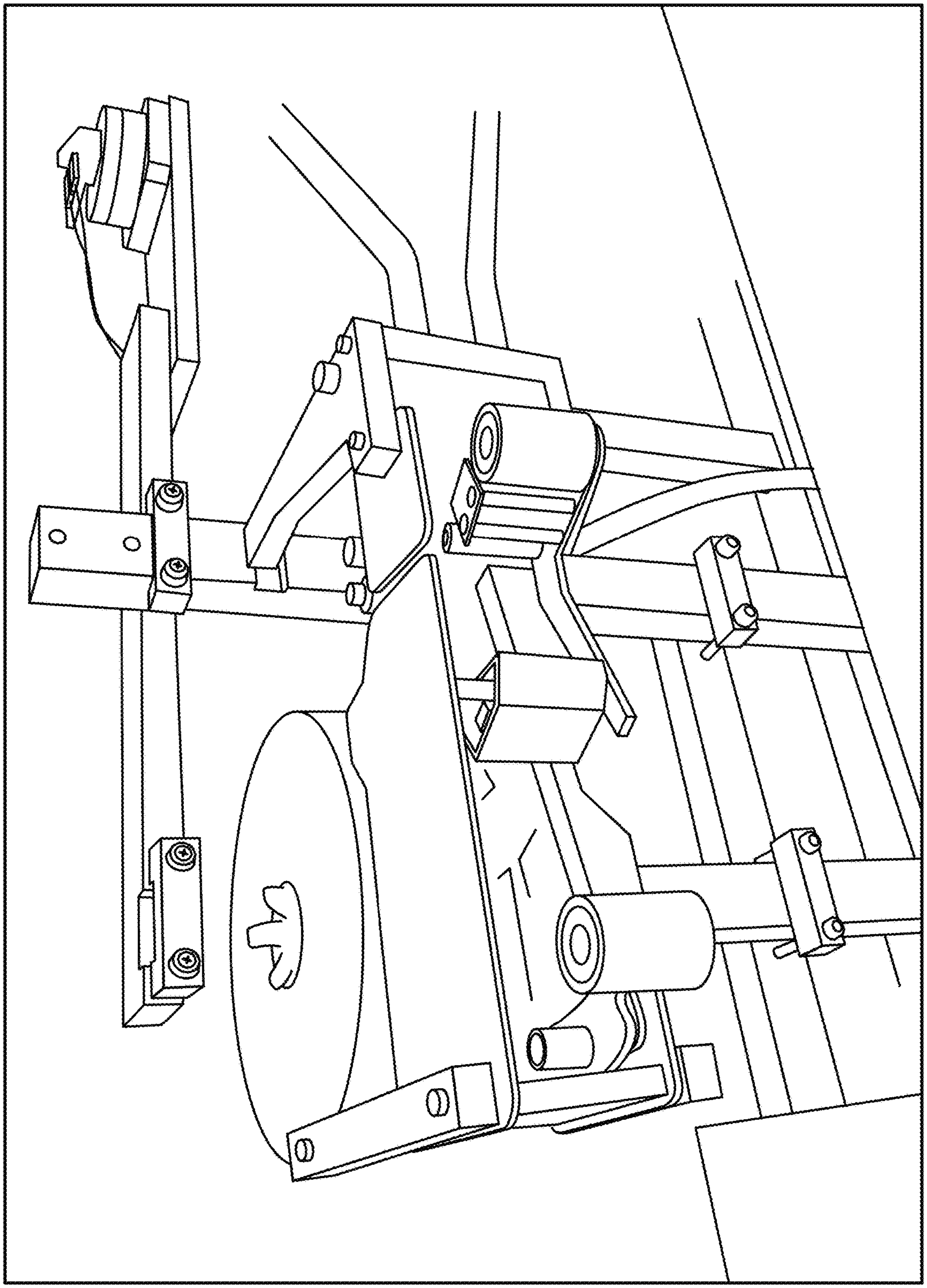
FIGS. 50-52 are perspective views of an alternate folding and sealing apparatus that may be used in some embodiments of the invention.
Figure 51:
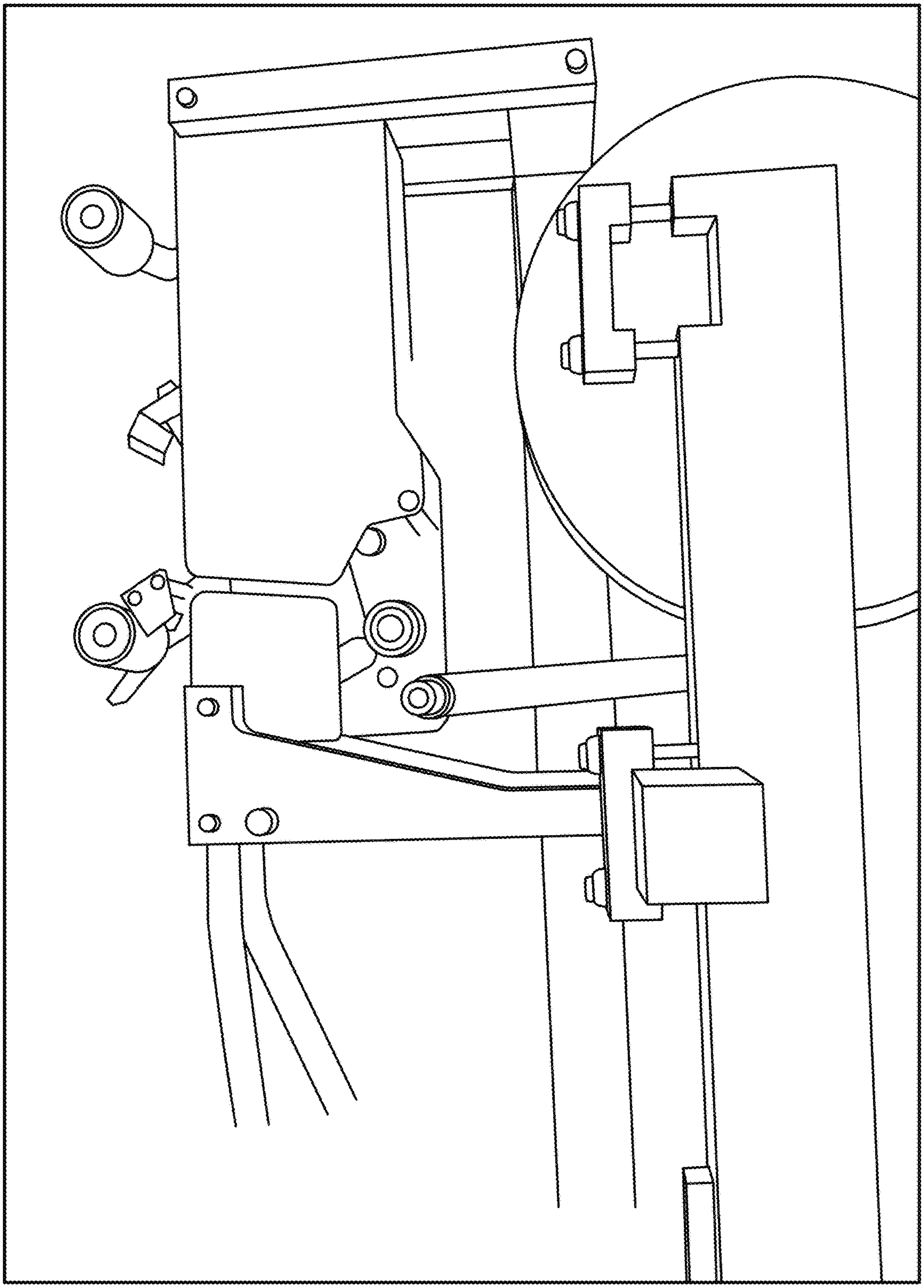
Figure 52:
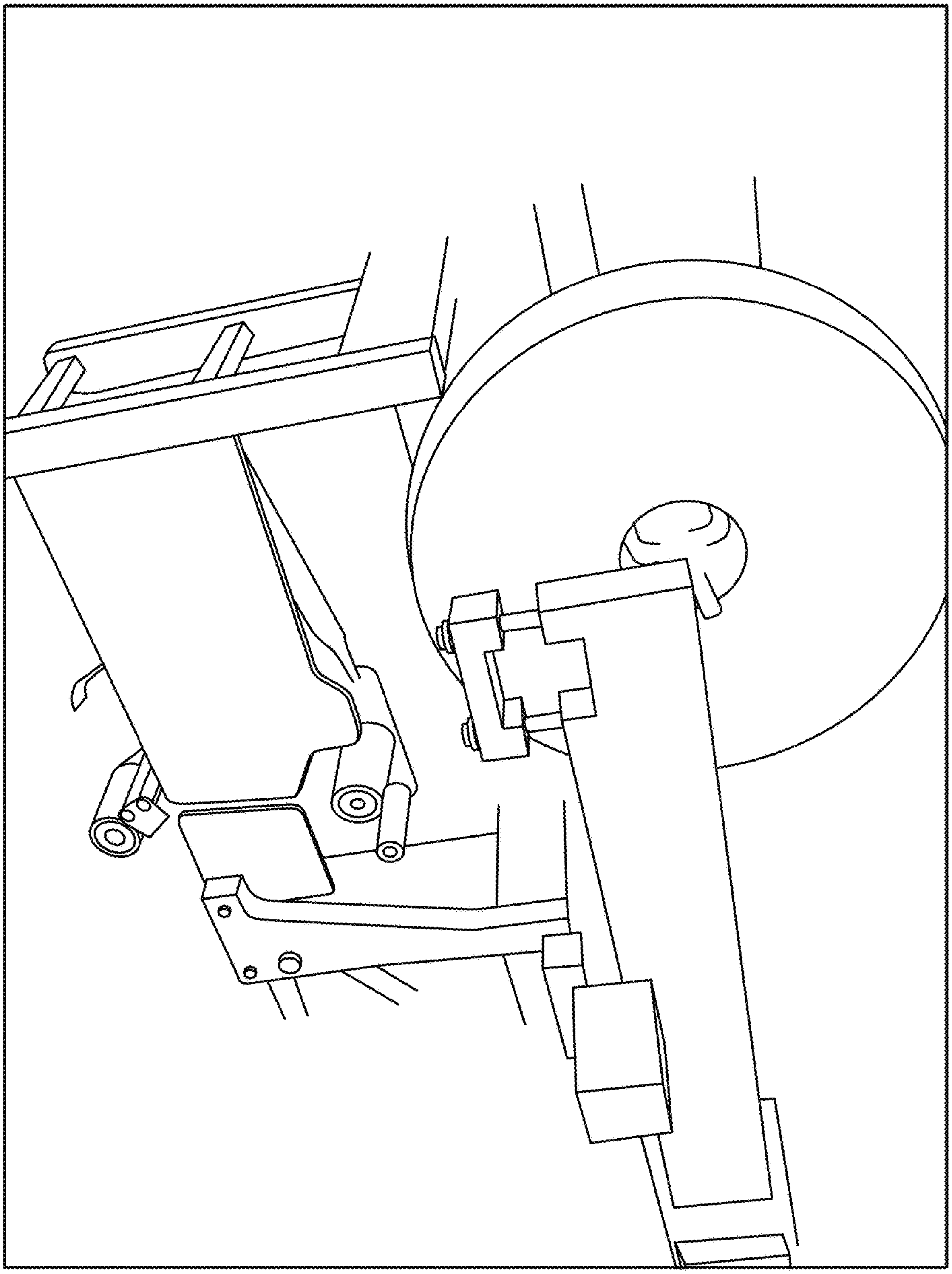

In some embodiments, the flaps of the blank may be sealed by means other than a glue applicator. For example, it is possible to configure folding and sealing apparatus with an adhesive tape applicator that may apply tape to the bottom of the box once all minor and major flaps have been folded. In such an embodiment, compression of the flaps at the bottom of the erected carton may not be necessary. An example of such a set up is illustrated in FIGS. 50 to 52. In this embodiment the folding and sealing stations like station 130 have been replaced by a folding and sealing station that includes a middle plough for folding a leading minor flap. Thus both minor flaps can be closed by the middle plough for the leading minor flap and a paddle device like those described above for the trailing minor flaps. Upper and lower ploughs can be provided to fold over top of the minor flaps and then the moving apparatus can move an erector head 120 carrying a opened and flap folded blanks against the operational surface of an adhesive tape applicator. An example of a tape applicator that could be adapted for such use is a model Z59-557 supplied by Dekka Industries Inc. The folded bottom of the opened blank can then be moved longitudinally against the carton blank and tape could be started to be applied at a lower portion of panel B, over and along the middle join between flaps F and G, and the terminate at a lower portion of panel D.

Figure 45:
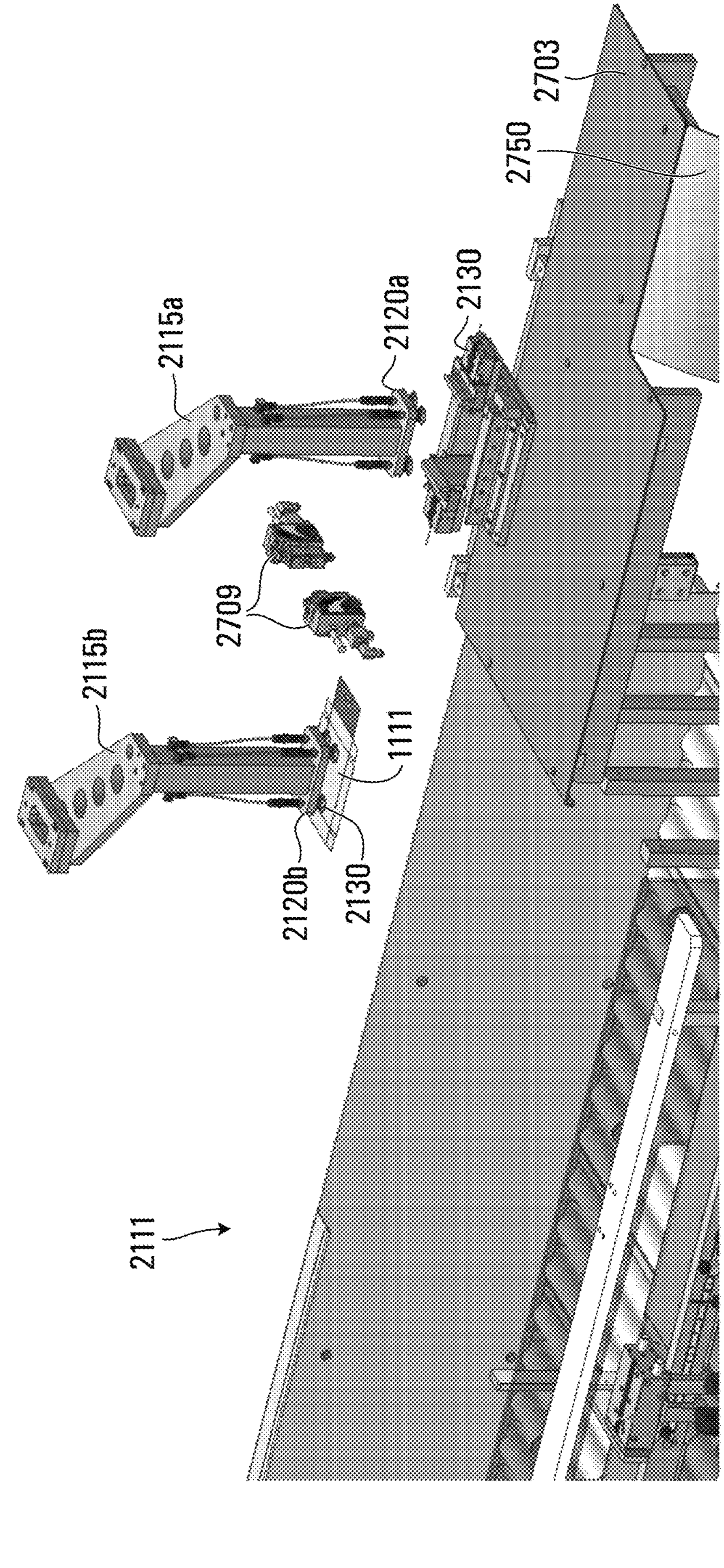
FIG. 45 is a schematic perspective view showing an alternative embodiment of a carton forming system; and in particular alternate erector heads, their corresponding moving apparatus and folding apparatus.
Figure 46:
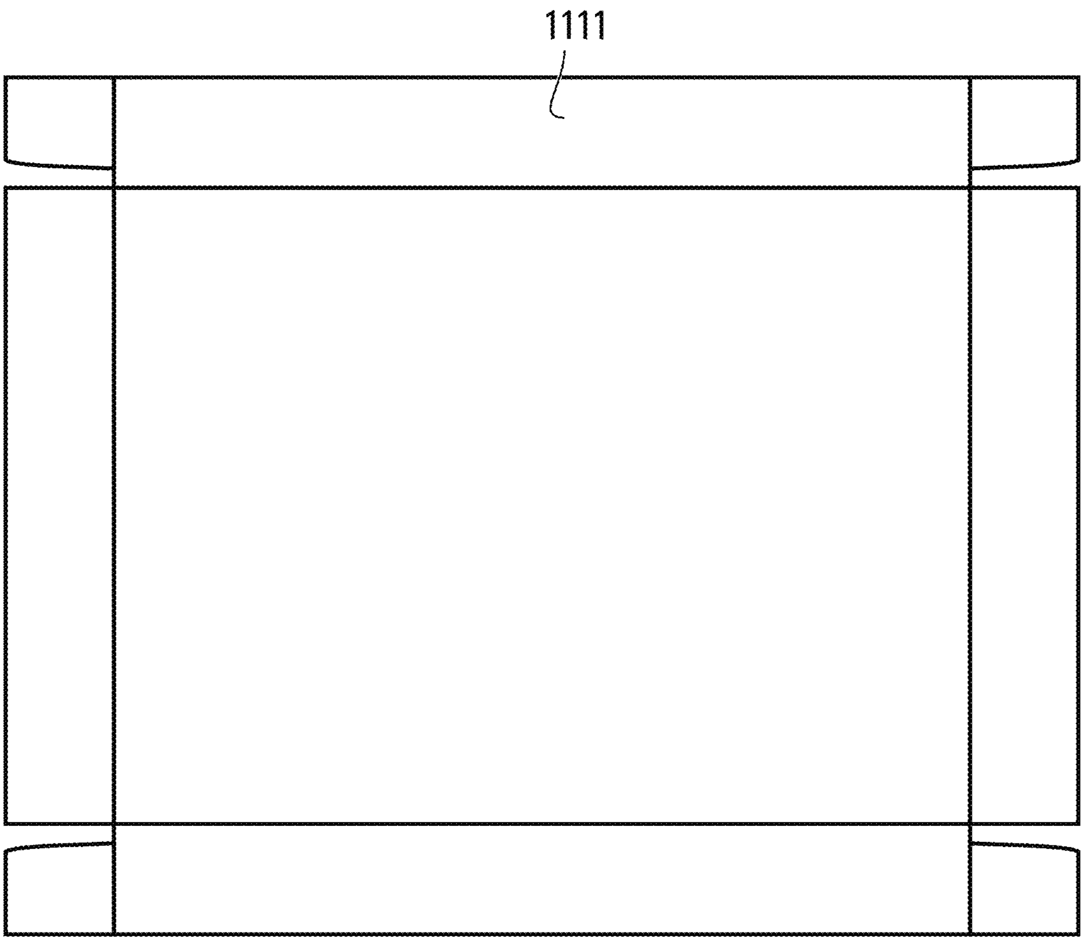
FIG. 46 is a plan view of a blank for a tray that may be processed according to some embodiments of the system.

In another embodiment, shown only schematically in FIG. 45, the system could be modified to employ one or more moving apparatuses **2115*a*, 2115*b* that may be substantially the same as moving apparatus 115*a*, 115*b*, and a magazine 2110 that may be substantially like magazine 110. However, folding and sealing apparatus 130 or 1130 could be replaced/ or another device could be inserted above a support plate 2703 that has a discharge chute 2750. A blank shoe device 2130 may be configured with interior guides. Erector head 2120*a*, 2120*b*, may be simplified devices controlled by PLC 132 which have only four suction cups 2130 that may be arranged in a generally rectangular configuration. Erector heads 2120***a*, 2120*b* may be readily interchanged in system 100 illustrated and described above for erector heads 120*a*, 120*b* and PLC 132 may operate another sequence of operations on erector heads 2120*a*, 2120*b* to process a blank 1111 (see FIG. 46) that may be used to form an open top tray. Suction cups 2130 may engage a blank 1111 that is configured to be formed into an open top tray. The moving apparatuses 2115*a/b* may move a blank secured to a head 2120*a/b* longitudinally from the magazine where it is retrieved from a stack of blanks, through opposed glue applicators 2709 which may apply a suitable adhesive to flaps and then move the blank above shoe device 2130. The moving apparatus may then move the blank downwards through the shoe device 2130 causing the flaps to be folded and they can be held within the shoe for a sufficient time to allow the glue to set. Thereafter continued movement downwards can push the blank clear of the shoe device 2130 and then suction cups can release the blank which can then fall onto support plate 2703. Thereafter the blank can be moved for example by a blow-off nozzle discharging high pressure air (under control of PLC 132 through a valve device interposed in pressurized air hoses) to discharge the blank to chute 2750 for transfer to a discharge conveyor.

Figure 47:
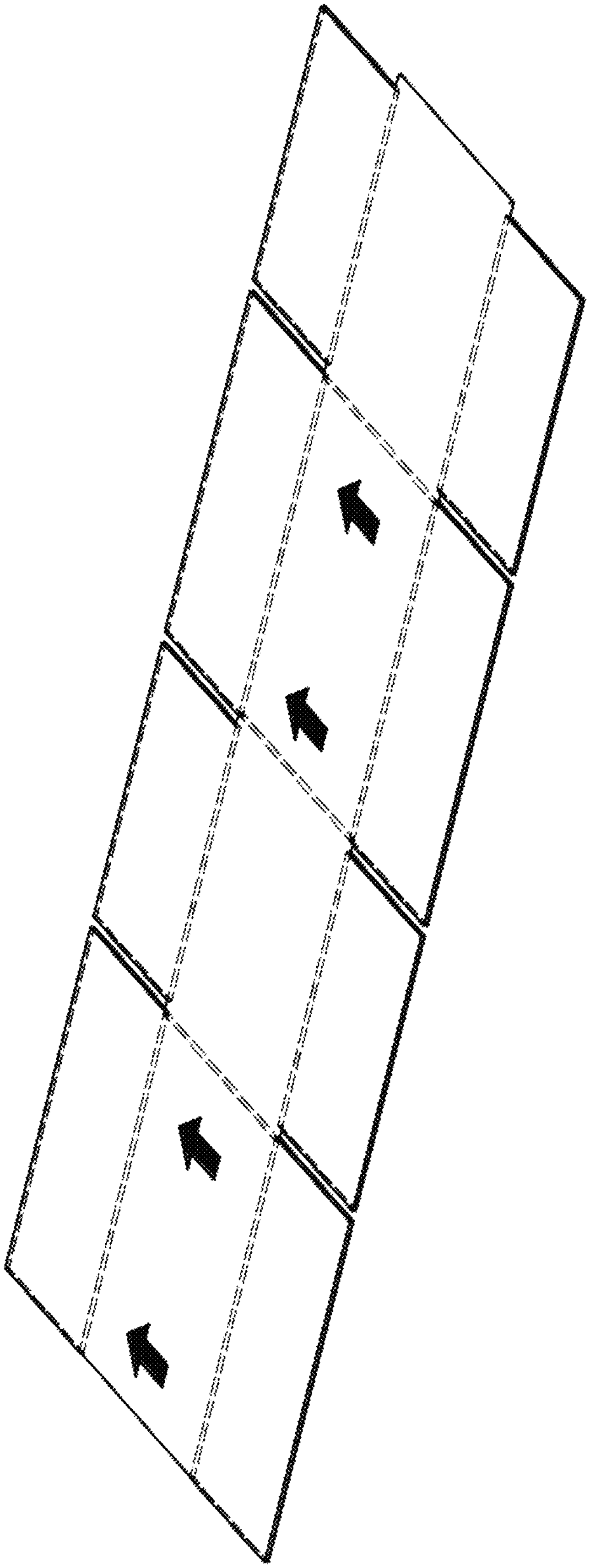
FIG. 47 is a perspective view of a blank for an over-wrapping regular slotted case (RSC) that may be processed according to some embodiments of the system.
Figure 48:
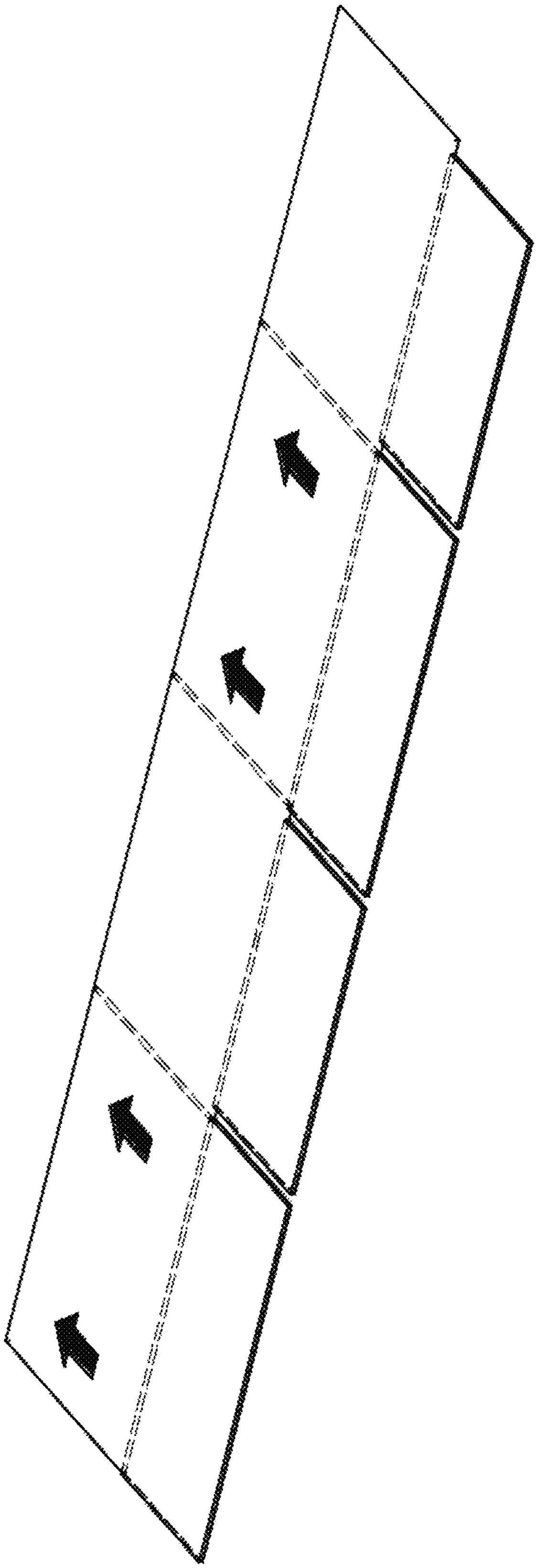
FIG. 48 is a perspective view of a blank for an over-wrapping regular slotted case (RSC) that may be processed according to some embodiments of the system.
Figure 49:
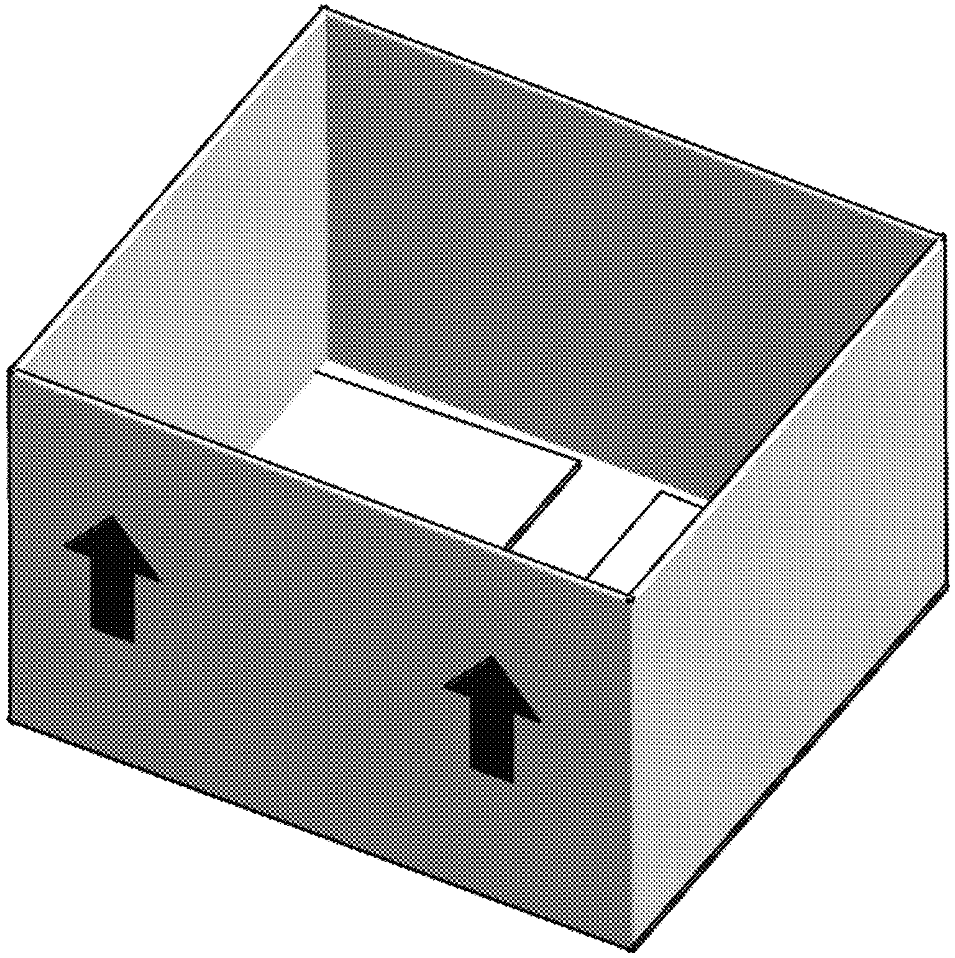
FIG. 49 is a perspective view of an HSC case that may be formed according to some embodiments of the system.

It will be appreciated that by making a relatively small number of changes to the components of the system, the system can be altered from being able to process blanks for open top cartons to being able to process blanks that can be turned into open top trays. Examples of other blanks that may be processed, cartons that may be formed are illustrated in FIGS. 47, 48 and 49 and include blanks for wrap around half slotted cases (HSC) and HSC blanks, as well as blanks for a wrap around RSC.

Other modifications are also possible in some embodiments. For example, a system could, possibly with some other modifications, be provided in other spatial orientations such as in a vertically inverted or angled configuration. In such a vertically inverted configuration, a magazine may hold blanks in a stack but be configured to dispense the blanks from the bottom of the stack.

Of course, the above described embodiments are intended to be illustrative only and in no way limiting. The described embodiments of carrying out the invention are susceptible to many modifications of form, arrangement of parts, details and order of operation. The invention, rather, is intended to encompass all such modification within its scope, as defined by the claims.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

The invention claimed is:

1. A system for forming a container from a tubular blank comprising a plurality of panels and flaps interconnected to provide a generally flattened tubular configuration, said system comprising:

an erector device operable to assist in reconfiguring said blank from said generally flattened configuration to an open configuration;

a movement sub-system, said movement sub-system comprising at least one movement apparatus, said at least one movement apparatus comprising:

a vertical movement device comprising a vertically extending support member, said vertically extending support member having a lower end region being connected to said erector device;

a horizontal movement device connected to a frame, said horizontal movement device comprising a horizontal support rail and a horizontal slide block slidable on said horizontal support rail, said horizontal slide block operable for sliding longitudinal movement relative to said frame on said horizontal support rail;

said vertically extending support member being interconnected to said horizontal slide block of said horizontal movement device and vertically supported on said horizontal slide block for sliding horizontal movement with said horizontal slide block, said vertically extending support member being operable for vertical sliding movement relative to said horizontal sliding block and said horizontal support rail of said horizontal movement device;

a drive apparatus operable to drive said horizontal sliding block of said horizontal movement device and said vertically extending support member horizontally on said horizontal support rail and to drive said vertically extending support member of said vertical movement device vertically relative to said horizontal sliding block and said horizontal support rail of said horizontal movement device;

a controller operable to control said drive apparatus;

whereby through operation of said drive apparatus, said controller is operable to cause said vertically extending support member of said vertical movement device to move vertically and said horizontal sliding block of said horizontal movement device to move horizontally with said vertically extending support member, to move said erector device along a path in space having vertical and longitudinal components.

2. A system as claimed in claim 1, wherein said system is operable for forming said container from said tubular blank comprising a plurality of panels and flaps interconnected to provide a generally flattened tubular configuration, wherein said plurality of panels comprise a first panel, and a second panel interconnected to said first panel, said second panel being rotatable relative to said first panel, said system comprising:

a first engagement device for engaging said first panel of said blank;

a second engagement device for engaging said second panel of said blank, said second engagement device being located on a panel rotating apparatus operable to rotate said second panel of said bank from a first orientation wherein said first panel is generally parallel to said first panel, to a second orientation wherein second panel is oriented at an angle to said first panel, such that said generally flattened tubular blank may be reconfigured from a generally flattened configuration to an open configuration;

wherein said first engagement member, said second engagement member and said panel rotating apparatus comprise part of said erector device.

3. A system as claimed in claim 2 wherein said first engagement device comprises a first suction cup device and said second engagement device comprises a second suction cup device.

4. A system as claimed in claim 2, wherein said angle is approximately 90 degrees.

5. A system as claimed in claim 4 wherein first engagement device comprises a plurality of suction cup devices having suction cup surfaces generally arranged in a first plane and said second engagement device comprises a plurality of suction cup devices having suction cup surfaces generally arranged in a second plane.

6. A system as claimed in claim 2 wherein said container is a carton.

7. A system as claimed in claim 6 wherein said carton is regular slotted case.

8. A system as claimed in claim 1 wherein said at least one movement apparatus comprises first and second movement apparatuses arranged in opposed relation to each other, said first movement apparatus for moving a first erector device along a path, and said second movement apparatus for moving a second erector device along said same path, said first erector head being out of phase with said second erector head along said path such that the movement of said first erector head does not interfere with the movement of said second erector head.

9. A system for forming a container from a tubular blank comprising a plurality of panels and flaps interconnected to provide a generally flattened tubular configuration, said system comprising:

an erector device operable to assist in reconfiguring said blank from said generally flattened configuration to an open configuration;

a movement sub-system, said movement sub-system comprising at least one movement apparatus, said at least one movement apparatus comprising:

a support frame;

a drive belt;

a generally vertically oriented and extending, vertical support member having a pulley positioned proximate an upper end of said vertical support member, said vertical support member adapted for connection to said erector device;

a slidable pulley block, said pulley block being adapted for sliding longitudinal movement on a generally horizontally oriented, horizontal support member, said horizontal support member supported by said support frame, and said pulley block having a series of spaced pulleys, said vertical support member being interconnected to said slidable pulley block for vertical sliding movement of said vertical support member relative to said slidable pulley block;

first and second longitudinally spaced belt drives, each of said belt drives being independently operable to rotate at the same speeds and at varying speeds and in the same and opposite directions to each other, said belt drives both operable to drive said drive belt on opposed sides of said vertical support member;

a controller operable to control the speed and direction of rotation of said first and second belt drives;

said vertical support member being received adjacent said pulley block and being supported by said belt for vertical sliding movement relative to said pulley block, said belt extending from a fixed location on said vertical support member upwards to a first pulley of said pulley block, longitudinally to said first belt drive, from said first belt drive over a second pulley of said pulley block, upwards to said pulley of said vertical support member, downwards to a third pulley of said pulley block to said second belt drive; from said second belt drive and longitudinally-over to a fourth pulley of said pulley block, and then downward to a second fixed location of said vertical support member;

whereby through operation of said first and second belt drives, said controller can cause said vertical support member and said erector device connected thereto, to be moved up and down relative to said pulley block and move longitudinally right and left with said pulley block between said first and second belt drives with said pulley block on said horizontal support member such that said erector device follows a path in space having vertical and longitudinal components.

10. A system as claimed in claim 9 wherein at least one movement apparatus comprises first and second movement apparatuses, said first movement apparatus for moving a first erector device along a path, and said second movement apparatus for moving a second erector device along said same path, but said first erector head being out of phase with said second erector head along said path.

11. A system as claimed in claim 9, wherein said path in space is a cyclical path extending between a magazine holding a plurality of blanks and a folding and sealing apparatus.

12. A system as claimed in claim 11 wherein said at least one movement apparatus is operable to move said erector head, while said erector head is engaged with said first and second panels of said blank, and said blank is in an open configuration, towards said folding and sealing apparatus, so that a flap of said carton blank can be rotated relative to said first and second panels and said first flap by co-operation of said movement of said erector head relative to a plough member of said folding and sealing apparatus.

13. A system a claimed in claim 12 wherein said erector head is operable to be moved by said at least one movement apparatus: from a first position where said erector device is operable to retrieve a blank from said magazine; to a second position where said erector head is operable to open said blank to said open configuration; to a third position, such that during said movement of said erector head from said second position to said third position, a folding apparatus is operable to fold said second to at least partially form a container bottom.

14. A system a claimed in claim 13 wherein said erector head is operable to be moved from said third position to a fourth position wherein said erector device is operable to disengage from said container.

15. A system as claimed in claim 11, further comprising a magazine, said magazine comprising:

a conveyor for moving a stack of blanks longitudinally;

a lateral stack alignment apparatus operable to align the blanks in the stack of laterally;

a longitudinal stack alignment apparatus operable to align the blanks in the stack longitudinally.

16. A system as claimed in claim 15 wherein said longitudinal alignment apparatus comprises first and second, spaced apart, generally parallel, longitudinally oriented side members, the spacing between said first and second side members being adjustable relative to each other, such that a stack of blanks positioned between said first and second side members may have their side edges longitudinally and vertically aligned.

17. A system as claimed in claim 16 wherein said first and second side members are side wall members, said first side wall member being operable to move towards and away from the right side edges of said blanks in said stack.

18. A system as claimed in claim 17 wherein said lateral stack alignment apparatus comprises (i) an tamper actuator secured to a first side wall member (ii) a vertical bar member connected to said actuator and operable to extend to engage rear edges of said blanks in said stack and operable to retract (iii) a front wall member; whereby said stack of blanks positioned between said first and second side members and said vertical bar member and aid front wall member may have their front and rear edges laterally and vertically aligned.

19. A system as claimed in claim 18 further comprising a controller operable to control the operation of said first side wall and said tamper actuator.

20. A system as claimed in claim 9, wherein said pulley block comprises a pair of inner block members and wherein said horizontal support member comprises a pair of generally horizontally oriented rails interconnected to said support frame, and wherein each of said inner block members is horizontally slidable on one of said pair of rails.

* * * * *